US012411452B2

(12) United States Patent
Okawa et al.

(10) Patent No.: US 12,411,452 B2
(45) Date of Patent: Sep. 9, 2025

(54) IMAGE FORMING APPARATUS

(71) Applicant: CANON KABUSHIKI KAISHA, Tokyo (JP)

(72) Inventors: Yuichiro Okawa, Tokyo (JP); Noritomo Yamaguchi, Kanagawa (JP); Kazuhiro Hosohara, Kanagawa (JP); Takeo Kawanami, Kanagawa (JP); Shinichi Nishida, Kanagawa (JP); Hiroyuki Munetsugu, Kanagawa (JP); Masahiro Suetsugu, Kanagawa (JP); Goshi Ozaki, Kanagawa (JP); Sohta Sugimoto, Kanagawa (JP); Mitsuhiro Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 18/505,432

(22) Filed: Nov. 9, 2023

(65) Prior Publication Data

US 2024/0176283 A1 May 30, 2024

(30) Foreign Application Priority Data

Nov. 28, 2022 (JP) ................................ 2022-189697
Nov. 28, 2022 (JP) ................................ 2022-189698

(51) Int. Cl.
*G03G 21/16* (2006.01)
*G03G 15/01* (2006.01)

(52) U.S. Cl.
CPC ..... *G03G 21/1647* (2013.01); *G03G 15/0121* (2013.01); *G03G 21/1676* (2013.01)

(58) Field of Classification Search
CPC ............. G03G 15/0877; G03G 15/556; G03G 21/1633; G03G 15/0865; G03G 15/0886
See application file for complete search history.

(56) References Cited

U.S. PATENT DOCUMENTS 9,239,543 B2 1/2016 Nishida et al.
11,402,767 B2 8/2022 Mitsumata et al.
11,526,099 B2 12/2022 Nogami et al.
(Continued)

FOREIGN PATENT DOCUMENTS

JP 2020-14300 A 9/2020
JP 2020-154300 A 9/2020

OTHER PUBLICATIONS

Goshi Ozaki et al., U.S. Appl. No. 18/213,968, filed Jun. 26, 2023.

*Primary Examiner* — Jessica L Eley
(74) *Attorney, Agent, or Firm* — VENABLE LLP

(57) ABSTRACT

An image forming apparatus that includes an actuator to drive a stirring member, an indicating unit to execute a remaining toner amount indication based on an output value from a first detection unit, and a control unit control the actuator, the first detection unit, and the indicating unit. A control unit executes (i) a first control of controlling the actuator to start driving of the stirring member based on a detection, by a second detection unit, of movement of an opening and closing member from the open position to the closed position, (ii) a second control of controlling the first detection unit to output the output value, and (iii) a third control of controlling the indicating unit to execute the remaining toner amount indication.

21 Claims, 32 Drawing Sheets

(56) References Cited

U.S. PATENT DOCUMENTS

| | | | | |
|---|---|---|---|---|
| 2011/0116815 | A1* | 5/2011 | Taniuchi | H04N 1/32657 399/24 |
| 2014/0119773 | A1* | 5/2014 | Sato | G03G 15/0896 399/119 |
| 2014/0361030 | A1* | 12/2014 | Toba | B65D 81/02 399/110 |
| 2022/0334516 | A1 | 10/2022 | Mitsumata et al. | |
| 2023/0048810 | A1 | 2/2023 | Nogami et al. | |

* cited by examiner

NearOut

Low

Mid

Full

IMAGE FORMING APPARATUS

BACKGROUND OF THE INVENTION

Field of the Invention

The present invention relates to an image forming apparatus that forms an image on a recording material.

Description of the Related Art

In general, an image forming apparatus of an electrophotographic system forms an image by transferring a toner image formed on a surface of a photosensitive drum to a transfer material as a transfer medium. For example, a process cartridge system or a toner container replenishment system is known as a developer replenishment system. The process cartridge system is a system in which a photosensitive drum and a developer container are integrated as a process cartridge, and the process cartridge is replaced with a new one when a developer runs out. On the other hand, the toner container replenishment system is a system in which toner is replenished from a toner container such as a toner pack or a toner bottle to a developer container when the toner runs out.

JP 2020-154300 A proposes an image forming apparatus in which a replenishment port of a developer container can be exposed by opening an opening and closing member provided in a top cover. Users can mount a toner pack for toner replenishment on the exposed replenishment port and replenish toner from the toner pack to the developer container.

In recent years, various forms of image forming apparatuses of the toner container replenishment system have been demanded by users.

SUMMARY OF THE INVENTION

According to a first aspect of the present invention, an image forming apparatus on which a first toner container configured to store toner of a first color and a second toner container configured to store toner of a second color different from the first color are mountable, includes an apparatus body, and a moving unit including a first developing unit configured to store the toner of the first color and a second developing unit configured to store the toner of the second color, the moving unit being configured to move with respect to the apparatus body between an internal position where an image formation is performable using the first developing unit and the second developing unit and an external position that is different from the internal position and where at least a part of the moving unit is exposed to an outside of the apparatus body. The first developing unit and the second developing unit are configured to be replenished with the toner from the first toner container and the second toner container mounted on the image forming apparatus, respectively, in a state in which the moving unit is at the external position and supported by the apparatus body. The moving unit is configured not to be movable from the external position to the internal position in a state in which the first toner container and the second toner container are mounted on the image forming apparatus.

According to a second aspect of the present invention, an image forming apparatus on which a toner container storing toner is mountable, includes an apparatus body provided with an opening, a mounting portion on which the toner container is mountable, a moving unit including a developing unit, and configured to move through the opening between an internal position where an image formation is performable using the developing unit and an external position that is different from the internal position and where at least a part of the moving unit is exposed to an outside of the apparatus body, the developing unit including a toner storage portion configured to store the toner and configured to be replenished with the toner from the toner container mounted on the mounting portion, a developing roller configured to bear the toner in the toner storage portion, and a stirring member configured to stir the toner in the toner storage portion, an opening and closing member configured to move between a closed position where the opening of the apparatus body is closed and an open position where the opening is opened, an actuator configured to drive the stirring member, a first detection unit configured to output an output value based on an amount of the toner stored in the toner storage portion, an indicating unit configured to perform a remaining toner amount indication based on the output value output from the first detection unit, a second detection unit configured to detect a movement of the opening and closing member, and a control unit configured to control the actuator, the first detection unit, and the indicating unit. The moving unit is configured to replenish the toner from the toner container mounted on the image forming apparatus to the toner storage portion in a state in which the moving unit is at the external position and supported by the apparatus body, and is configured not to be movable from the external position to the internal position in a state in which the toner container is mounted on the image forming apparatus. The control unit performs (i) a first control of controlling the actuator to start driving of the stirring member based on a detection, by the second detection unit, of a movement of the opening and closing member from the open position to the closed position, (ii) a second control of controlling the first detection unit to output the output value, and (iii) a third control of controlling the indicating unit to perform the remaining toner amount indication.

Further features of the present invention will become apparent from the following description of exemplary embodiments with reference to the attached drawings.

DESCRIPTION OF THE EMBODIMENTS

First Embodiment

Overall Configuration

First, a first embodiment of the present invention will be described. An image forming apparatus 1 is a full-color laser beam printer of an electrophotographic system, which includes four process cartridges. The number of process cartridges mounted on the image forming apparatus 1 is not limited thereto, and is appropriately set as necessary.

Figure 1:
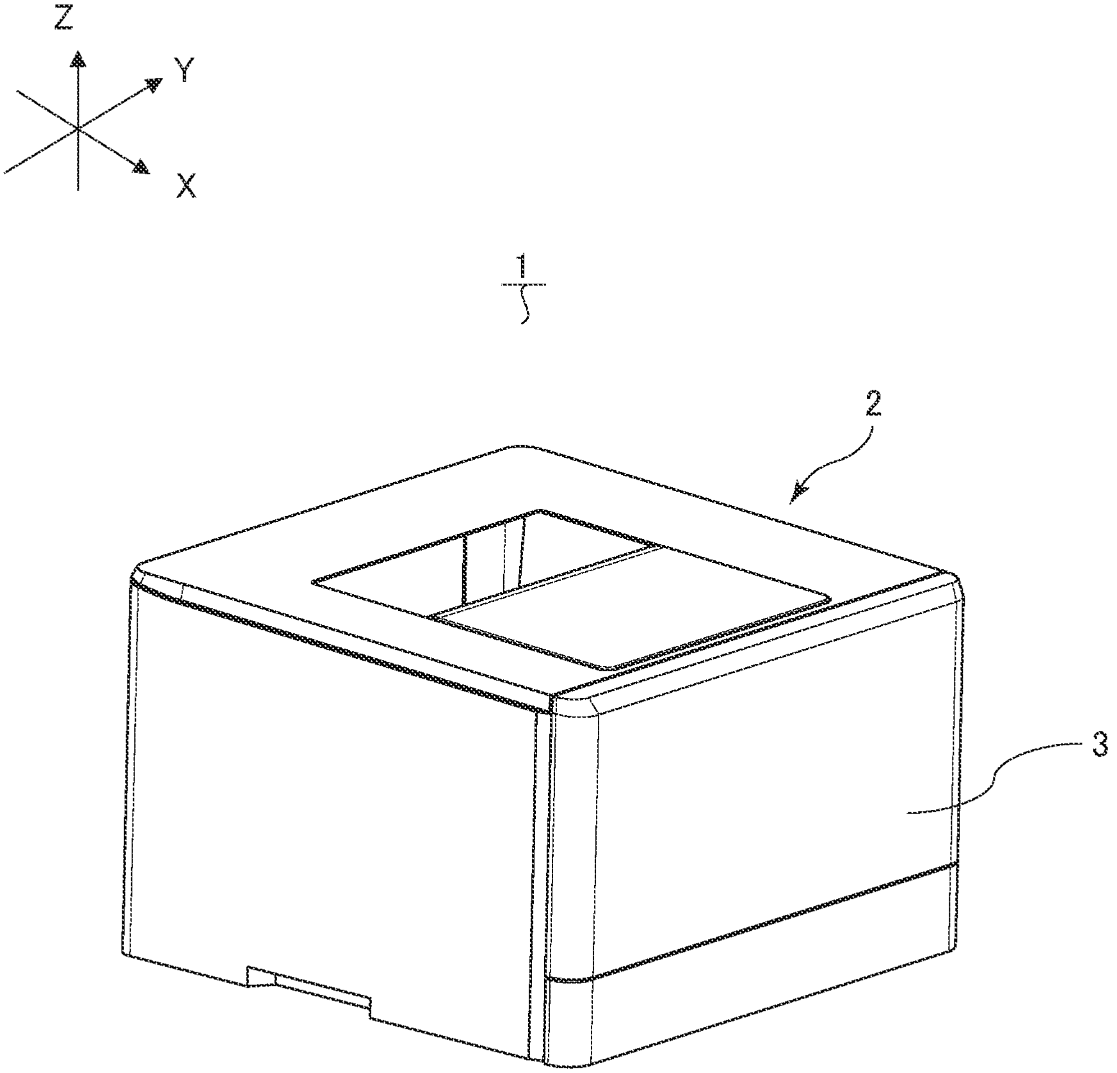
FIG. 1 is a perspective view illustrating an image forming apparatus according to a first embodiment.
Figure 2:
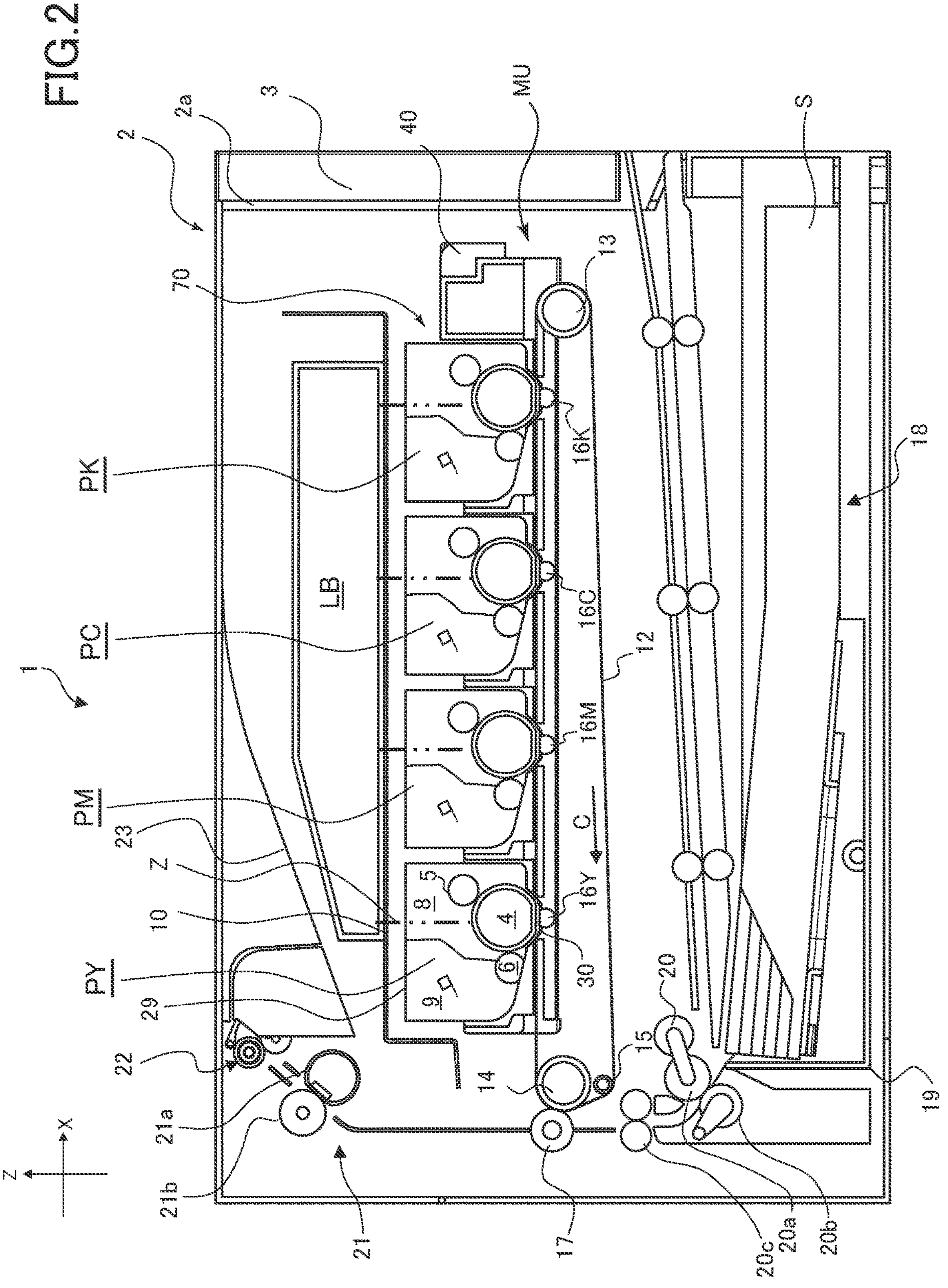
FIG. 2 is a cross-sectional view illustrating the image forming apparatus.
Figure 3:
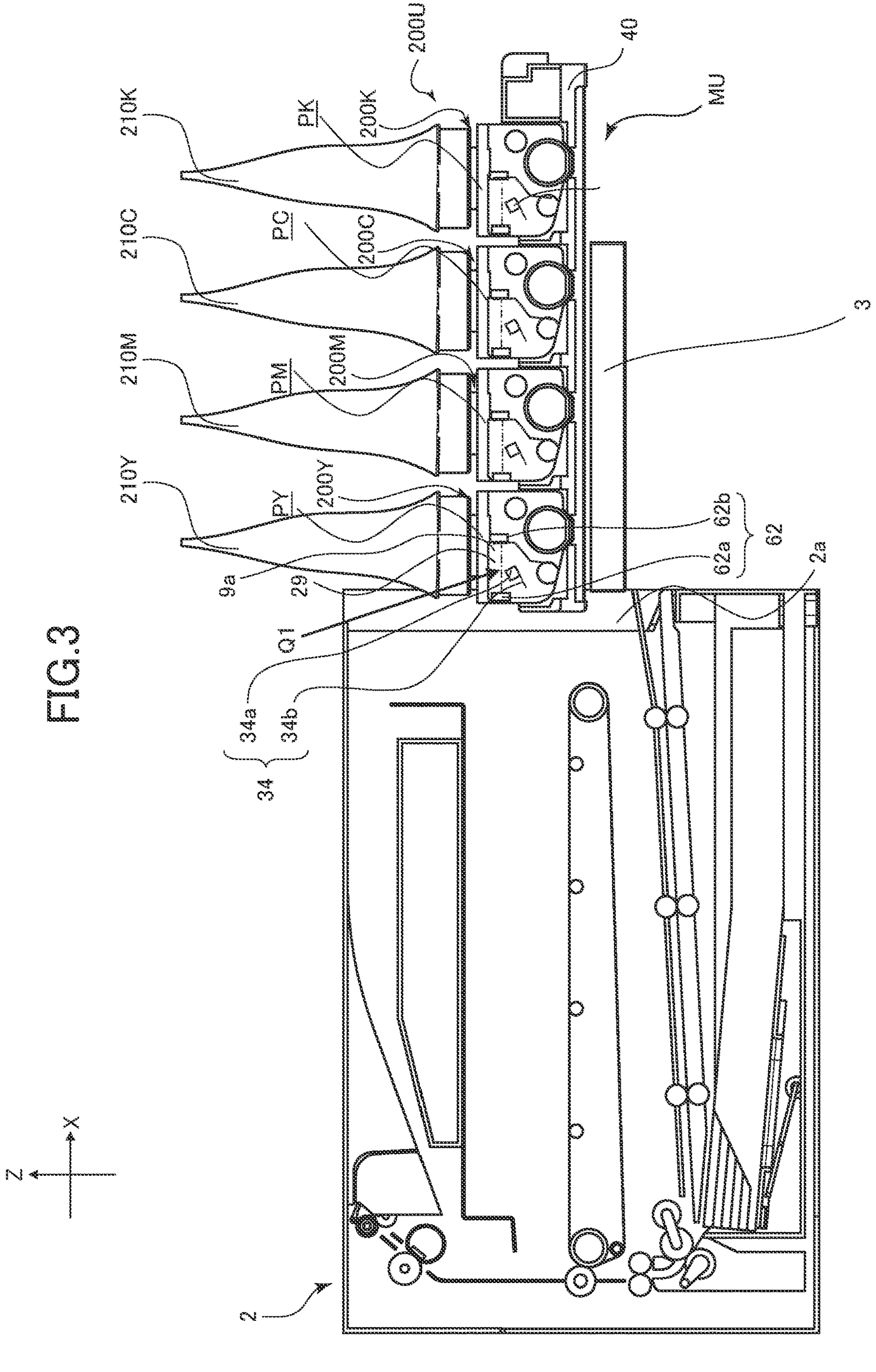
FIG. 3 is a cross-sectional view illustrating a state in which a replenishment pack is mounted on a process cartridge.

As illustrated in FIGS. 1 to 3, the image forming apparatus 1 includes an apparatus body 2 provided with an opening 2*a*, and a front door 3 serving as an opening and closing member that is openable and closable with respect to the apparatus body 2. In the image forming apparatus 1, four process cartridges can be pulled out by pulling out a cartridge tray 40 (see FIG. 2) described below through the opening 2*a* in a state in which the front door 3 is opened. The front door 3 is movable relative to the apparatus body 2 between a closed position for closing the opening 2*a* and an open position for opening the opening 2*a*.

Here, a side of the image forming apparatus 1 on which the front door 3 is provided is defined as a front surface, and a surface opposite to the front surface is defined as a back surface (rear surface). The right side of the image forming apparatus 1 when viewed from the front is referred to as a drive side, and the left side of the image forming apparatus 1 is referred to as a non-drive side. FIG. 2 is a cross-sectional view of the image forming apparatus 1 when viewed from the non-drive side, in which the front side of the drawing is the non-drive side of the image forming apparatus 1, the right side of the drawing is the front side of the image forming apparatus 1, and the back side of the drawing is the drive side of the image forming apparatus 1.

As illustrated in FIG. 2, an image forming unit 70 that forms an image on a recording material S, a sheet feeding unit 18, a fixing unit 21, and a sheet discharge roller pair 22 are included. The image forming unit 70 includes four process cartridges PY, PM, PC, and PK that form toner images of four colors of yellow (Y), magenta (M), cyan (C), and black (K), respectively, a cartridge tray 40, and a scanner unit LB. The cartridge tray 40 serving as a movable frame body is configured to be pullable from the apparatus body 2 of the image forming apparatus 1, and supports four process cartridges PY, PM, PC, and PK. The recording material S includes paper such as a sheet or an envelope, a plastic film such as a sheet for an overhead projector (OHP), cloth, and the like.

In the apparatus body 2, the process cartridges PY, PM, PC, and PK in a state of being supported by the cartridge tray 40 are arranged in a horizontal direction. A direction in which the four process cartridges PY, PM, PC, and PK are arranged is defined as an X direction. The four process cartridges PY, PM, PC, and PK are mounted on the cartridge tray 40 that can be pulled out from the apparatus body 2 toward the front side, that is, downstream in the X direction, and are arranged in order of black (K), cyan (C), magenta (M), and yellow (Y) from the front side. Although details are described below, in the present embodiment, toner is replenished to the process cartridges PY, PM, PC, and PK in a state in which the front door 3 is opened and the cartridge tray 40 is pulled out from the apparatus body 2 forward. In addition, in a state in which each of the process cartridges PY, PM, PC, and PK serving as cartridges is mounted on the apparatus body 2, a rotational driving force is transmitted from a drive output unit (not illustrated) of the apparatus body 2, and a bias voltage is supplied from the apparatus body 2.

A moving unit MU includes the process cartridges PY, PM, PC, and PK and the cartridge tray 40. The moving unit MU is configured to be movable between an internal position and an external position with respect to the apparatus body 2. The internal position is a position where an image formation can be performed using the process cartridges PY, PM, PC, and PK, and the external position is a position different from the internal position, and is a position where at least a part of the moving unit MU is exposed to the outside of the apparatus body 2. A developing roller 6 of each of the process cartridges PY, PM, PC, and PK is rotatable around a rotational axis extending in a Y direction, and the moving unit MU is movable in the X direction intersecting the Y direction. In other words, the developing roller 6 serving as a first developing roller of the process cartridge PK is rotatable around a first rotational axis extending in the Y direction. The developing roller 6 serving as a second developing roller of the process cartridge PC is rotatable around a second rotational axis extending in the Y direction.

The four process cartridges PY, PM, PC, and PK have the same configuration except that colors of images to be formed are different. Therefore, only the configuration and image forming process of the process cartridge PY will be described, and a description of the process cartridges PM, PC, and PK will be omitted.

The process cartridge PY includes a cleaning unit 8 including a photosensitive drum 4 and a charging roller 5, and a developing apparatus 9 including the developing roller 6 and a developing frame body 29. The photosensitive drum 4 serving as an image bearing member is configured by applying an organic photoconductive layer to an outer periphery of an aluminum cylinder, and rotates by the rotational driving force transmitted from the apparatus body 2. The photosensitive drum 4 is irradiated with laser light Z from the scanner unit LB via an exposure window 10 of the process cartridge PY. A photosensitive belt may be used instead of the photosensitive drum 4. The developing frame body 29 stores yellow (Y) toner and rotatably supports the developing roller 6 serving as a developing member.

An intermediate transfer belt 12 wound around a driving roller 14, tension rollers 13 and 15, and the like is provided in the image forming unit 70, and the intermediate transfer belt 12 rotates in a direction of an arrow C in the drawing by the driving roller 14. Primary transfer rollers 16Y, 16M, 16C, and 16K are provided inside the intermediate transfer belt 12. The photosensitive drum 4 and the primary transfer roller 16Y of the process cartridge PY abut each other to form a primary transfer nip 30.

The fixing unit 21 includes a fixing film 21*a* heated by a heater, and a pressure roller 21*b* that is in pressure contact with the fixing film 21*a*. The sheet feeding unit 18 is provided at a lower portion of the image forming apparatus 1, and includes a feeding cassette 19 that can be pulled out from and mounted on the apparatus body 2.

Next, an image forming operation of the image forming apparatus 1 configured as described above will be described. When an image signal is input to the scanner unit LB from a personal computer (not illustrated) or the like, the laser light Z corresponding to the image signal is emitted from the scanner unit LB onto the photosensitive drum 4 of the process cartridge PY.

At this time, the surface of the photosensitive drum 4 is uniformly charged in advance to a predetermined polarity and potential by the charging roller 5, and an electrostatic latent image is formed on the surface of the photosensitive drum 4 by irradiation with laser light from the scanner unit LB. The electrostatic latent image formed on the photosensitive drum 4 is developed by the developing roller 6, and a yellow (Y) toner image is formed on the photosensitive drum 4.

Similarly, the respective photosensitive drums of the process cartridges PM, PC, and PK are also irradiated with laser light from the scanner unit LB, and toner images of magenta (M), cyan (C), and black (K) are formed on the respective photosensitive drums. The toner image of each color formed on each photosensitive drum is transferred to the intermediate transfer belt 12 by the primary transfer rollers 16Y, 16M, 16C, and 16K, and is conveyed to a secondary transfer roller 17 by the intermediate transfer belt 12 rotating by the driving roller 14.

The image forming process for each color is performed at a timing of superimposing a toner image on an upstream toner image primarily transferred onto the intermediate transfer belt 12. After the toner images of the respective colors are transferred to the intermediate transfer belt 12, toner remaining on the surface of the photosensitive drum 4 is collected by the cleaning unit 8. A cleaner-less configuration in which residual toner after transfer on the photosensitive drum 4 is collected by the developing apparatus 9 and reused may be adopted.

In parallel with this image forming process, the recording material S accommodated in the feeding cassette 19 of the sheet feeding unit 18 is fed by a pickup roller 20. The recording materials S fed by the pickup roller 20 are separated one by one at a separation nip formed by a feed roller 20*a* and a separation roller 20*b*.

A torque limiter (not illustrated) is mounted on the separation roller 20*b*, and the separation roller 20*b* does not rotate in a case where two or more sheets enter the separation nip, and the separation roller 20*b* rotates following the feed roller 20*a* in a case where one sheet enters the separation nip. A so-called retard roller system in which rotational drive in a direction opposite to a sheet feeding direction is input to the separation roller 20*b* may be adopted.

The recording materials S separated one by one by the separation nip are conveyed to a registration roller pair 20*c*. The recording material S whose skew feeding has been corrected by the registration roller pair 20*c* is conveyed at a predetermined conveyance timing according to the image forming process. Then, a full-color toner image on the intermediate transfer belt 12 is transferred to the recording material S by a secondary transfer bias applied to the secondary transfer roller 17.

Predetermined heat and pressure are applied to the recording material S to which the toner image has been transferred by the fixing film 21*a* and the pressure roller 21*b* of the fixing unit 21, and the toner is melted and fixed. The recording material S having passed through the fixing unit 21 is discharged to a sheet discharge tray 23 by the sheet discharge roller pair 22.

Replenishment Portion

Figure 4:
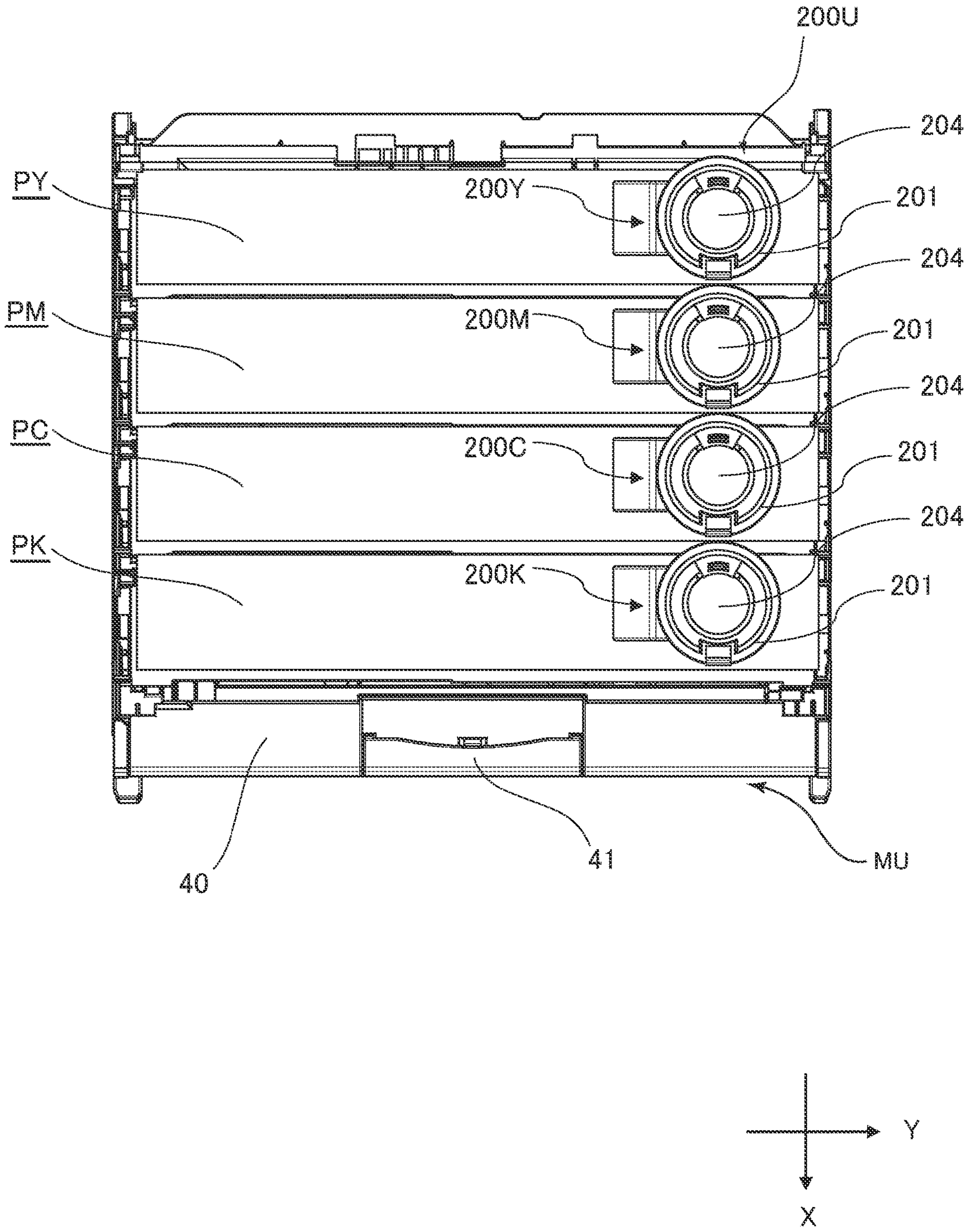
FIG. 4 is a plan view illustrating a cartridge tray and the process cartridge.

Next, the replenishment portions 200Y, 200M, 200C, and 200K arranged on top surface portions of the process cartridges PY, PM, PC, and PK, respectively, will be described with reference to FIGS. 3 to 7B. FIG. 3 is a cross-sectional view illustrating a state in which replenishment packs 210Y, 210M, 210C, and 210K are mounted on the process cartridges PY, PM, PC, and PK, respectively. FIG. 4 is a plan view illustrating the cartridge tray 40 and the process cartridges PY, PM, PC, and PK. In FIG. 4, a grip portion 201*b* (see FIG. 5A) of a lever 201 is omitted.

As illustrated in FIGS. 3 and 4, the process cartridges PY, PM, PC, and PK are exposed to the outside when a user pulls out the cartridge tray 40 from the apparatus body 2. The cartridge tray 40 includes a handle portion 41 to be gripped when the user pulls out the cartridge tray 40. The process cartridges PY, PM, PC, and PK include the replenishment portions 200Y, 200M, 200C, and 200K for replenishing toner, respectively. The replenishment portions 200Y, 200M, 200C, and 200K are positioned at the same position in the Y direction serving as an intersecting direction intersecting the X direction serving as a movement direction of the moving unit MU. In other words, the replenishment portions 200Y, 200M, 200C, and 200K are arranged so as to overlap each other when viewed in the X direction. For example, the replenishment portion 200K serving as a first development mounting portion is provided at one end portion of the process cartridge PK in the Y direction. The replenishment portion 200C serving as a second development mounting portion is provided at an end portion of the process cartridge PC on a side where the replenishment portion 200K is positioned in the Y direction. The replenishment portions 200Y, 200M, 200C, and 200K are included in a mounting portion 200U, and are exposed to the outside when the cartridge tray 40 is pulled out from the apparatus body 2. That is, the replenishment portions 200Y, 200M, 200C, and 200K are exposed to the outside of the apparatus body 2 when the moving unit MU is at the external position. At this time, there is no component or the like of the image forming apparatus 1, and there is an open space immediately above the replenishment portions 200Y, 200M, 200C, and 200K.

The replenishment packs 210Y, 210M, 210C, and 210K store yellow (Y), magenta (M), cyan (C), and black (K) toners, respectively, and the toners are supplied to a storage portion 9*a* of the developing apparatus 9 via the replenishment portions 200Y, 200M, 200C, and 200K. That is, the replenishment portions 200Y, 200M, 200C, and 200K are configured such that the replenishment packs 210Y, 210M, 210C, and 210K are attachable to and detachable from the replenishment portions 200Y, 200M, 200C, and 200K, respectively, and when toner is replenished, the user performs a toner replenishment operation described below. As illustrated in FIG. 3, the replenishment packs 210Y, 210M, 210C, and 210K do not have to be mounted on the replenishment portions 200Y, 200M, 200C, and 200K at the same time, and one to three replenishment packs may be mounted thereon.

The replenishment portions 200Y, 200M, 200C, and 200K have the same configuration except that colors of toner to be replenished are different. Therefore, in a case where the replenishment portions 200Y, 200M, 200C, and 200K are not particularly distinguished from one another, reference characters "Y", "M", "C", and "K" are omitted, and the replenishment portions 200Y, 200M, 200C, and 200K will be described as the replenishment portions 200 below. Similarly, the replenishment packs 210Y, 210M, 210C, and 210K have the same configuration except that colors of stored toners are different. Therefore, in a case where the replenishment packs 210Y, 210M, 210C, and 210K are not particularly distinguished, the reference characters "Y", "M", "C", and "K" are omitted, and the replenishment packs 210Y, 210M, 210C, and 210K are described as the replenishment packs 210 below. The image forming apparatus 1 and the replenishment pack 210 are included in an image forming system.

Figure 5A:
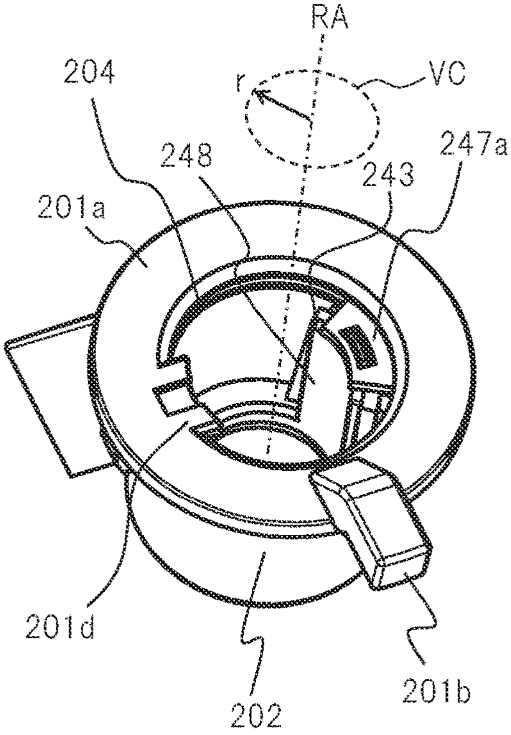
FIG. 5A is a perspective view illustrating a replenishment portion in a state in which a lever is positioned at an operation position.
Figure 5B:
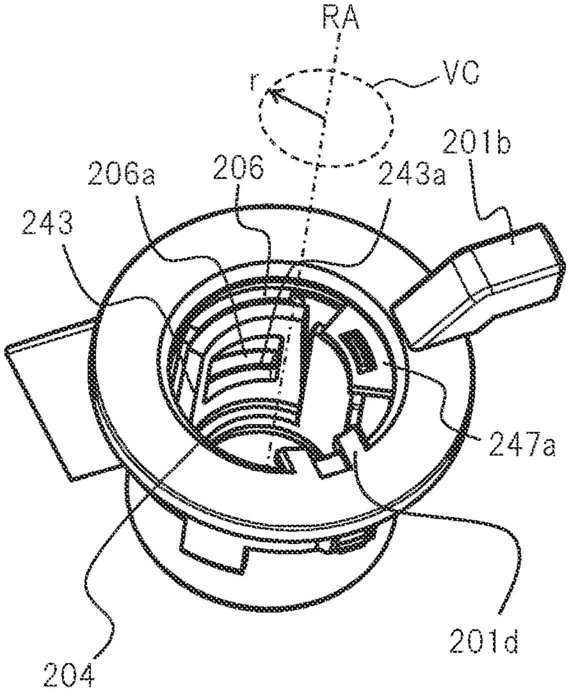
FIG. 5B is a perspective view illustrating the replenishment portion in a state in which the lever is positioned at a replenishment position.
Figure 5C:
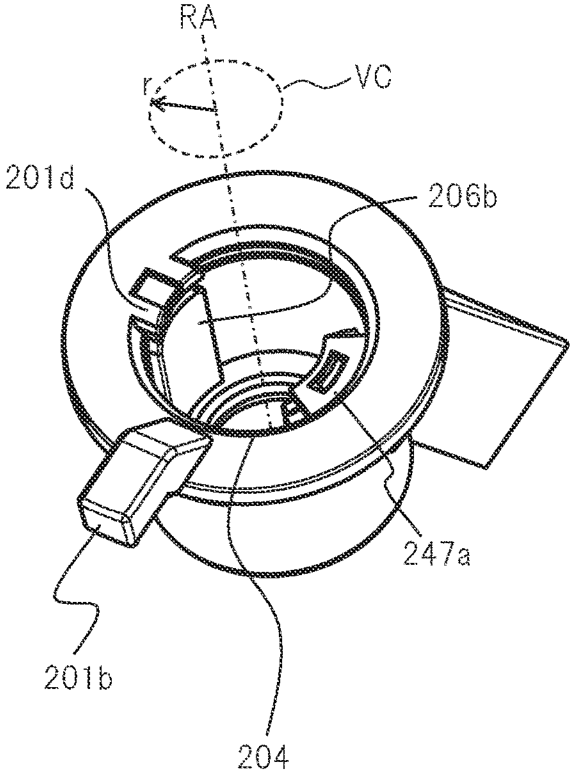
FIG. 5C is a perspective view illustrating the replenishment portion in a state in which the lever is positioned at the operation position.
Figure 6A:
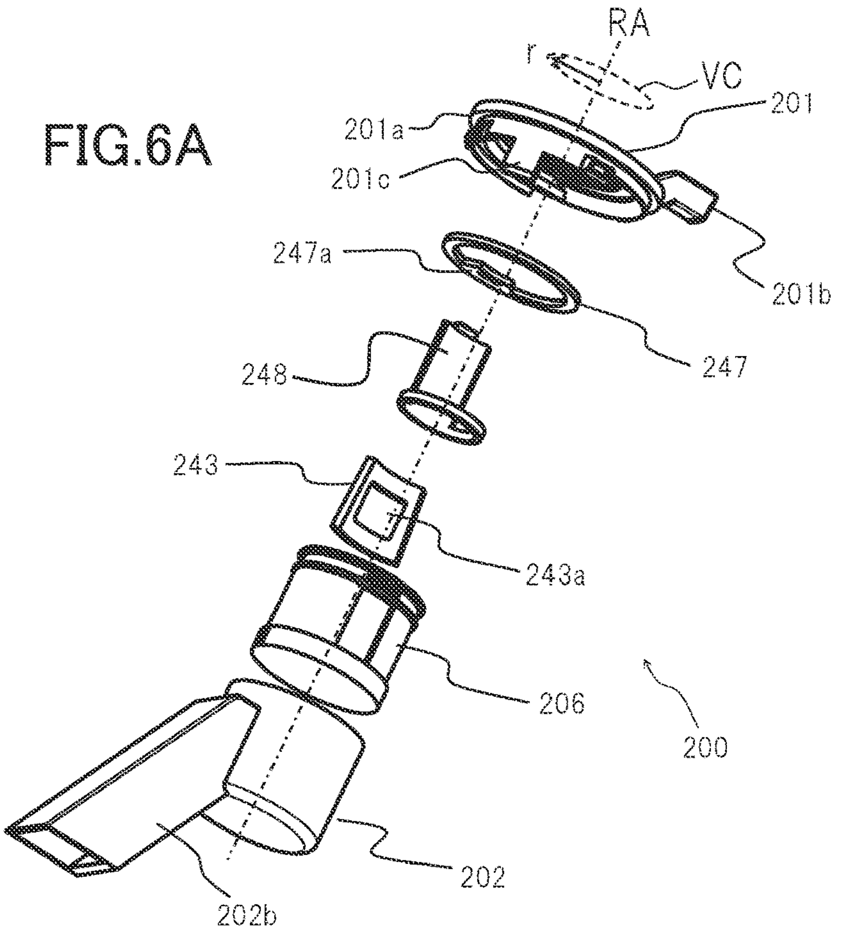
FIG. 6A is an exploded perspective view illustrating the replenishment portion.
Figure 6B:
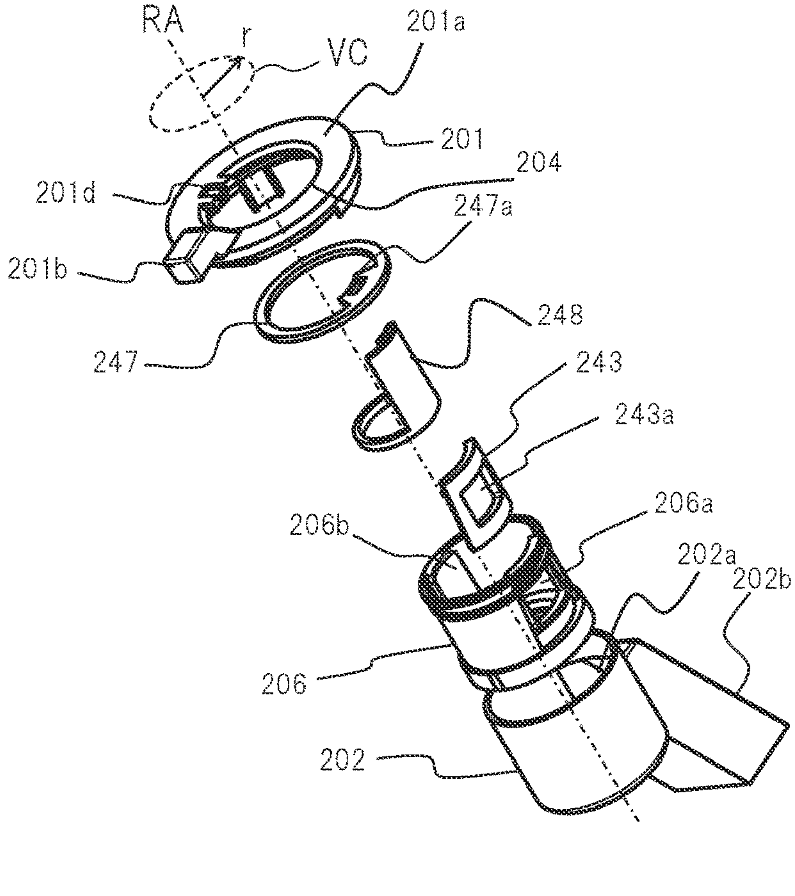
FIG. 6B is another exploded perspective view illustrating the replenishment portion.

A detailed configuration of the replenishment portion 200 on which the replenishment pack 210 is mounted will be described. FIGS. 5A and 5B are perspective views of the replenishment portion 200 when viewed from the same direction. FIG. 5C is a perspective view of the replenishment portion 200 when viewed from an angle different from that in FIG. 5A. FIGS. 6A and 6B are exploded perspective views of the replenishment portion 200.

As illustrated in FIGS. 6A and 6B, the replenishment portion 200 includes the lever 201 serving as an operation portion, a rotation regulation member 247, a cover 248, a sealing member 243, a body shutter 206, and a passage member 202. The body shutter 206 is configured to be rotatable (movable) around a rotational axis RA with respect to the passage member 202. The body shutter 206 is disposed on an inner side of the tubular passage member 202, and has a body shutter opening 206*a*. In addition, the body shutter 206 includes a body shutter engagement portion 206*b* engaged with a container shutter engaged portion 214*b* of a container shutter 214 described below. When a virtual circle centered on the rotational axis RA is a virtual circle VC, the body shutter engagement portion 206*b* is a projecting portion projecting inward in a radial direction r of the virtual circle VC.

In a case where the body shutter 206 is positioned at a closed position illustrated in FIG. 5A, the body shutter opening 206*a* and a side surface opening 202*a* (see FIG. 6B) of the passage member 202 do not overlap each other. That is, the body shutter opening 206*a* and the side surface opening 202*a* of the passage member 202 do not communicate with each other. Therefore, the side surface opening 202*a* is blocked by the body shutter 206, and toner is not discharged to an extension portion 202*b* of the passage member 202. When the body shutter 206 is positioned at an open position illustrated in FIG. 5B, the body shutter opening 206*a* and the side surface opening 202*a* of the passage member 202 overlap each other. That is, the body shutter opening 206*a* and the side surface opening 202*a* of the passage member 202 communicate with each other. Therefore, toner replenished from the replenishment pack 210 mounted on the replenishment portion 200 can pass through the body shutter opening 206*a* and the side surface opening 202*a* to be discharged to the extension portion 202*b* of the passage member 202.

As will be described in detail below, when the lever 201 is rotated in a state in which the replenishment pack 210 is mounted on the replenishment portion 200, the body shutter 206 moves (rotates) between the closed position and the open position. That is, when the lever 201 is rotated counterclockwise by 90 degrees by the user, the body shutter 206 moves from the closed position illustrated in FIG. 5A to the open position illustrated in FIG. 5B.

The sealing member 243 is attached around the body shutter opening 206*a* on an inner peripheral surface side of the body shutter 206. The sealing member 243 has a sealing opening 243*a*. The sealing member 243 is attached to the body shutter 206 such that the sealing opening 243*a* overlaps the body shutter opening 206*a*. When the body shutter 206 is at the open position, the sealing member 243 seals a gap between the periphery of an insertion portion opening 212*a* of an insertion portion 212 of the replenishment pack 210 described below and the body shutter 206.

The rotation regulation member 247 is fixed to the passage member 202 and is provided on an inner side of the body shutter 206 in the radial direction r of the virtual circle VC. The rotation regulation member 247 includes a rotation regulation portion 247*a* that is engaged with a rotation-regulated portion 212*b* of the insertion portion 212 of the replenishment pack 210 described below to regulate rotation of the insertion portion 212 around the rotational axis RA.

The lever 201 includes a ring portion 201*a* having a replenishment port 204 into which the insertion portion 212 of the replenishment pack 210 is inserted, and the grip portion 201*b* provided integrally with the ring portion 201*a*. The lever 201 includes a lever engagement portion 201*d* serving as an engagement portion protruding inward in the radial direction r of the virtual circle VC from an inner peripheral surface forming the replenishment port 204. As illustrated in FIG. 5C, when the body shutter 206 is at the closed position, the lever engagement portion 201*d* is in the same phase as the body shutter engagement portion 206*b* in a circumferential direction of the virtual circle VC. In other words, the lever engagement portion 201*d* overlaps the body shutter engagement portion 206*b* when viewed in a direction of the rotational axis RA when the body shutter 206 is at the closed position. The cover 248 is a member that is fixed to the passage member 202 and covers the body shutter opening 206*a* when the body shutter 206 is at the closed position as illustrated in FIG. 5A.

When an image formation is performed on the recording material P, the toner in the storage portion 9*a* is stirred by a stirring member 34 (see FIG. 3), and the side surface opening 202*a* is blocked by the body shutter 206 so that the toner does not leak from the side surface opening 202*a* of the passage member 202. Therefore, at the time of the image formation, the lever 201 is positioned at an operation position (regulation position) illustrated in FIG. 5A so that the body shutter 206 is positioned at the closed position. On the other hand, it is necessary to open the side surface opening 202*a* when replenishing toner from the replenishment pack 210 described below to the storage portion 9*a* serving as a toner storage portion. Therefore, at the time of toner replenishment, the lever 201 is positioned at a replenishment position (allowing position) illustrated in FIG. 5B so that the body shutter 206 is positioned at the open position. The lever 201 regulates toner replenishment from the replenishment pack 210 mounted on the replenishment portion 200 to the storage portion 9*a* at the operation position, and allows toner replenishment from the replenishment pack 210 to the storage portion 9*a* at the replenishment position.

Figure 7A:
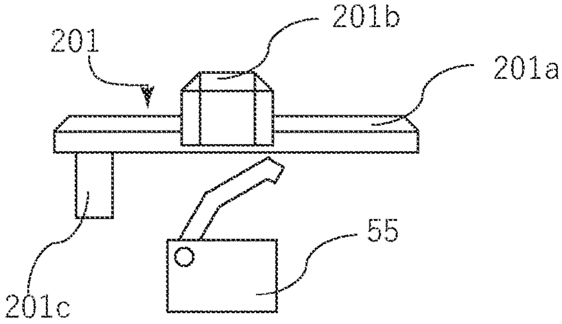
FIG. 7A is a side view illustrating the lever positioned at the operation position and a switch.
Figure 7B:
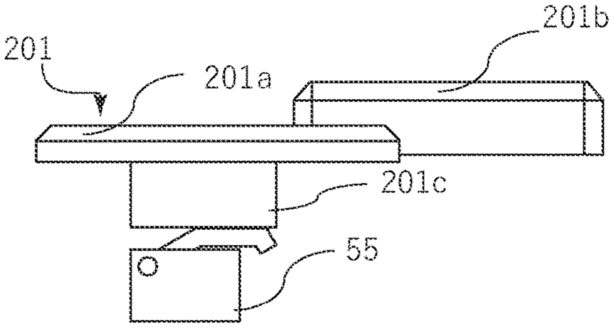
FIG. 7B is a side view illustrating the lever positioned at the replenishment position and the switch.

FIGS. 7A and 7B are side views illustrating the lever 201 and a switch 55. As illustrated in FIGS. 6A and 7A, the lever 201 includes a rib 201*c* to be detected, the rib 201*c* being integrally formed with the ring portion 201*a*. The switch 55 serving as a third detection unit is disposed below the ring portion 201*a*. When the lever 201 is positioned at the operation position, the switch 55 is turned off without coming into contact with the rib 201*c* to be detected. When the lever 201 is positioned at the replenishment position, the switch 55 comes into contact with the rib 201*c* to be detected and is turned on.

As described above, as the switch 55 is turned off or on, it is possible to detect that the lever 201 is positioned at the operation position or the replenishment position. When the switch 55 is switched from an off state to an on state, it can be detected that the lever 201 has moved from the operation position to the replenishment position. When the switch 55 is switched from the off state to the on state, it is possible to detect that the lever 201 has moved from the replenishment position to the operation position.

Replenishment Pack

Figure 8A:
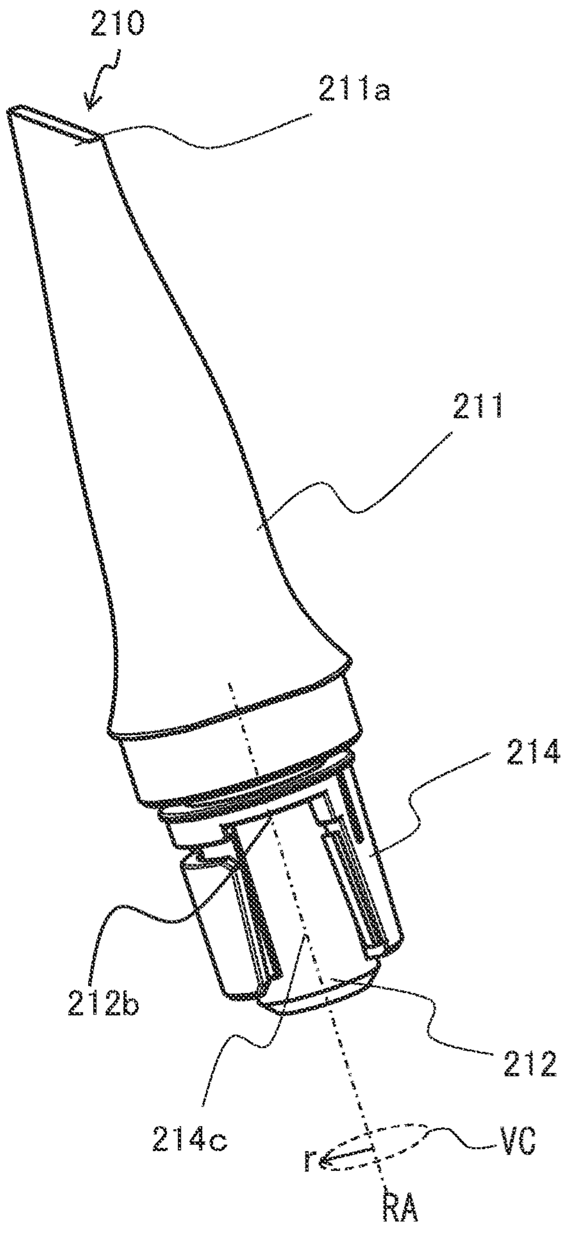
FIG. 8A is a perspective view illustrating the replenishment pack.
Figure 8B:
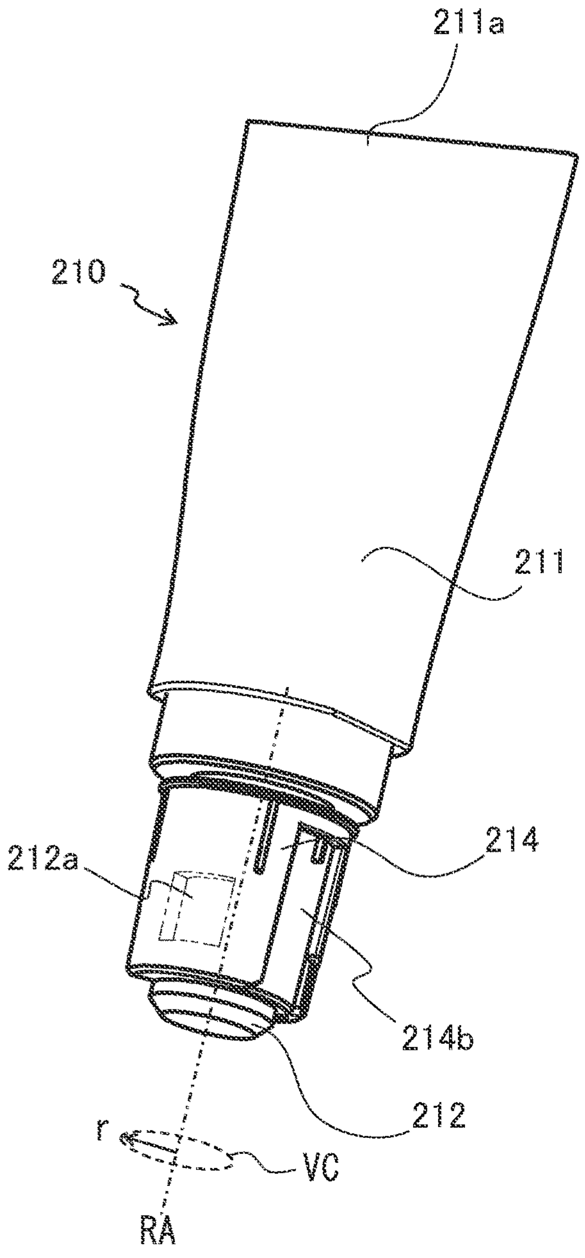
FIG. 8B is another perspective view illustrating the replenishment pack.
Figure 9A:
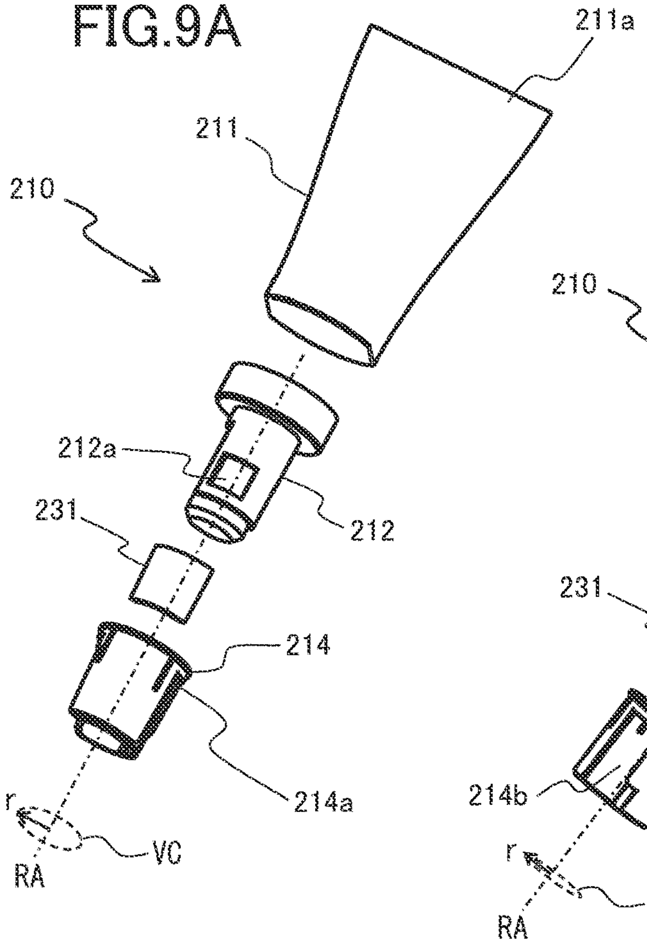
FIG. 9A is an exploded perspective view illustrating the replenishment pack.
Figure 9B:
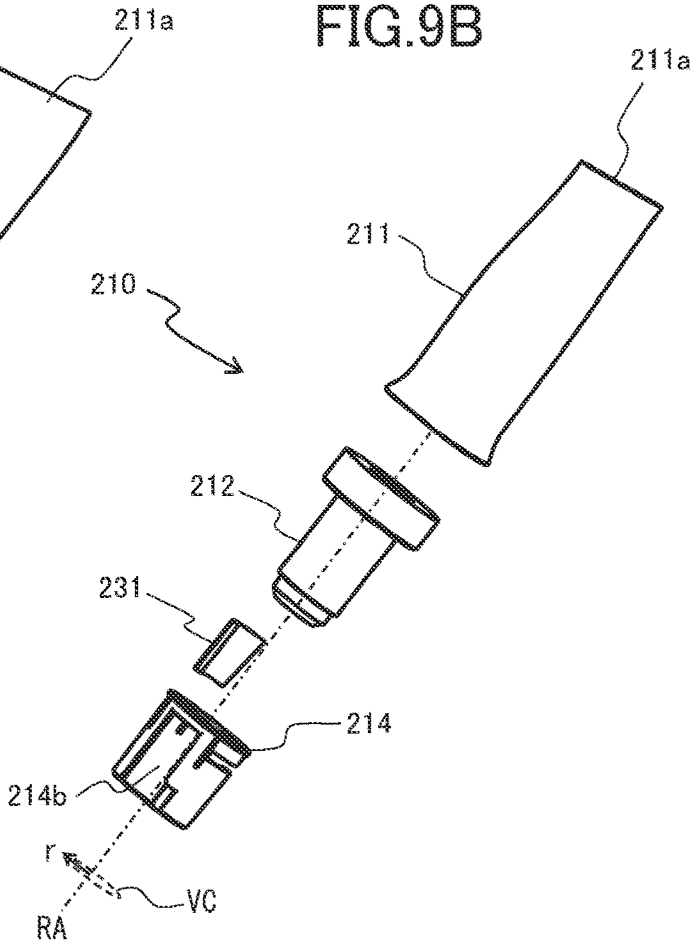
FIG. 9B is another exploded perspective view illustrating the replenishment pack.
Figure 9C:
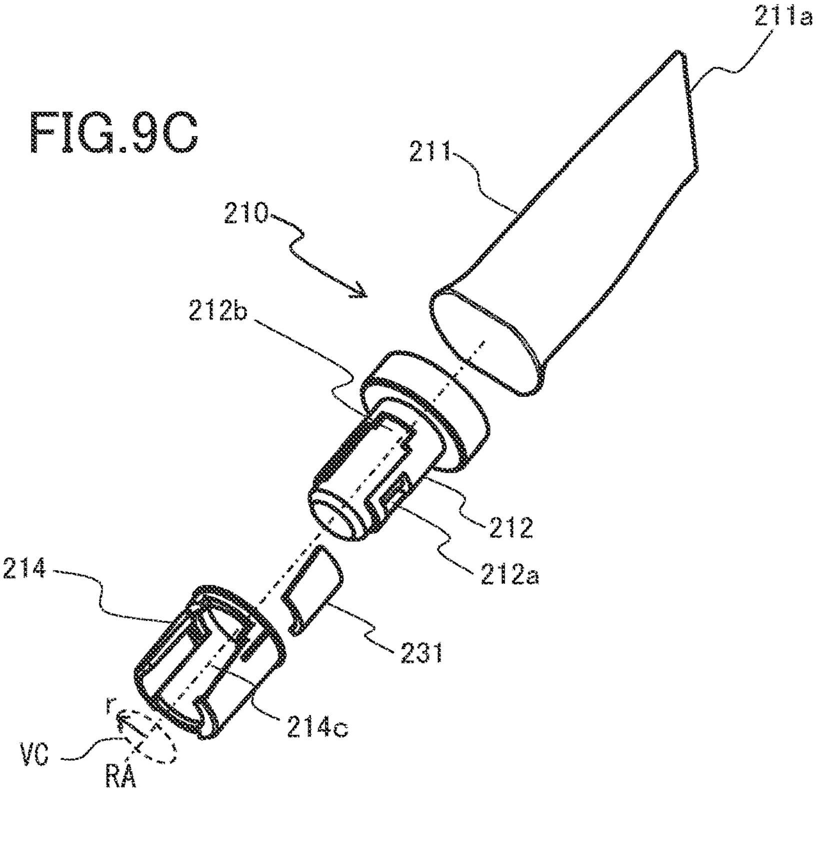
FIG. 9C is another exploded perspective view illustrating the replenishment pack.

Next, a configuration of the replenishment pack 210 will be described with reference to FIGS. 8A to 9C. FIGS. 8A and 8B are perspective views of the replenishment pack 210 when viewed from different angles. FIGS. 9A, 9B, and 9C are exploded perspective views of the replenishment pack 210 when viewed from different angles. In FIG. 8B, the insertion portion opening 212*a* is covered with the container shutter 214 and is not actually visible, and thus is indicated by a dotted line.

As illustrated in FIGS. 8A to 9C, the replenishment pack 210 includes a pouch 211, the insertion portion 212 (end portion member), the container shutter 214, and a container shutter seal 231. The rotational axis RA is a rotational axis when the container shutter 214 rotates with respect to the insertion portion 212.

The pouch 211 is a container in which a polypropylene sheet is formed into a bag shape by pouch processing, and stores toner therein. The pouch 211 has a shape in which the pouch 211 becomes flat toward a side opposite to the insertion portion 212, and has a pouch end portion 211*a* extending in a direction orthogonal to the rotational axis RA at an end of the pouch 211. In the present embodiment, the pouch is used as a toner storage portion of the replenishment pack 210, but a resin bottle or a container made of paper or vinyl may be used.

The insertion portion 212 is a cylindrical member that can be inserted into the replenishment port 204 of the lever 201, and the insertion portion opening 212*a* is provided in a side surface extending in the direction of the rotational axis RA. The insertion portion 212 is a member that is provided at an end portion of the pouch 211 in the direction of the rotational axis RA and discharges toner in the pouch 211 to the outside of the replenishment pack 210 through the insertion portion opening 212*a*. The insertion portion 212 further includes the rotation-regulated portion 212*b*. The rotation of the insertion portion 212 around the rotational axis RA is regulated by engagement of the rotation-regulated portion 212*b* with the rotation regulation portion 247*a* of the rotation regulation member 247 of the replenishment portion 200.

The container shutter 214 is a cylindrical member that is concentric with the insertion portion 212. The container shutter 214 is rotatable around the rotational axis RA with respect to the insertion portion 212 outside the insertion portion 212 in the radial direction r of the virtual circle VC. The container shutter 214 is configured to move (rotate) between a closed position where the container shutter 214 closes the insertion portion opening 212*a* and an open position where the container shutter 214 opens the insertion portion opening 212*a*.

The container shutter 214 has a container shutter opening 214*c* (opening portion). When the container shutter 214 is at the open position, the container shutter opening 214*c* and the insertion portion opening 212*a* overlap each other and communicate with each other. At this time, the toner can be discharged from the replenishment pack 210 to the outside of the replenishment pack 210 through the container shutter opening 214*c* and the insertion portion opening 212*a*. When the container shutter 214 is at the closed position, the insertion portion opening 212*a* is closed by the container shutter 214. At this time, the toner is not discharged from the replenishment pack 210 to the outside of the replenishment pack 210. When the replenishment pack 210 is not mounted on the image forming apparatus 1, the container shutter 214 is at the closed position. When the container shutter 214 is at the closed position, the rotation-regulated portion 212*b* of the insertion portion 212 is exposed from the container shutter opening 214*c*. This will be described below.

A container shutter engaged portion 214*b*, which is engaged with the lever engagement portion 201*d* of the lever 201 and the body shutter engagement portion 206*b* of the body shutter 206 when the replenishment pack 210 is mounted on the replenishment portion 200, is provided at an outer peripheral surface of the container shutter 214. The container shutter engaged portion 214*b* serving as an engaged portion is a recess portion recessed inward in the radial direction r of the virtual circle VC from the outer peripheral surface of the container shutter 214, and extends to a distal end of the container shutter 214 on a side far from the pouch 211 in the direction of the rotational axis RA. When the container shutter engaged portion 214*b* receives a force from the lever engagement portion 201*d* of the lever 201 in a rotation direction around the rotational axis RA, the container shutter 214 is rotated with respect to the insertion portion 212. The container shutter engaged portion 214*b* does not need to be a recess portion as long as the container shutter engaged portion 214*b* is engaged with the lever 201 and the container shutter 214 is rotated by the rotation of the lever 201.

The container shutter seal 231 is attached to an inner peripheral surface of the container shutter 214. The container shutter seal 231 seals between the periphery of the insertion portion opening 212*a* of the insertion portion 212 and the container shutter 214 when the container shutter 214 is at the closed position.

Toner Replenishment Operation

Figure 10A:
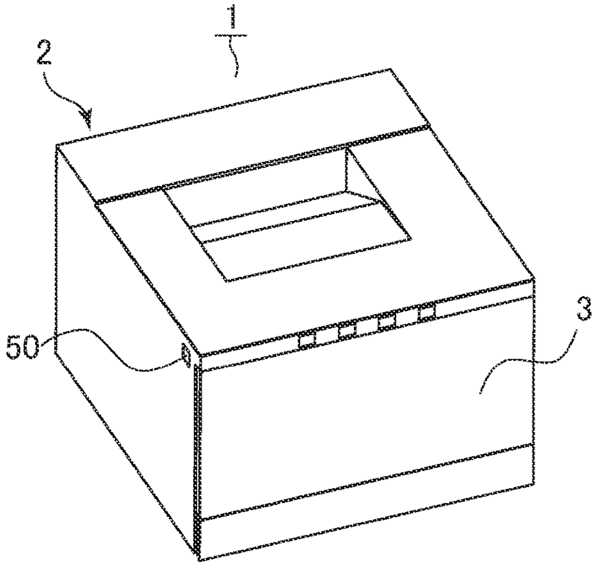
FIG. 10A is a perspective view illustrating the image forming apparatus in a state in which a front door is closed.
Figure 10B:
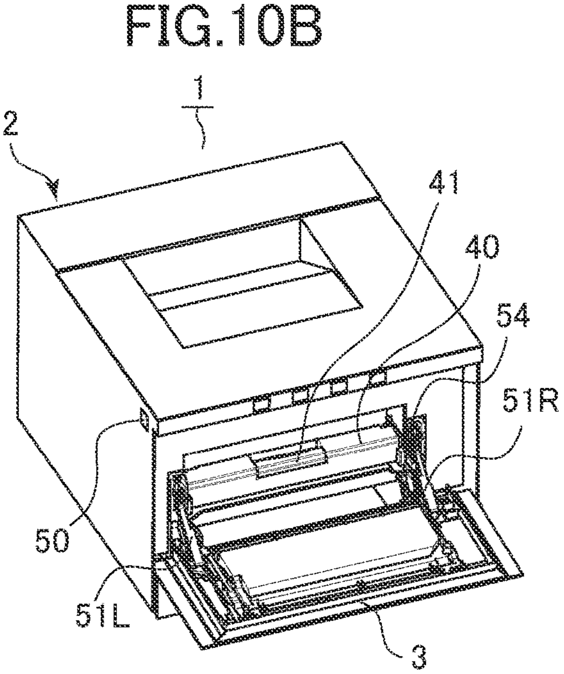
FIG. 10B is a perspective view illustrating the image forming apparatus in a state in which the front door is opened.
Figure 10C:
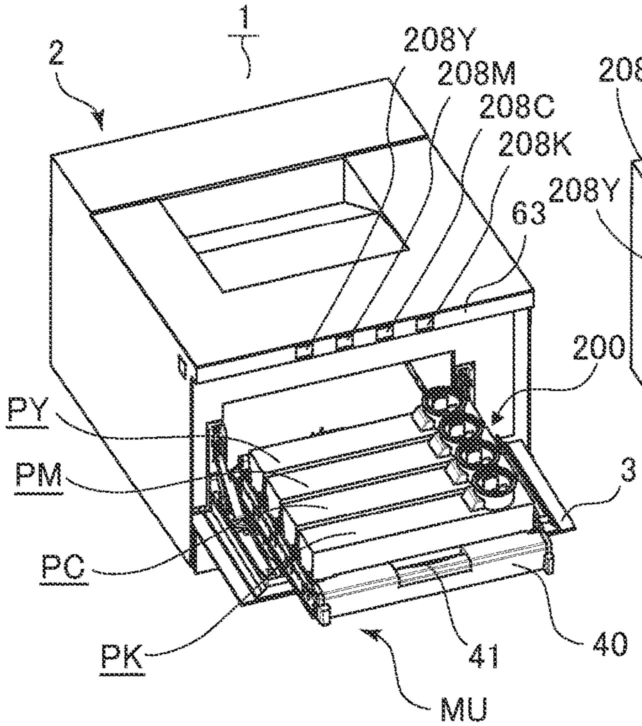
FIG. 10C is a perspective view illustrating the image forming apparatus in a state in which the cartridge tray is pulled out.
Figure 10D:
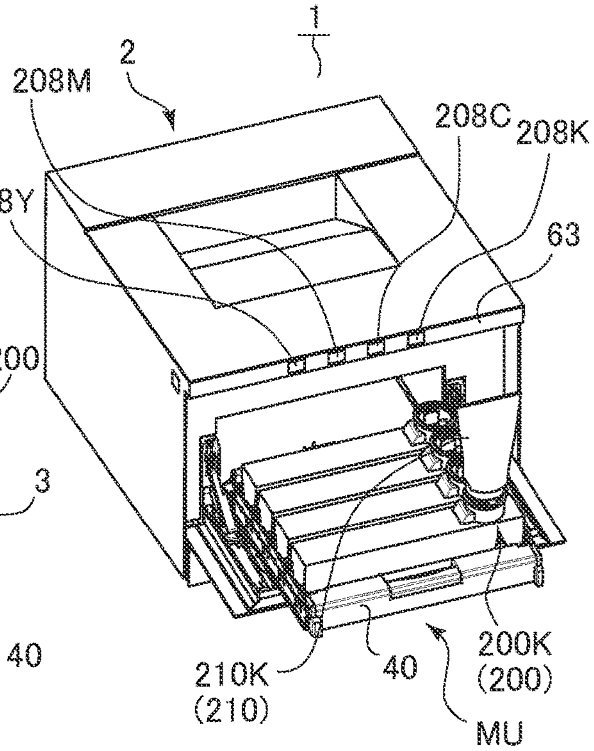
FIG. 10D is a perspective view illustrating a state in which the replenishment pack is mounted on the process cartridge.
Figure 10D:
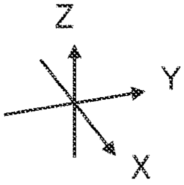
Figure 11A:
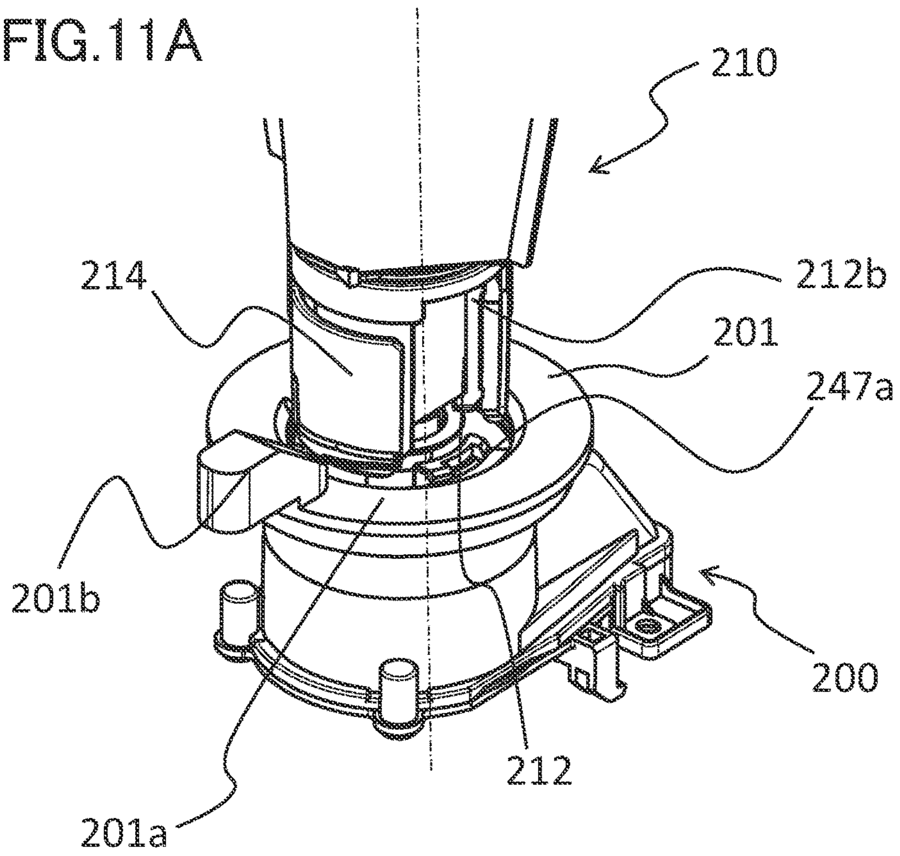
FIG. 11A is a perspective view illustrating a state immediately before the replenishment pack is mounted on the replenishment portion.
Figure 11B:
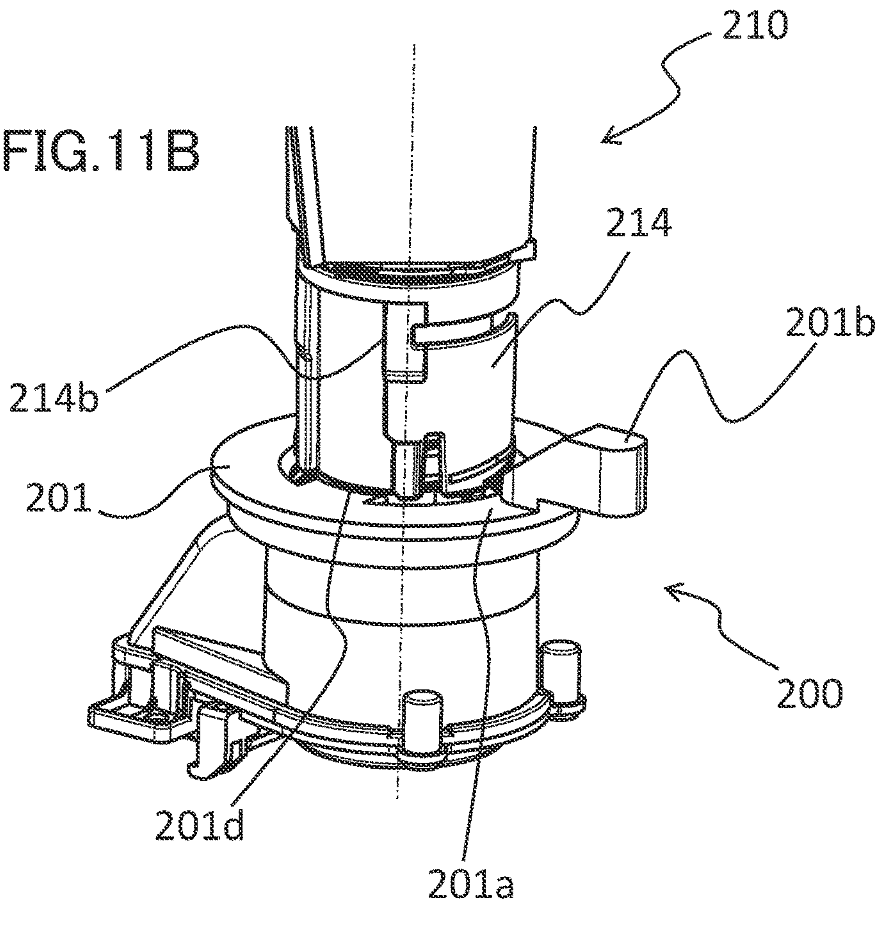
FIG. 11B is another perspective view illustrating a state immediately before the replenishment pack is mounted on the replenishment portion.

Next, an operation of replenishing toner to the process cartridge by the user will be described with reference to FIGS. 10A to 11B. FIG. 10A is a perspective view illustrating the image forming apparatus 1 in a state in which the front door 3 is positioned at the closed position, and FIG. 10B is a perspective view illustrating the image forming apparatus 1 in a state in which the front door 3 is positioned at the open position. FIG. 10C is a perspective view illustrating the image forming apparatus 1 in a state in which the cartridge tray 40 is pulled out, and FIG. 10D is a perspective view illustrating the image forming apparatus 1 in a state in which the replenishment pack 210K is mounted on the process cartridge PK. FIGS. 11A and 11B are perspective views of the replenishment portion 200 of the image forming apparatus 1 and the replenishment pack 210 immediately before being mounted on the replenishment portion 200 as viewed from different directions.

As illustrated in FIGS. 10A and 10B, in a case of replenishing toner, the user first moves the front door 3 from the closed position to the open position. The front door 3 is rotatable around a fulcrum provided at a lower portion, and can be opened by about 90° from the closed position to the open position. When opening the front door 3, the user may directly grip and open the front door 3, or may open the front door 3 by pressing a push button 50 provided in a side surface of the apparatus body 2. When the push button 50 is pressed, the front door 3 is unlocked, and the front door 3 is opened to move to the open position by a spring (not illustrated) or its own weight.

As illustrated in FIG. 10B, the front door 3 is held by link members 51L and 51R attached to a frame of the apparatus body 2 at the open position. Further, opening and closing, that is, movement, of the front door 3 is detected by a door opening and closing sensor 54.

Next, as illustrated in FIGS. 10B and 10C, the user places his/her hand on the handle portion 41 of the cartridge tray 40 and pulls out the cartridge tray 40 toward the front side with respect to the apparatus body 2, that is, downstream in the X direction. As a result, the process cartridges PY, PM, PC, and PK supported by the cartridge tray 40 are also pulled out toward the front side with respect to the apparatus body 2, that is, downstream in the X direction, and the user can access the process cartridges PY, PM, PC, and PK. The cartridge tray 40 can be pulled out to a position where the four process cartridges PY, PM, PC, and PK can be accessed by the user, and is locked so as not to be pulled out toward the front side from the position. The state in which the cartridge tray 40 is pulled out is a state in which the cartridge tray 40 is pulled out downstream in the X direction from a position where the cartridge tray is mounted on the apparatus body 2 and the image formation can be performed, and a state in which the cartridge tray 40 is supported by the apparatus body 2. That is, the cartridge tray 40 is supported by a rail or the like provided in the apparatus body 2 in a state of being pulled out from the apparatus body 2, and is not separated from the apparatus body 2.

In the present embodiment, the replenishment portion 200 is disposed at a downstream end portion of the process cartridge in the Y direction, but is not limited thereto. For example, the replenishment portion 200 may be disposed at a central portion or an end portion upstream of the process cartridge in the Y direction. When the cartridge tray 40 is pulled out from the apparatus body 2, the cartridge tray 40 is supported from below by the front door 303 positioned at the open position. For this reason, the front door 3 is configured to support the load even when the user pushes the replenishment portion 200 downward at the time of toner replenishment.

As illustrated in FIGS. 10C and 10D, indicators 208Y, 208M, 208C, and 208K corresponding to yellow (Y), magenta (M), cyan (C), and black (K) are provided in the apparatus body 2. More specifically, the apparatus body 2 includes a front surface portion 63 serving as an exterior surface forming a front surface of the exterior of the apparatus body 2 together with the front door 3 positioned at the closed position, and the indicators 208Y, 208M, 208C, and 208K are provided at the front surface portion 63.

The indicators 208Y, 208M, 208C, and 208K are indicating portions that notify the user to which one of the process cartridges PY, PM, PC, and PK the toner can be replenished. In a case of a toner replenishment container such as the replenishment pack 210, it is possible to discharge all the toner in the container to the outside of the container at the time of replenishment, or to discharge the remaining toner at another timing after finishing toner replenishment with some toner remaining in the container. Hereinafter, in the present embodiment, a case of discharging all the toner in the replenishment pack 210 in a single replenishment will be considered.

In this case, the amount of toner that can be additionally stored in the storage portion 9*a* of each process cartridge needs to be larger than the toner capacity of the replenishment pack 210. Therefore, in the present embodiment, an indicator corresponding to a process cartridge whose amount of toner that can be additionally stored in the storage portion 9*a* is larger than the toner capacity of the replenishment pack 210 is lit based on a remaining toner amount detection result of a remaining amount detection unit 62 described below. That is, in a case where the amount of toner that can be added to the storage portion 9*a* is larger than the toner capacity of the replenishment pack 210, toner replenishment can be performed. In other words, when all the toner in the toner container of the new replenishment pack 210 can be supplied to the storage portion 9*a* of the process cartridge, toner replenishment can be performed. By confirming which of the indicators 208Y, 208M, 208C, and 208K is lit, the user can recognize to which process cartridge (PY, PM, PC, or PK) the toner can be replenished without opening the front door 3. This is because the indicators 208Y, 208M, 208C, and 208K are provided at the front surface portion 63 which is a part of the exterior surface of the apparatus body 2. That is, the indicator 208K serving as a first indicating portion can indicate that toner can be replenished to the process cartridge PK, and the indicator 208C serving as a second indicating portion can indicate that toner can be replenished to the process cartridge PC.

Figure 13:
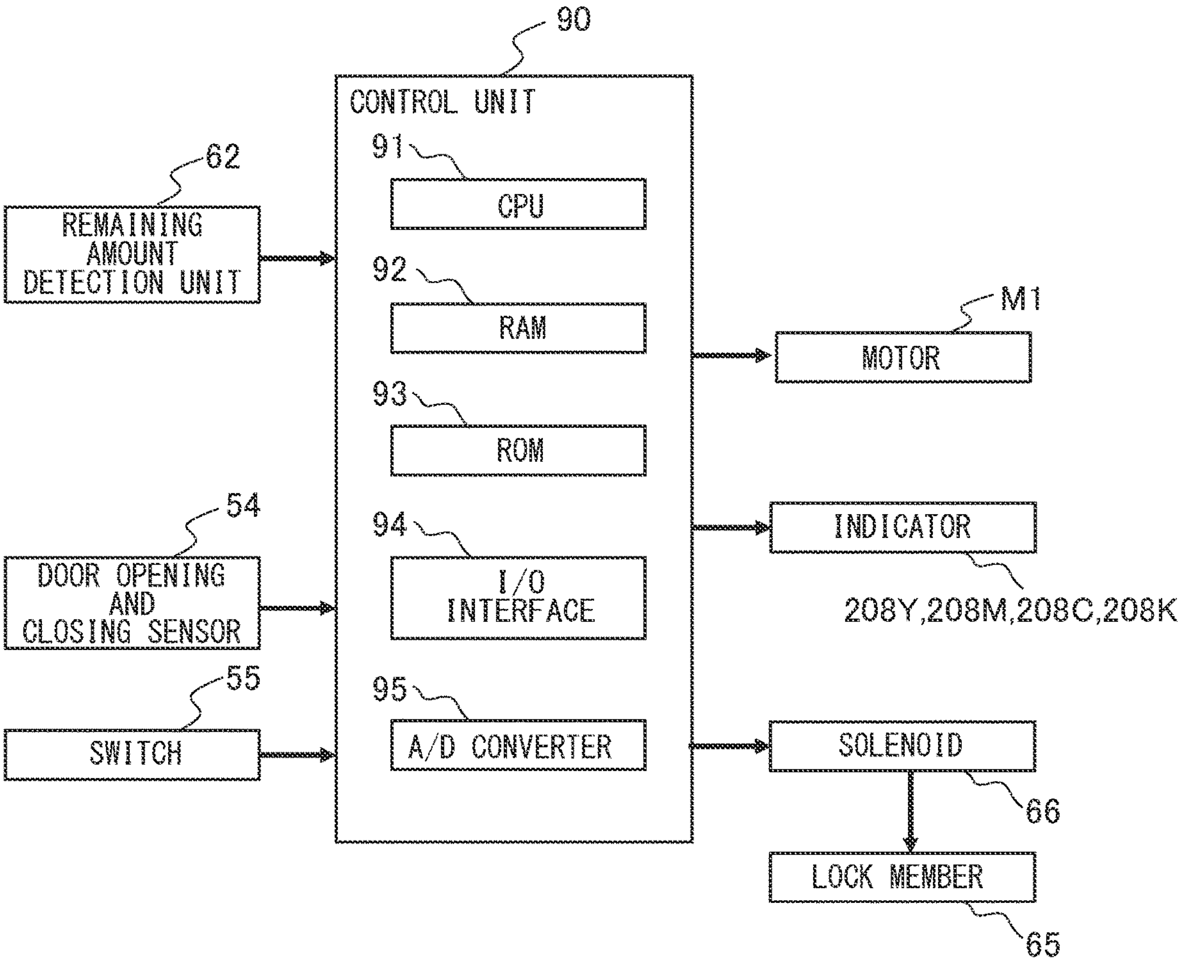
FIG. 13 is a block diagram illustrating a control system of the image forming apparatus according to the first embodiment.

In addition, the replenishment portion 200 includes a lock member 65 (see FIG. 13) that regulates rotation of the lever 201 of the process cartridge that is replenishable with toner, from the operation position to the replenishment position. As illustrated in FIG. 13, the lock member 65 is movable to a locked position where the rotation of the lever 201 is regulated and an unlocked position where the rotation of the lever 201 is not regulated according to the control of a solenoid 66 by a control unit 90.

The control unit 90 controls the solenoid 66 such that the lock member 65 corresponding to the process cartridge that is replenishable with toner is positioned at the unlocked position based on the remaining toner amount detection result of the remaining amount detection unit 62. The control unit 90 controls the solenoid 66 such that the lock member 65 corresponding to the process cartridge that is not replenishable with toner is positioned at the locked position based on the remaining toner amount detection result of the remaining amount detection unit 62. A timing at which the control unit 90 controls the solenoid 66 to change the position of the lock member 65 from the locked position to the unlocked position may be a timing at which the front door 3 is opened or a timing at which the cartridge tray 40 is pulled out. Further, the lock member 65 and the solenoid 66 may be omitted.

Figure 12A:
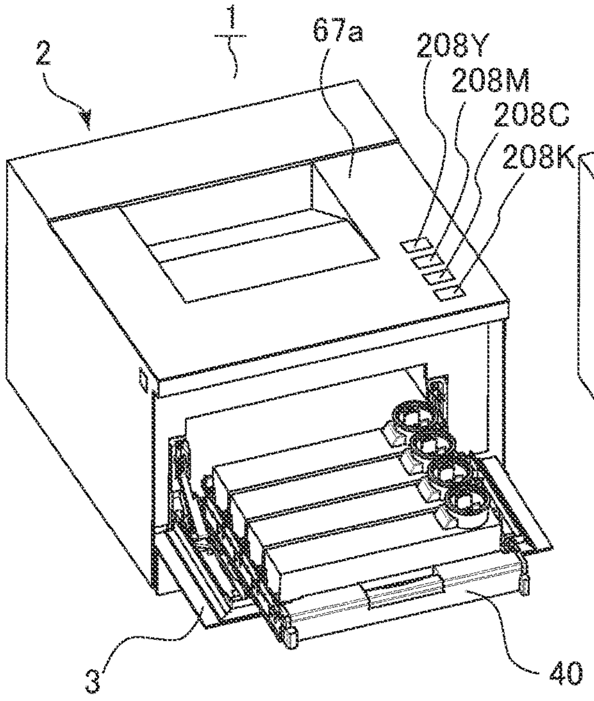
FIG. 12A is a perspective view illustrating a modification of indicator arrangement.
Figure 12B:
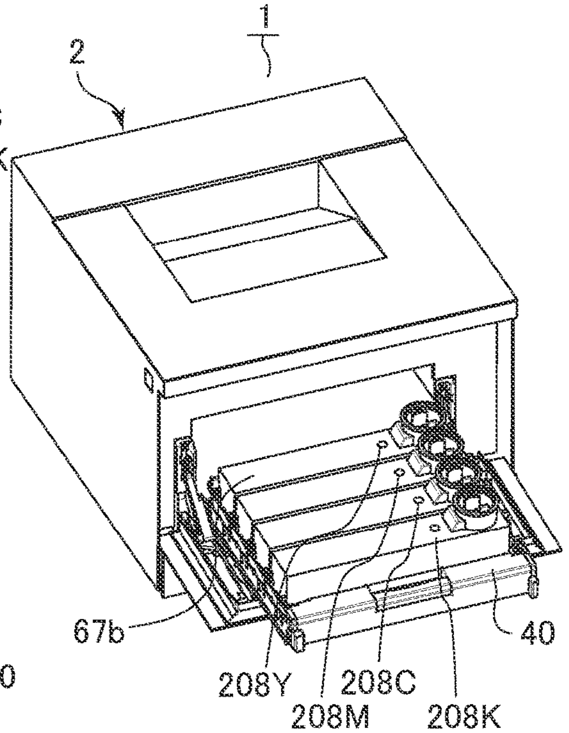
FIG. 12B is a perspective view illustrating a modification of the indicator arrangement.
Figure 12C:
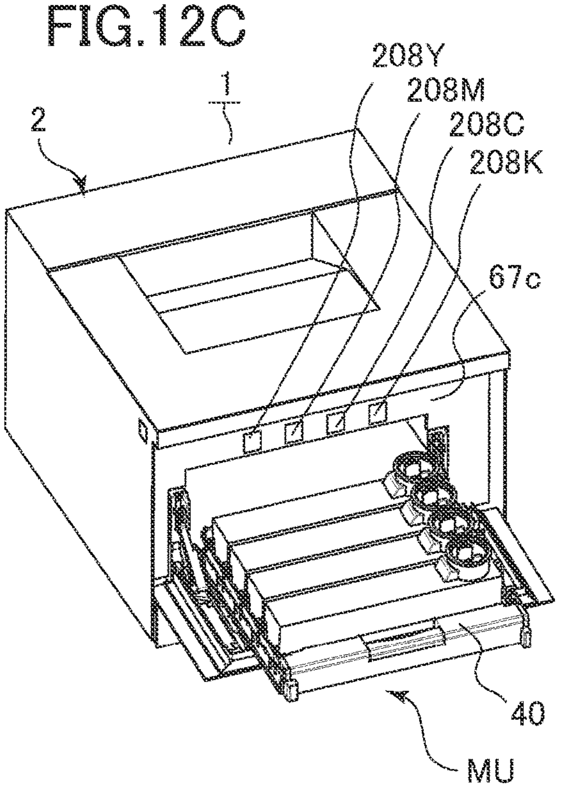
FIG. 12C is a perspective view illustrating a modification of the indicator arrangement.
Figure 12D:
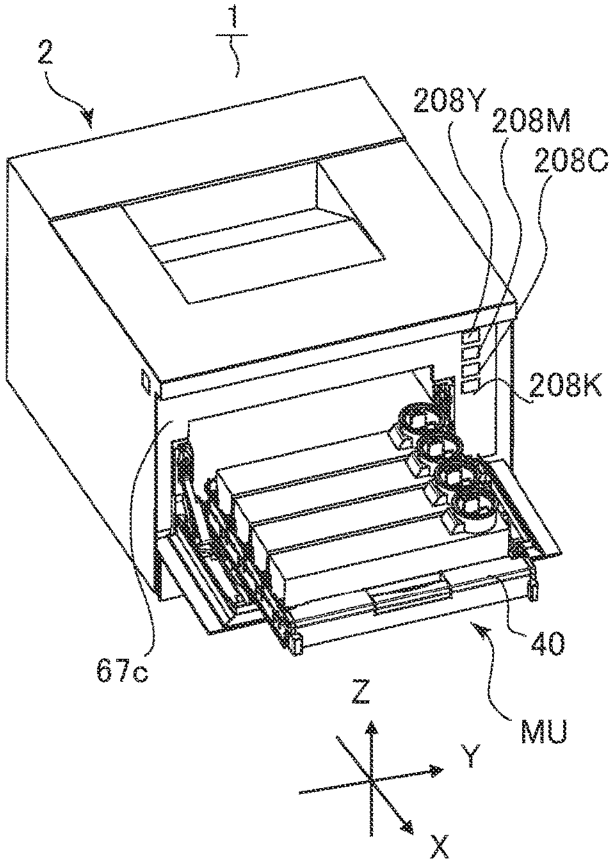
FIG. 12D is a perspective view illustrating a modification of the indicator arrangement.

Modifications of the indicators 208Y, 208M, 208C, and 208K will be described with reference to FIGS. 12A to 12D. As illustrated in FIG. 12A, the indicators 208Y, 208M, 208C, and 208K may be provided side by side in the X direction of the cartridge tray 40 on an upper surface 67*a* of the apparatus body 2. In addition, each of the indicators 208Y, 208M, 208C, and 208K may be provided on an upper surface 67*b* of a corresponding process cartridge as illustrated in FIG. 12B. As illustrated in FIG. 12C, the indicators 208Y, 208M, 208C, and 208K may be arranged side by side in the Y direction on a front-door-facing surface 67*c* of the apparatus body 2. The front-door-facing surface 67*c* is a surface that faces the front door 3 positioned at the closed position and is covered with the front door 3, and is exposed to the outside when the front door 3 is opened to move from the closed position to the open position. As illustrated in FIG. 12D, the indicators 208Y, 208M, 208C, and 208K may be arranged side by side in the Z direction on the front-door-facing surface 67c of the apparatus body 2.

In a case of the configuration illustrated in FIG. 12A, the user can recognize which process cartridge can be replenished with toner without opening the front door 3. In a case of the configuration illustrated in FIGS. 12C and 12D, the user can recognize which process cartridge can be replenished with toner without pulling out the cartridge tray 40. Further, in a case of the configuration illustrated in FIG. 12B, the user can recognize which process cartridge can be replenished with toner without mounting the replenishment pack 210 or moving the lever 201.

The arrangement of the indicators 208Y, 208M, 208C, and 208K is not limited to the arrangements illustrated in FIGS. 10D and 12A to 12D. The indicators 208Y, 208M, 208C, and 208K may have any configuration or arrangement as long as the user can recognize which process cartridge can be replenished with toner before performing toner replenishment. Four indicators 208Y, 208M, 208C, and 208K are provided so as to correspond to the corresponding four process cartridges PY, PM, PC, and PK, but are not limited thereto. For example, indicators each including one liquid crystal panel or the like can be lit in colors corresponding to the respective process cartridges PY, PM, PC, and PK. In addition, a message or image indicating a process cartridge that is replenishable with toner may be displayed on an external PC connected to the control unit 90.

Figure 23:
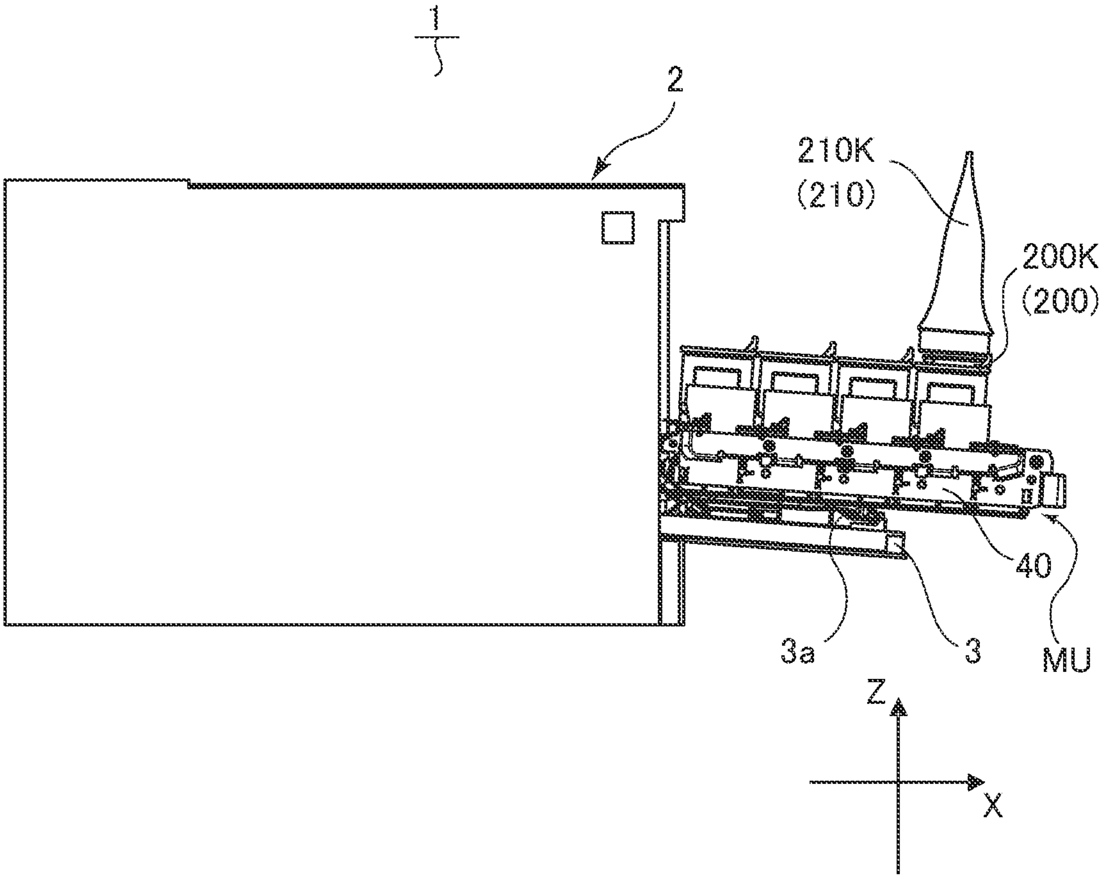
FIG. 23 is a side view illustrating a supporting portion of the front door.

The description returns to the toner replenishment operation. As illustrated in FIG. 10D, the user mounts the replenishment pack 210 (the replenishment pack 210K in FIG. 10D) to the replenishment portion 200 of any process cartridge (the process cartridge PK in FIG. 10D) supported by the cartridge tray 40. At this time, as illustrated in FIG. 23, the cartridge tray 40 is supported from below by a supporting portion 3a of the front door 3 positioned at the open position. Therefore, the cartridge tray 40 can be prevented from being bent downward when mounting the replenishment pack 210 on the replenishment portion 200, and the replenishment pack 210 can be stably mounted on the replenishment portion 200.

As illustrated in FIGS. 11A and 11B, when mounting the replenishment pack 210 on the replenishment portion 200 of the image forming apparatus 1, it is necessary to align the replenishment pack 210 with the replenishment portion 200 at two points. This alignment is alignment in the rotation direction around the rotational axis RA and is enabled with the container shutter 214 at the closed position. The alignment at the first point is, as illustrated in FIG. 11A, alignment of the rotation-regulated portion 212b of the insertion portion 212 exposed from the container shutter opening 214c of the container shutter 214 and the rotation regulation portion 247a of the rotation regulation member 247. The alignment at the second point is alignment of the container shutter engaged portion 214b and the lever engagement portion 201d as illustrated in FIG. 11B. In a case where the alignment at the second point is enabled, the container shutter engaged portion 214b and the body shutter engagement portion 206b can also be aligned with each other. This is because the lever engagement portion 201d and the body shutter engagement portion 206b overlap each other when viewed in the direction of the rotational axis RA.

In a state in which the mounting of the replenishment pack 210 on the replenishment portion 200 is completed, the container shutter engaged portion 214b is engaged with the lever engagement portion 201d and is engaged with the body shutter engagement portion 206b of the body shutter 206. The rotation-regulated portion 212b of the insertion portion 212 is engaged with the rotation regulation portion 247a. In this state, when the user grips the grip portion 201b and rotates the lever 201 clockwise by 90 degrees, the lever 201 is rotated from the operation position to the replenishment position with respect to the insertion portion 212.

At this time, as the container shutter engaged portion 214b is pushed by the lever engagement portion 201d, the container shutter 214 is rotated from the closed position to the open position together with the lever 201. As the body shutter engagement portion 206b is pushed by the container shutter engaged portion 214b, the body shutter 206 is rotated from the closed position to the open position together with the lever 201 and the container shutter 214. As described above, since the body shutter 206 is configured to be rotated by the lever 201 via the container shutter 214, the body shutter 206 does not rotate even when the lever 201 is rotated from the operation position to the replenishment position in a state in which the replenishment pack 210 is not mounted on the replenishment portion 200. Therefore, the body shutter 206 is not opened even when the lever 201 is operated by the user in a state in which the replenishment pack 210 is not mounted.

When the lever 201 is at the replenishment position in a state in which the replenishment pack 210 is mounted on the replenishment portion 200, both the container shutter 214 and the body shutter 206 are at the open positions, and the container shutter opening 214c and the body shutter opening 206a communicate with each other. In this state, when the user releases the pouch 211 with his/her hand, the toner in the pouch 211 moves toward the insertion portion 212 together with air. Then, the toner moved into the insertion portion 212 passes through the insertion portion opening 212a, the container shutter opening 214c, and the body shutter opening 206a, and is replenished to the storage portion 9a of the developing apparatus 9.

When separating the replenishment pack 210 from the replenishment portion 200 after toner replenishment is completed, the user grips the grip portion 201b and rotates the lever 201 counterclockwise by 90 degrees. With this operation, the lever 201 is rotated from the replenishment position to the operation position with respect to the insertion portion 212. At this time, as the container shutter engaged portion 214b is pushed by the lever engagement portion 201d, the container shutter 214 is rotated from the open position to the closed position together with the lever 201. As the body shutter engagement portion 206b is pushed by the container shutter engaged portion 214b, the body shutter 206 is rotated from the open position to the closed position together with the lever 201 and the container shutter 214. The replenishment pack 210 is separated from the replenishment portion 200 in a state in which the lever 201 is at the operation position. In a state in which the replenishment pack 210 is separated from the replenishment portion 200, the container shutter 214 is positioned at the closed position, and thus, it is possible to prevent toner leakage from the insertion portion opening 212a of the replenishment pack 210.

Remaining Amount Detection Unit

Next, the remaining amount detection unit 62 for detecting the remaining amount of toner stored in the storage portion 9a of the developing apparatus 9 will be described with reference to FIG. 3. As illustrated in FIG. 3, the process cartridge PY includes the remaining amount detection unit 62, and the remaining amount detection unit 62 serving as a first detection unit includes a light emitting portion 62a and a light receiving portion 62b. The light emitting portion 62a and the light receiving portion 62b are arranged side by side in the X direction. Light emitted from the light emitting portion 62*a* passes through the inside of the storage portion 9*a* and is received by the light receiving portion 62*b*. That is, the light emitting portion 62*a* and the light receiving portion 62*b* form an optical path Q1 inside the storage portion 9*a*. The optical path Q1 extends in the X direction. Furthermore, the light emitting portion 62*a* and the light receiving portion 62*b* are provided at a central portion of the storage portion 9*a* in the Y direction. As the light emitting portion 62*a* and the light receiving portion 62*b* are provided at the central portion of the storage portion 9*a* as described above, the remaining amount of toner in the storage portion 9*a* can be satisfactorily detected. That is, a developer (toner) may be unevenly distributed at an end portion of the storage portion 9*a* in the Y direction, but since there is less uneven distribution of the developer at the central portion of the storage portion 9*a*, the actual remaining amount of toner can be detected.

In the light emitting portion 62*a* and the light receiving portion 62*b*, a light emitting element and a light receiving element may be disposed inside the storage portion 9*a* or the light emitting element and the light receiving element may be disposed outside the storage portion 9*a*, and light may be guided into and out of the storage portion 9*a* by a light guide portion. Furthermore, in the present embodiment, the light emitting portion 62*a* and the light receiving portion 62*b* are arranged side by side in the X direction, but are not limited thereto. For example, the light emitting portion 62*a* and the light receiving portion 62*b* may be arranged side by side in the Y direction.

In the present embodiment, a light emitting diode (LED) is used for the light emitting portion 62*a*, and a phototransistor turned on by light from the LED is used for the light receiving portion 62*b*. However, the light emitting portion 62*a* and the light receiving portion 62*b* are not limited thereto. For example, a halogen lamp or a fluorescent lamp may be applied to the light emitting portion 62*a*, and a photodiode or an avalanche photodiode may be applied to the light receiving portion 62*b*.

The light receiving portion 62*b* that is a phototransistor receives light emitted from the light emitting portion 62*a*, and outputs a signal (current) corresponding to the amount of received light. This signal is converted into a voltage and input to the control unit 90 (see FIG. 13). That is, the light receiving portion 62*b* outputs an output value based on the amount of toner (developer) stored in the storage portion 9*a*.

As illustrated in FIG. 3, the stirring member 34 that rotates around a rotation shaft 60*a* extending in the Y direction is provided inside the storage portion 9*a*. The stirring member 34 includes a blade portion 34*b* fixed to a rotation shaft 34*a*, and rotates by being driven by a motor M1 (see FIG. 13), thereby stirring and evenly distributing toner in the storage portion 9*a* replenished from the replenishment pack 210, and conveying the toner toward the developing roller 6. In the present embodiment, the stirring member 34 includes the rotation shaft 34*a* and the blade portion 34*b*, but a spiral stirring member may also be used as a component for spreading toner over the entire length of the storage portion 9*a*.

The stirring member 34 serves to circulate toner that is not used for development and is peeled off from the developing roller 6 in the storage portion 9*a* and uniformizing the toner in the storage portion 9*a*. The stirring member 34 is not limited to a rotating member. For example, a stirring member that swings may be employed. In addition to the stirring member 34, another stirring member may be provided in the storage portion 9*a*.

Control System of Image Forming Apparatus

FIG. 13 is a block diagram illustrating a control system of the image forming apparatus 1. The control unit 90 of the image forming apparatus 1 includes a central processing unit (CPU) 91 serving as an arithmetic device, a random access memory (RAM) 92 used as a work area of the CPU 91, and a read-only memory (ROM) 93 that stores various programs. In addition, the control unit 90 includes an input/output (I/O) interface 94 serving as an input/output port connected to an external device, and an analog/digital (A/D) converter 95 that converts an analog signal into a digital signal.

The remaining amount detection unit 62, the door opening and closing sensor 54, and the switch 55 are connected to an input side of the control unit 90. The door opening and closing sensor 54 or the switch 55 is implemented by, for example, a photointerrupter, a pressure sensitive switch, or a magnetic sensor.

The CPU 91 of the control unit 90 determines whether or not the light receiving portion 62*b* has received light from the light emitting portion 62*a* based on a voltage level input to the remaining amount detection unit 62. Then, the CPU 91 calculates a light detection time of the remaining amount detection unit 62 when the toner in the storage portion 9*a* is stirred by the stirring member 34 for a certain period of time. The ROM 93 stores, as a table, a remaining toner amount determination threshold for determining the remaining toner amount based on the light detection time of the remaining amount detection unit 62 in advance. The CPU 91 calculates (predicts) the remaining toner amount in the storage portion 9*a* based on the light detection time of the remaining amount detection unit 62 and the remaining toner amount determination threshold stored in the table. Then, the CPU 91 records the calculated remaining toner amount in the RAM 92.

A method of detecting and estimating the remaining toner amount is not limited to the above-described method, and various known methods of detecting and estimating the remaining toner amount can be adopted. For example, two or more metal plates or conductive resin sheets extending in a longitudinal direction of the developing roller may be disposed on an inner wall of the storage portion 9*a*, an electrostatic capacitance between the two metal plates or conductive resin sheets may be measured to thereby detect and estimate the remaining toner amount. Alternatively, a load cell may be provided to support the developing apparatus 9 from below, and the remaining toner amount may be calculated based on the weight measured by the load cell.

The motor M1, the indicators 208Y, 208M, 208C, and 208K, and the solenoid 66 are connected to an output side of the control unit 90. The motor M1 serving as an actuator supplies a driving force to the process cartridges PY, PM, PC, and PK and various rollers in the apparatus body 2. More specifically, the motor M1 drives the photosensitive drum 4 of each process cartridge, the charging roller 5, the developing roller 6, the stirring member 34, and the like.

In the present embodiment, all the rollers in the image forming apparatus 1 and the stirring member 34 are driven by one motor M1, but the driving source of the roller and the stirring member 34 is not limited thereto. For example, the stirring member 34 and some rollers in the image forming apparatus 1 may be driven by the motor M1, and the other rollers may be driven by another motor. Alternatively, the motor M1 may be directly connected to all the rollers by a drive transmission member such as a gear, and an electromagnetic clutch may be provided between the motor M1 and the stirring member 34. In this case, the electromagnetic clutch serves as an actuator that activates or deactivates the driving of the stirring member 34.

As described above, in the present embodiment, the toner replenishment operation is performed as follows. That is, after opening the front door 3, the user pulls out the cartridge tray 40 that detachably supports a plurality of process cartridges storing different colors of toner from the apparatus body 2. Then, the user mounts the replenishment pack 210 on the replenishment portion 200 of any process cartridge supported by the cartridge tray 40, and discharges the toner from the replenishment pack 210 to the replenishment portion 200 to perform toner replenishment. The state in which the cartridge tray 40 is pulled out is a state in which the cartridge tray 40 is pulled out downstream in the X direction from a position where the cartridge tray is mounted on the apparatus body 2 and the image formation can be performed, and a state in which the cartridge tray 40 is supported by the apparatus body 2.

In other words, the replenishment pack 210K serving as a first toner container stores toner of black serving as a first color, and the replenishment pack 210C serving as a second toner container stores toner of cyan serving as a second color different from black. The process cartridge PK serving as a first developing unit can be replenished with toner from the replenishment pack 210K in a state in which the cartridge tray 40 is pulled out from the apparatus body 2 and the process cartridge PK is supported by the cartridge tray 40. The process cartridge PC serving as a second developing unit can be replenished with toner from the replenishment pack 210C in a state in which the cartridge tray 40 is pulled out from the apparatus body 2 and the process cartridge PC is supported by the cartridge tray 40. In other words, the process cartridges PC and PK are configured to be replenished with toner from the replenishment packs 210C and 210K mounted on the image forming apparatus 1, respectively, when the moving unit MU is at the external position and supported by the apparatus body 2. In addition, the moving unit MU is configured so as not to be movable from the external position to the internal position in a state in which the replenishment packs 210C and 210K are mounted on the image forming apparatus 1. Further, the replenishment port 204 serving as a first replenishment port of the replenishment portion 200K and the replenishment port 204 serving as a second replenishment port of the replenishment portion 200C are exposed when the cartridge tray 40 is pulled out from the apparatus body 2. At this time, the cartridge tray 40 is supported by a rail member (not illustrated) or the like of the apparatus body 2 and is not separated from the apparatus body 2.

As described above, also in the image forming apparatus 1 including the plurality of process cartridges PY, PM, PC, and PK, the replenishment pack 210 can be mounted on the process cartridge supported by the cartridge tray 40 pulled out. For example, when replenishing toner to two or more of the process cartridges PY, PM, PC, and PK, the replenishment portions 200 of all the process cartridges PY, PM, PC, and PK can be accessed only by pulling out the cartridge tray 40 once. Therefore, it is not necessary to insert and remove the process cartridges PY, PM, PC, and PK into and from the apparatus body 2 one by one, and toner replenishment can be easily performed. Accordingly, usability related to toner replenishment can be improved. In addition, it is possible to provide an embodiment of the image forming apparatus 1 including the plurality of process cartridges PY, PM, PC, and PK that are replenishable with toner by the replenishment pack.

Second Embodiment

Next, a second embodiment of the present invention will be described. In the second embodiment, a plurality of body mounting portions for mounting replenishment packs 210 are provided in an apparatus body 2B. Therefore, a configuration similar to that of the first embodiment will be described in a manner of omitting illustration or attaching the same reference numerals in the drawings.

Toner Replenishment Operation

Figure 14A:
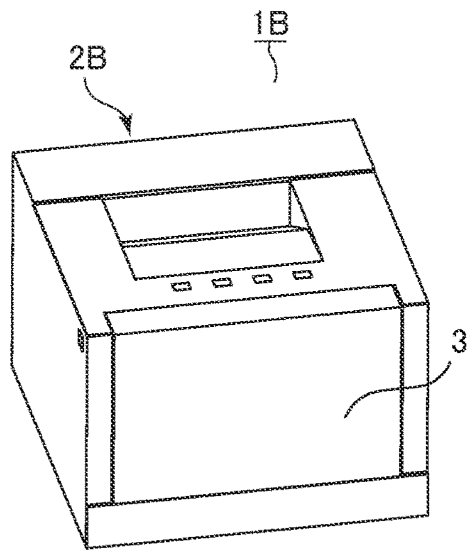
FIG. 14A is a perspective view illustrating an image forming apparatus according to a second embodiment in a state in which a front door is closed.
Figure 14B:
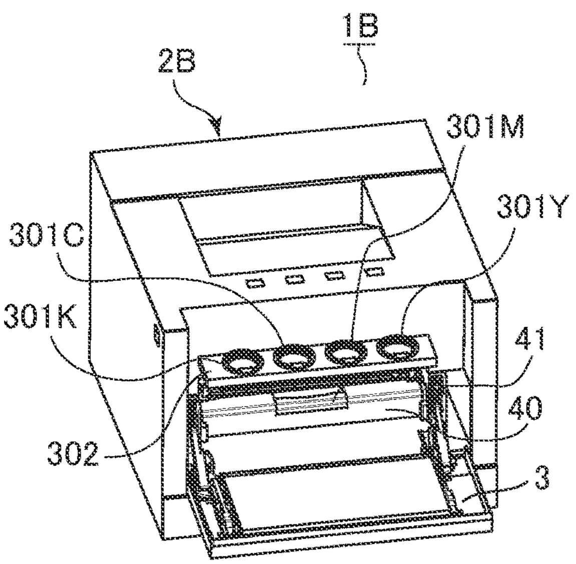
FIG. 14B is a perspective view illustrating the image forming apparatus in a state in which the front door is opened.
Figure 14C:
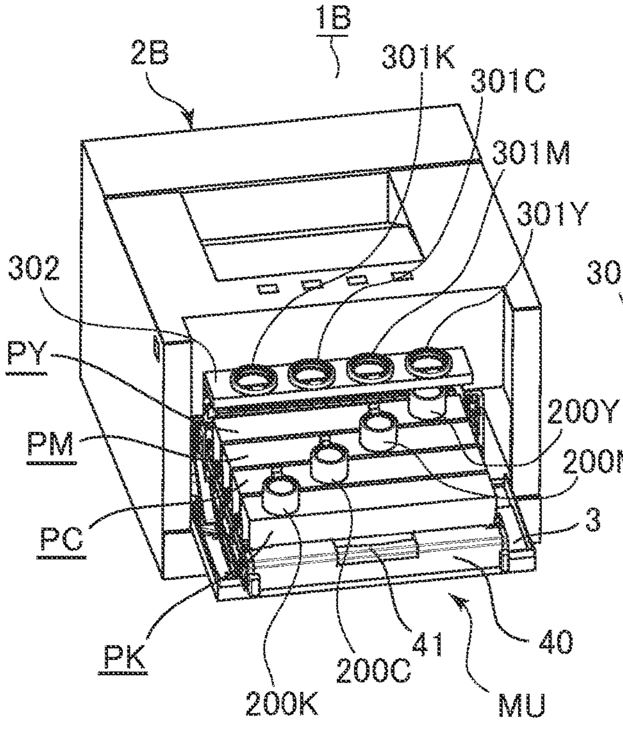
FIG. 14C is a perspective view illustrating the image forming apparatus in a state in which a cartridge tray is pulled out.
Figure 14D:
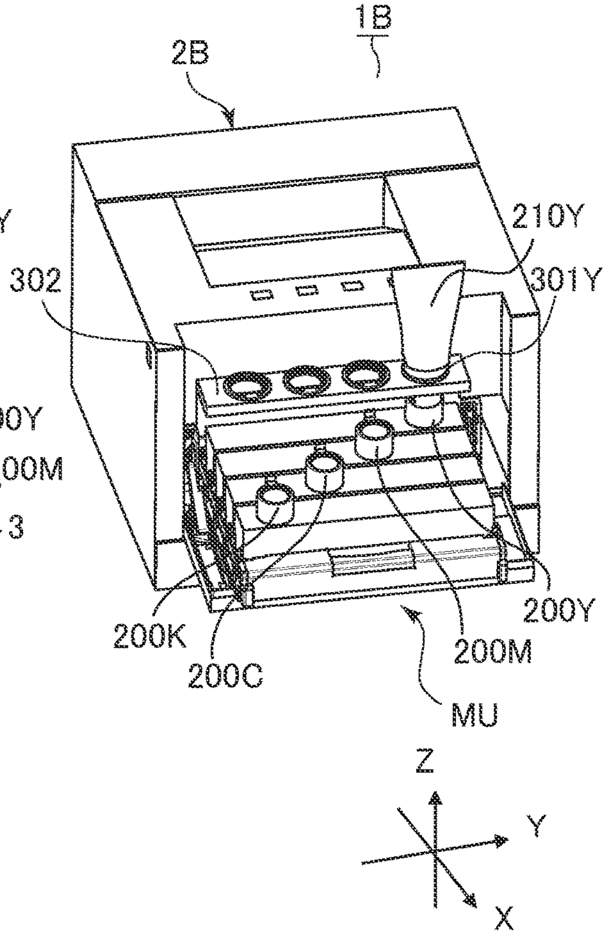
FIG. 14D is a perspective view illustrating a state in which a replenishment pack is mounted on a replenishment port.

FIG. 14A is a perspective view illustrating an image forming apparatus 1B according to the second embodiment in a state in which a front door 3 is positioned at a closed position, and FIG. 14B is a perspective view illustrating the image forming apparatus 1B in a state in which the front door 3 is positioned at an open position. FIG. 14C is a perspective view illustrating the image forming apparatus 1B in a state in which a cartridge tray 40 is pulled out, and FIG. 14D is a perspective view illustrating the image forming apparatus 1B in a state in which the replenishment pack 210Y is mounted on a process cartridge PY.

As illustrated in FIGS. 14A and 14B, in a case of replenishing toner, the user first moves the front door 3 from the closed position to the open position. In the present embodiment, when the front door 3 is opened to move from the closed position to the open position, body mounting portions 301Y, 301M, 301C, and 301K provided on a replenishment table 302 of the apparatus body 2B are exposed. The replenishment table 302 is fixed to, for example, a frame of the apparatus body 2B, and the body mounting portions 301Y, 301M, 301C, and 301K provided on the replenishment table 302 are arranged side by side in a Y direction.

The body mounting portions 301Y, 301M, 301C, and 301K correspond to replenishment portions 200Y, 200M, 200C, and 200K of process cartridges PY, PM, PC, and PK, respectively. In the present embodiment, as illustrated in FIG. 14C, the replenishment portions 200Y, 200M, 200C, and 200K of the process cartridges PY, PM, PC, and PK are arranged obliquely with respect to an X direction and the Y direction. The replenishment portions 200Y, 200M, 200C, and 200K are positioned at different positions in the Y direction.

Next, as illustrated in FIGS. 14B and 14C, the user places his/her hand on a handle portion 41 of the cartridge tray 40 and pulls out the cartridge tray 40 toward the front side with respect to the apparatus body 2B, that is, downstream in the X direction. As a result, the process cartridges PY, PM, PC, and PK supported by the cartridge tray 40 are also pulled out toward the front side with respect to the apparatus body 2B, that is, downstream in the X direction, and the user can access the process cartridges PY, PM, PC, and PK.

FIG. 14D illustrates, as an example, a state in which toner is replenished from a replenishment pack 210Y to the yellow (Y) process cartridge PY. As illustrated in FIG. 14D, when replenishing toner to the process cartridge PY, the cartridge tray 40 is pulled out to a position where the replenishment portion 200Y of the process cartridge PY and the body mounting portion 301Y overlap each other in a Z direction. In this state, the user mounts the replenishment pack 210Y on the body mounting portion 301Y. At this time, the replenishment pack 210Y is positioned in a mounting direction of the replenishment pack 210Y by abutting the replenishment table 302. Specifically, a flange portion 212*f* (see FIG. 15C) formed integrally with an insertion portion 212 of the replenishment pack 210Y abuts an edge portion of the body mounting portion 301Y or an upper surface 302*a* of the replenishment table 302, whereby the replenishment pack 210Y is positioned in the mounting direction (a direction of a rotational axis RA) with respect to the replenishment table 302. The replenishment pack 210Y is inserted into the replenishment portion 200Y positioned below the body mounting portion 301Y in a state of being positioned with respect to the replenishment table 302.

That is, when the replenishment pack 210Y is mounted on the replenishment portion 200Y, the replenishment table 302 receives a force from the replenishment pack 210Y, and thus, the force received by the replenishment portion 200Y of the process cartridge PY supported by the cartridge tray 40 from the replenishment pack 210Y can be reduced. Then, toner is replenished to the replenishment portion 200Y from the replenishment pack 210Y mounted on the body mounting portion 301Y.

A toner replenishment operation for the replenishment portion 200Y is performed by rotating a lever 201 (see FIG. 11B) of the replenishment portion 200Y from an operation position to a replenishment position as in the first embodiment, but is not limited thereto. For example, when the replenishment pack 210Y is inserted into the replenishment portion 200Y, toner may be replenished from the replenishment pack 210Y to the replenishment portion 200Y without rotating the lever 201. That is, the lever 201, a container shutter 214 of the replenishment pack 210Y, and a body shutter 206 of the replenishment portion 200Y may be omitted. In this case, it is preferable to attach a removable cap to the replenishment pack 210Y so that toner in the replenishment pack 210Y does not leak to the outside in a state in which the cap is attached.

Mounting Portion Shutter

Figure 15A:
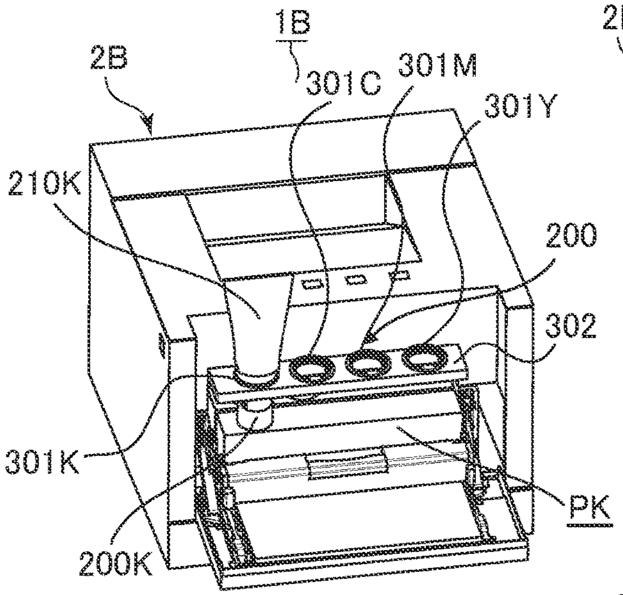
FIG. 15A is a perspective view illustrating a state in which the replenishment pack is mounted on the replenishment port provided in an apparatus body.
Figure 15B:
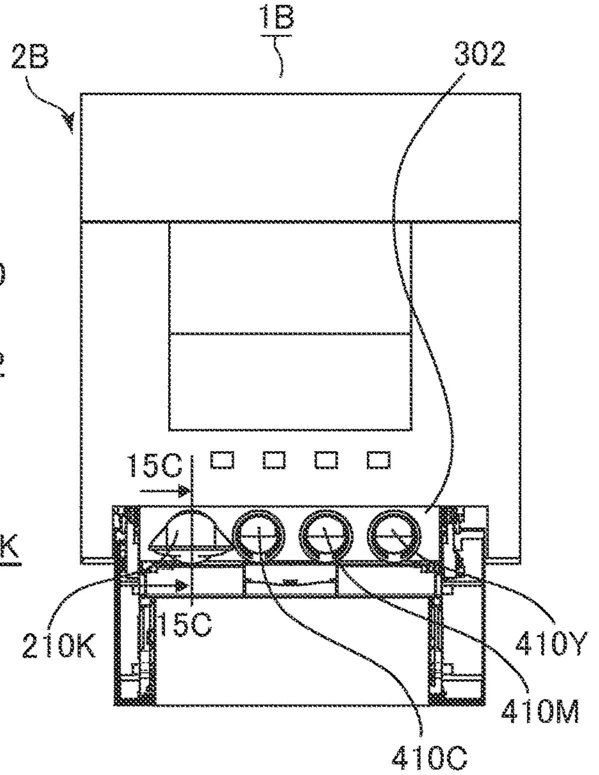
FIG. 15B is a plan view illustrating a state in which the replenishment pack is mounted on the replenishment port provided in the apparatus body.
Figure 15C:
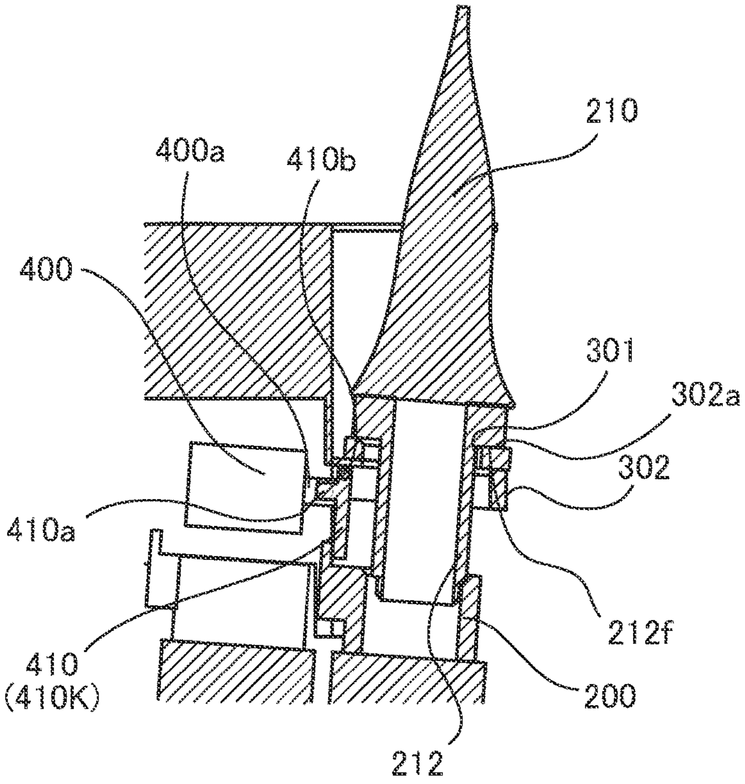
FIG. 15C is a cross-sectional view taken along line 15C-15C of FIG. 15B.
Figure 16A:
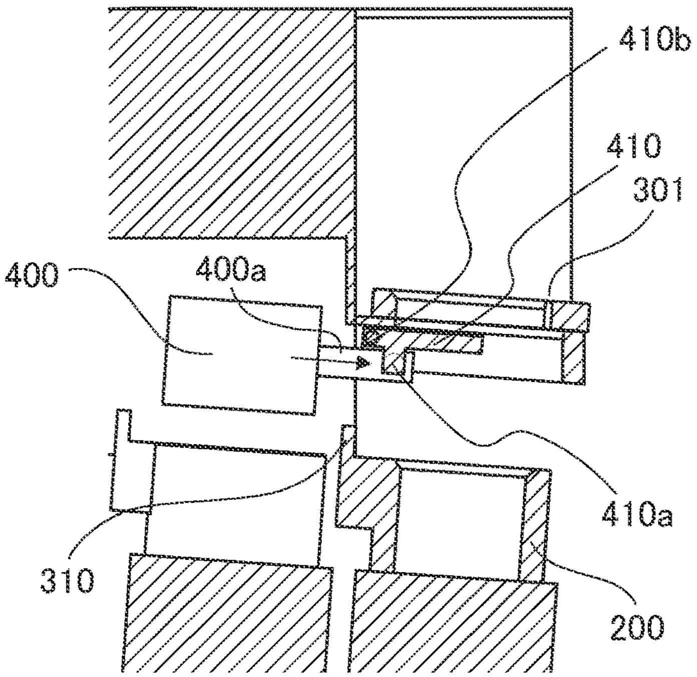
FIG. 16A is a cross-sectional view illustrating a state in which a mounting portion shutter is positioned at a closed position.

Next, a mounting portion shutter 410 will be described with reference to FIGS. 15A to 16B. FIG. 15A is a perspective view illustrating a state in which a replenishment pack 210K is mounted on the body mounting portion 301K provided in the apparatus body 2B. FIG. 15B is a plan view illustrating a state in which the replenishment pack 210K is mounted on the body mounting portion 301K provided in the apparatus body 2B, and FIG. 15C is a cross-sectional view taken along line 15C-15C of FIG. 15B. FIG. 16A is a cross-sectional view illustrating a state in which the mounting portion shutter 410 is positioned at a closed position, and FIG. 16B is a cross-sectional view illustrating a state in which the mounting portion shutter 410 is positioned at an open position.

A case where the replenishment pack 210K of black (K) is mounted on the body mounting portion 301K as illustrated in FIGS. 15A and 15B will be described as an example. The body mounting portions 301Y, 301M, 301C, and 301K have the same configuration except that colors of toner to be replenished are different. Therefore, in a case where the body mounting portions 301Y, 301M, 301C, and 301K are not particularly distinguished from one another, reference characters "Y", "M", "C", and "K" are omitted, and the body mounting portions 301Y, 301M, 301C, and 301K will be described as the body mounting portions 301 below. Similarly, mounting portion shutters 410Y, 410M, 410C, and 410K provided in the body mounting portions 301Y, 301M, 301C, and 301K also have the same configuration. Therefore, in a case where the mounting portion shutters 410Y, 410M, 410C, and 410K are not particularly distinguished from one another, reference characters "Y", "M", "C", and "K" are omitted, and the mounting portion shutters 410Y, 410M, 410C, and 410K will be described as the mounting portion shutters 410 below.

Figure 17:
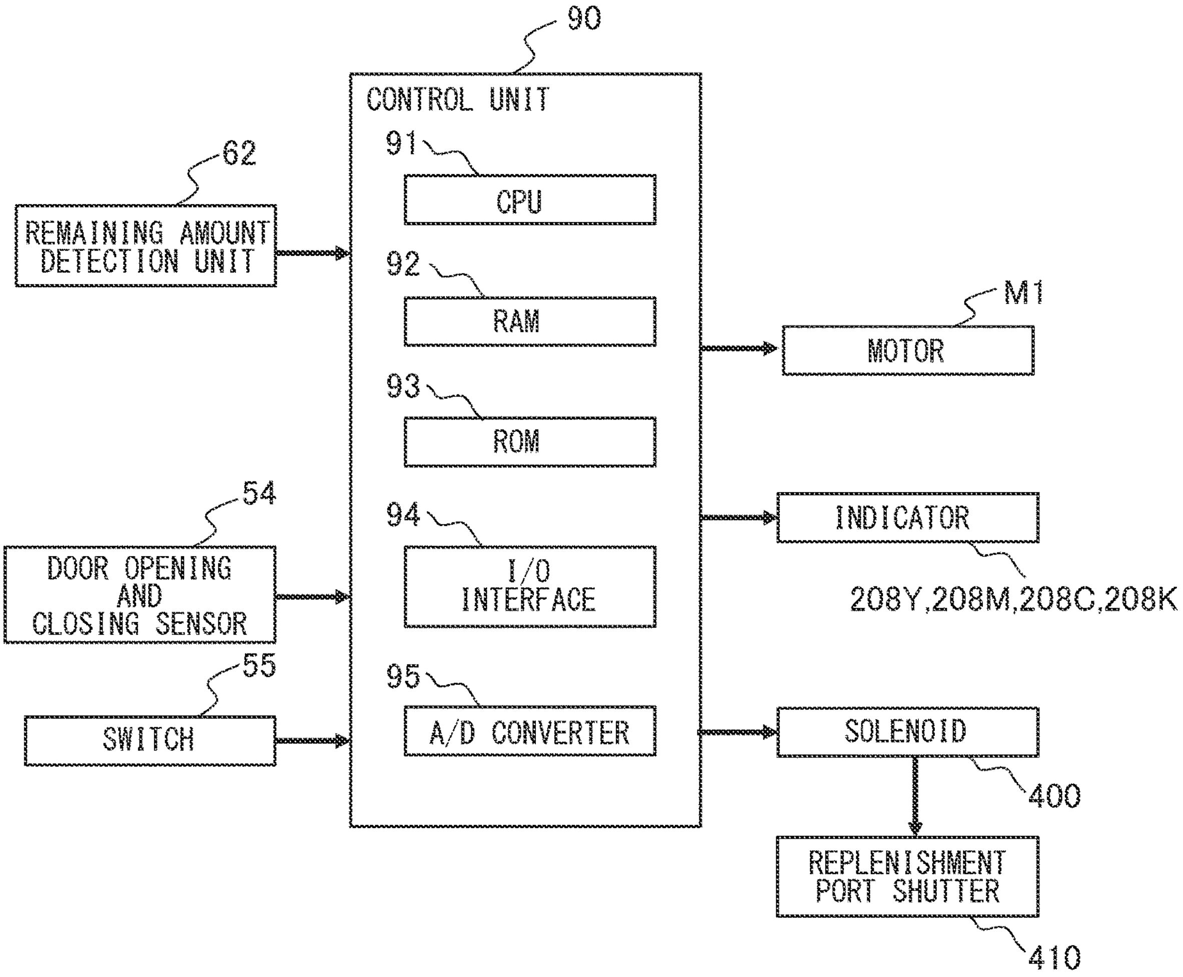
FIG. 17 is a block diagram illustrating a control system of the image forming apparatus according to the second embodiment.

As illustrated in FIGS. 15A to 15C, the mounting portion shutter 410 is disposed in the vicinity of each body mounting portion 301. The mounting portion shutter 410 is rotatably supported by the replenishment table 302 around a rotating shaft 410*b*. A plunger 400*a* of a solenoid 400 is connected to a boss portion 410*a* of the mounting portion shutter 410, and the mounting portion shutter 410 is opened and closed to move between the open position and the closed position by the operation of the solenoid 400. The mounting portion shutter 410 covers at least a part of the body mounting portion 301 at the closed position, and regulates mounting of the replenishment pack 210 on the body mounting portion 301. Further, the mounting portion shutter 410 opens the body mounting portion 301 at the open position and allows mounting of the replenishment pack 210 on the body mounting portion 301. As illustrated in FIG. 17, in the present embodiment, the solenoid 400 is provided instead of the solenoid 66 of the first embodiment. Further, a lock member 65 of the first embodiment is omitted. In addition, four solenoids 400 are provided so as to correspond to the mounting portion shutters 410Y, 410M, 410C, and 410K, respectively.

Figure 16B:
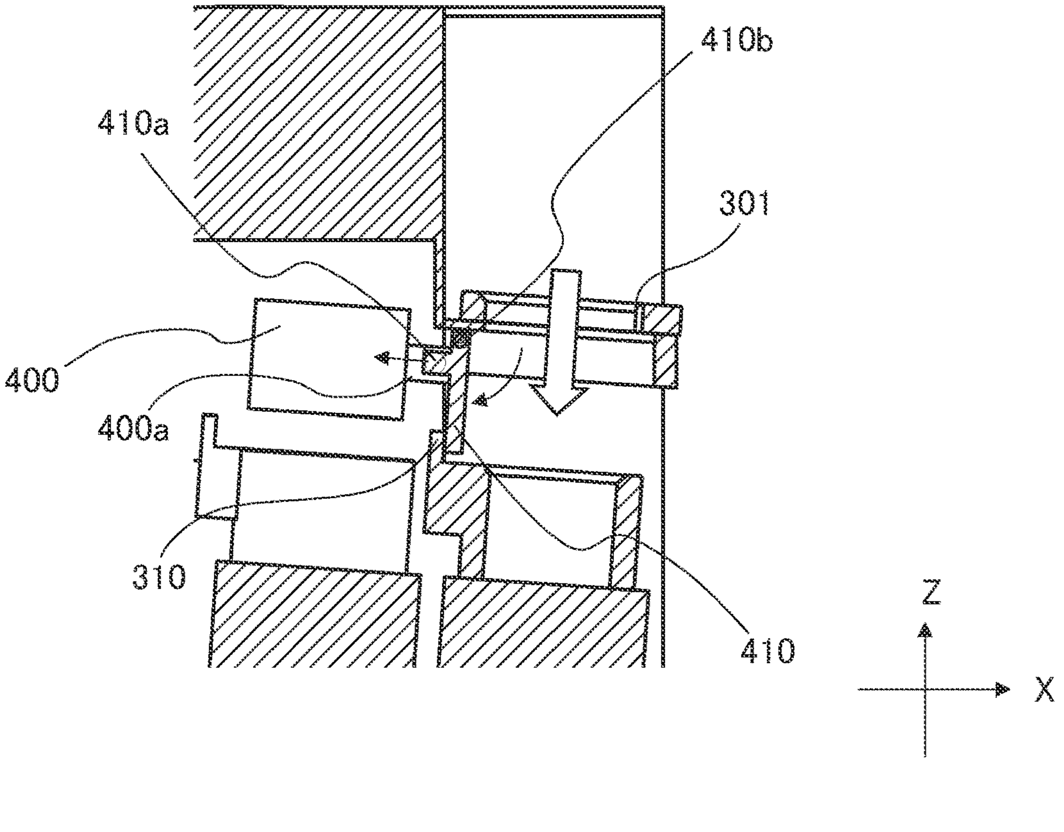
FIG. 16B is a cross-sectional view illustrating a state in which the mounting portion shutter is positioned at an open position.

A control unit 90 (see FIG. 17) controls the solenoid 400 so as to rotate the mounting portion shutter 410 corresponding to a process cartridge that is replenishable with toner from the closed position illustrated in FIG. 16A to the open position illustrated in FIG. 16B. A timing at which the control unit 90 controls the solenoid 400 to change the position of the mounting portion shutter 410 from the closed position to the open position may be a timing at which the front door 3 is opened or a timing at which the cartridge tray 40 is pulled out.

As illustrated in FIGS. 16A and 16B, the replenishment portion 200 includes a projecting portion 310 projecting upward. As illustrated in FIG. 16A, when the mounting portion shutter 410 is positioned at the closed position, the projecting portion 310 provided in the replenishment portion 200 does not interfere with the mounting portion shutter 410 even when the cartridge tray 40 is inserted into and removed from the apparatus body 2B. On the other hand, as illustrated in FIG. 16B, when the mounting portion shutter 410 is positioned at the open position, the projecting portion 310 provided in the replenishment portion 200 abuts the mounting portion shutter 410 when the cartridge tray 40 is pulled out from the apparatus body 2B.

As a result, further pulling out the cartridge tray 40 toward the front side, that is, downstream in the X direction is regulated, so that the cartridge tray 40 is positioned. In this manner, the mounting portion shutter 410 positioned at the open position and the projecting portion 310 provided in the replenishment portion 200 corresponding to the mounting portion shutter 410 abut each other, whereby the body mounting portion 301 and the replenishment portion 200 can be easily aligned. The user may arbitrarily select a process cartridge to be replenished with toner from among process cartridges that are replenishable with toner through an operation panel (not illustrated) or the like. In this case, only the mounting portion shutter 410 corresponding to the selected process cartridge may be rotated from the closed position to the open position.

When separating the replenishment pack 210 from the replenishment portion 200 after toner replenishment is completed, the user rotates the lever 201 from the replenishment position to the operation position. When it is detected by a switch 55 that the lever 201 has been rotated from the replenishment position to the operation position and the replenishment pack 210 is pulled out from a replenishment port 401, the control unit 90 controls the solenoid 400 to rotate the mounting portion shutter 410 from the open position to the closed position. As the mounting portion shutter 410 is positioned at the closed position, the cartridge tray 40 can be mounted on the apparatus body 2B upstream in the X direction.

As described above, in the present embodiment, the body mounting portions 301Y, 301M, 301C, and 301K are provided in the apparatus body 2B, and the replenishment packs 210Y, 210M, 210C, and 210K are mounted on the body mounting portions 301Y, 301M, 301C, and 301K, respectively. For this reason, an impact or load at the time of mounting the replenishment packs 210Y, 210M, 210C, and 210K does not directly act on the process cartridges PY, PM, PC, and PK, and it is not necessary to increase the strength of the cartridge tray 40 or a supporting component of the cartridge tray 40.

In addition, the mounting portion shutter 410 corresponding to the process cartridge that is not replenishable with toner due to an insufficient toner capacity is positioned at the closed position. Therefore, it is possible to allow mounting of the replenishment pack 210 only on the process cartridge that is replenishable with toner with a simple configuration.

In other words, the body mounting portion 301K serving as a first body mounting portion and the body mounting portion 301C serving as a second body mounting portion are provided in the apparatus body 2B. The process cartridge PK can be replenished with toner in a state in which the replenishment pack 210K is mounted on the body mounting portion 301K, the cartridge tray 40 is pulled out from the apparatus body 2B, and the process cartridge PK is supported by the cartridge tray 40. The process cartridge PC can be replenished with toner in a state in which the replenishment pack 210C is mounted on the body mounting portion 301C, the cartridge tray 40 is pulled out from the apparatus body 2B, and the process cartridge PC is supported by the cartridge tray 40. In other words, the process cartridge PK is configured to be replenished with toner from the replenishment pack 210K mounted on the body mounting portion 301K through the replenishment port 204 when a moving unit MU is positioned at a first position which belongs to external position. Similarly, the process cartridge PC is configured to be replenished with toner from the replenishment pack 210C mounted on the body mounting portion 301C through the replenishment port 204 when the moving unit MU is positioned at a second position different from the first position which belongs to the external position.

In addition, the mounting portion shutter 410K is movable between the closed position serving as a first regulation position for regulating mounting of the replenishment pack 210K on the body mounting portion 301K, and the open position serving as a first allowing position for allowing mounting of the replenishment pack 210K on the body mounting portion 301K. The mounting portion shutter 410C is movable between the closed position serving as a second regulation position for regulating mounting of the replenishment pack 210C on the body mounting portion 301C, and the open position serving as a second allowing position for allowing mounting of the replenishment pack 210C on the body mounting portion 301C. The mounting portion shutters 410K and 410M serving as a first regulation member and a second regulation member are positioned at the closed positions in a case where it is difficult to replenish the entire amount of toner in a new replenishment pack to a corresponding process cartridge. In addition, the mounting portion shutters 410K and 410M are positioned at the open positions in a case where it is possible to replenish the entire amount of toner in a new replenishment pack to a corresponding process cartridge.

The cartridge tray 40 is positioned at the first position where the process cartridge PK can be replenished with toner from the replenishment pack 210K mounted on the body mounting portion 301K due to the projecting portion 330 abutting the mounting portion shutter 410K positioned at the open position. Further, the cartridge tray 40 is positioned at the second position where the process cartridge PC can be replenished with toner from the replenishment pack 210C mounted in the body mounting portion 301C due to the projecting portion 330 abutting the mounting portion shutter 410C positioned at the open position. In other words, the moving unit MU is positioned at the first position by abutting the mounting portion shutter 410K positioned at the open position, and is positioned at the second position by abutting the mounting portion shutter 410C positioned at the open position.

Third Embodiment

Next, a third embodiment of the present invention will be described. In the third embodiment, only one body mounting portion for mounting a replenishment pack 210 is provided in an apparatus body 2C. Therefore, a configuration similar to that of the first embodiment will be described in a manner of omitting illustration or attaching the same reference numerals in the drawings.

Toner Replenishment Operation

Figure 18A:
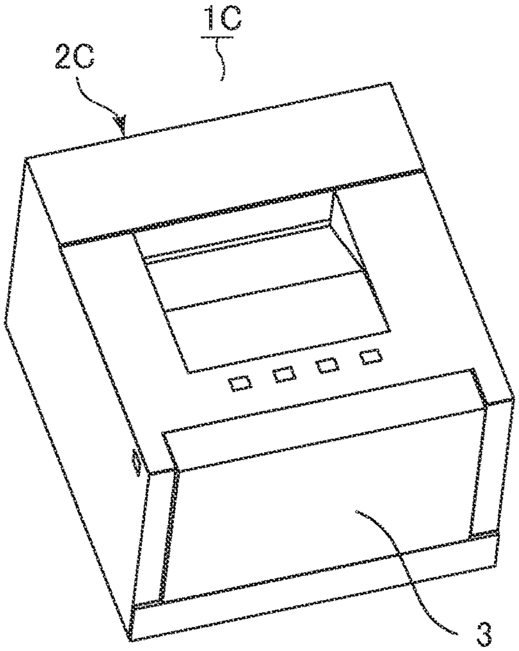
FIG. 18A is a perspective view illustrating an image forming apparatus according to a third embodiment in a state in which a front door is closed.
Figure 18B:
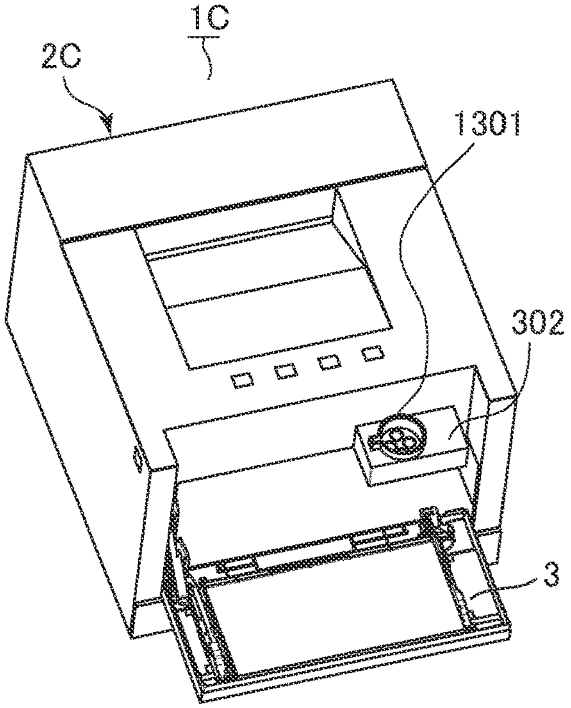
FIG. 18B is a perspective view illustrating the image forming apparatus in a state in which the front door is opened.
Figure 18C:
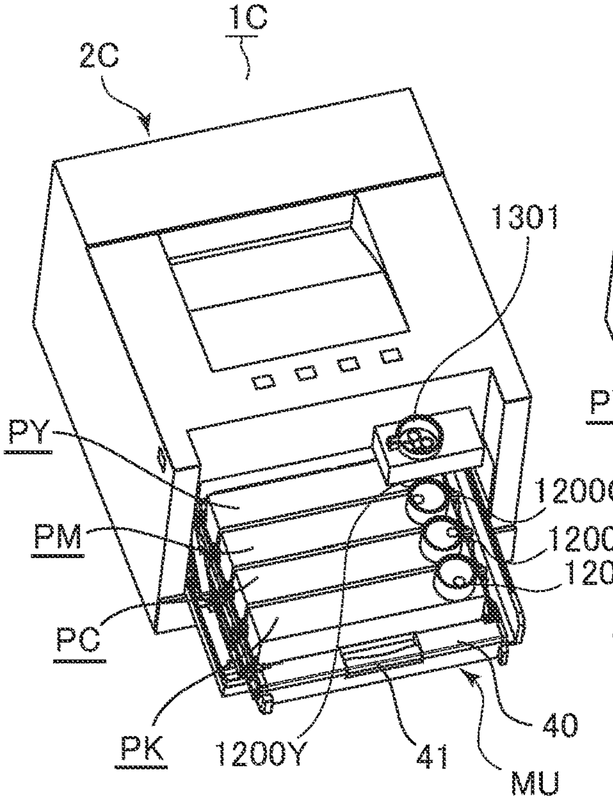
FIG. 18C is a perspective view illustrating the image forming apparatus in a state in which a cartridge tray is pulled out.
Figure 18D:
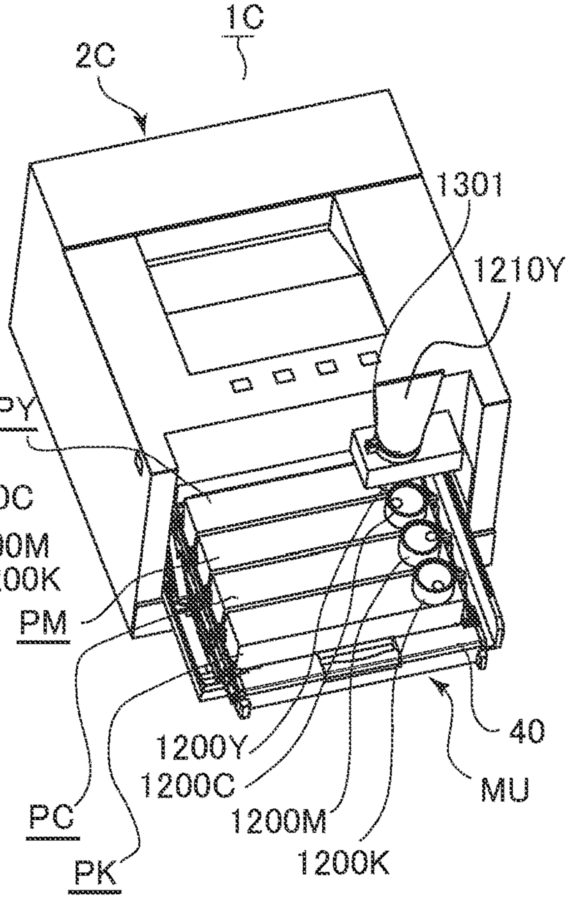
FIG. 18D is a perspective view illustrating a state in which a replenishment pack is mounted on a replenishment port.

FIG. 18A is a perspective view illustrating an image forming apparatus 1C according to the third embodiment in a state in which a front door 3 is positioned at a closed position, and FIG. 18B is a perspective view illustrating the image forming apparatus 1C in a state in which the front door 3 is positioned at an open position. FIG. 18C is a perspective view illustrating the image forming apparatus 1C in a state in which a cartridge tray 40 is pulled out, and FIG. 18D is a perspective view illustrating the image forming apparatus 1C in a state in which a replenishment pack 1210Y is mounted on a process cartridge PK. In FIG. 18B, the cartridge tray 40 and process cartridges PY, PM, PC, and PK are omitted.

As illustrated in FIGS. 18A and 18B, in a case of replenishing toner, the user first moves the front door 3 from the closed position to the open position. In the present embodiment, when the front door 3 is opened to move from the closed position to the open position, a body mounting portion 1301 provided on a replenishment table 302 of the apparatus body 2C is exposed. The replenishment table 302 is fixed to a frame of the apparatus body 2C, for example, and the body mounting portion 1301 is disposed on one side (the right side in the present embodiment) of the image forming apparatus 1C in the Y direction. The disposition of the body mounting portion 1301 is not limited thereto, and the body mounting portion 1301 may be disposed on the left side or the center of the image forming apparatus 1C, for example.

As illustrated in FIGS. 18A and 18B, in a case of replenishing toner, the user first moves the front door 3 from the closed position to the open position. In the present embodiment, when the front door 3 is opened to move from the closed position to the open position, the body mounting portion 1301 provided on the replenishment table 302 of the apparatus body 2C is exposed. Next, as illustrated in FIGS. 18B and 18C, the user places his/her hand on a handle portion 41 of the cartridge tray 40 and pulls out the cartridge tray 40 toward the front side with respect to the apparatus body 2C, that is, downstream in an X direction. As a result, the process cartridges PY, PM, PC, and PK supported by the cartridge tray 40 are also pulled out toward the front side with respect to the apparatus body 2C, that is, downstream in the X direction, and the user can access the process cartridges PY, PM, PC, and PK.

In the present embodiment, as illustrated in FIG. 18C, replenishment portions 1200Y, 1200M, 1200C, and 1200K are provided on the process cartridges PY, PM, PC, and PK, respectively. In the present embodiment, each of the replenishment portions 1200Y, 1200M, 1200C, and 1200K is disposed at a downstream end portion of the process cartridge in the Y direction, but is not limited thereto. The replenishment portions 1200Y, 1200M, 1200C, and 1200K may be arranged on the left side or the center of the image forming apparatus 1C, for example, according to the arrangement of the body mounting portion 1301.

FIG. 18D illustrates, as an example, a state in which toner is replenished from the replenishment pack 1210Y to the yellow (Y) process cartridge PY. As illustrated in FIG. 18D, when replenishing toner to the process cartridge PY, the cartridge tray 40 is pulled out to a position where the replenishment portion 1200Y of the process cartridge PY and the body mounting portion 1301 overlap each other in a Z direction. The cartridge tray 40 is locked at this position as described below. In this state, the user mounts the replenishment pack 1210Y on the body mounting portion 1301, and replenishes toner from the replenishment pack 1210Y to the replenishment portion 1200Y of the process cartridge PY.

Replenishment Path

Figure 19A:
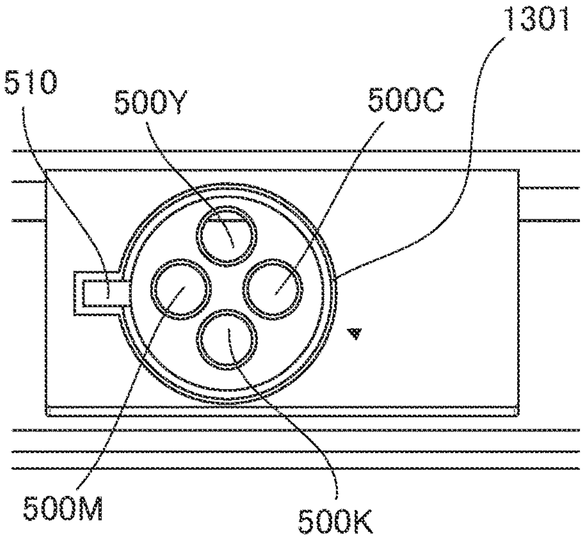
FIG. 19A is a plan view illustrating the inside of the replenishment port.
Figure 19B:
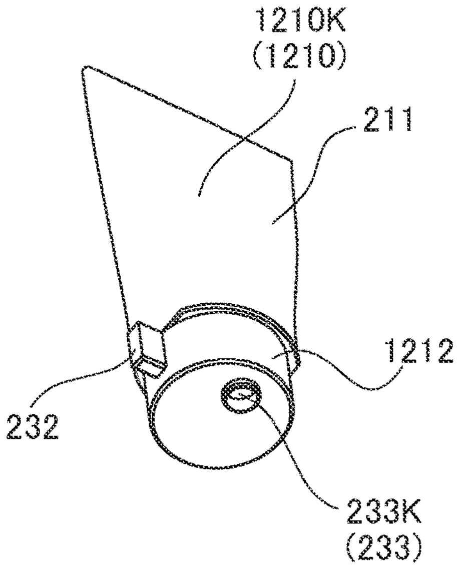
FIG. 19B is a perspective view illustrating the replenishment pack.
Figure 19C:
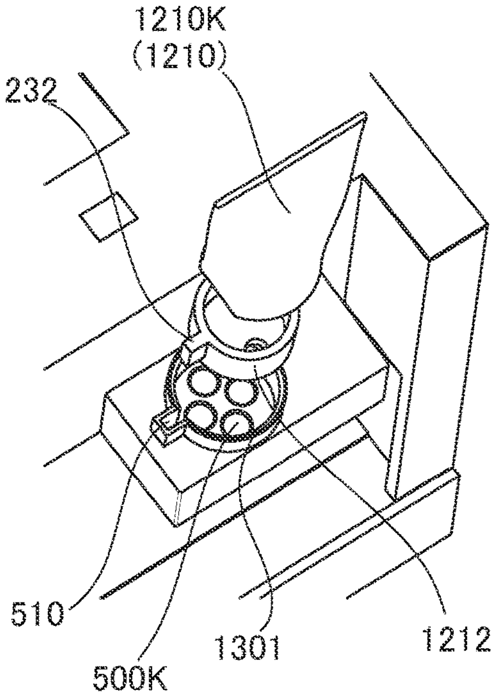
FIG. 19C is an exploded perspective view illustrating the replenishment port and the replenishment pack.
Figure 19D:
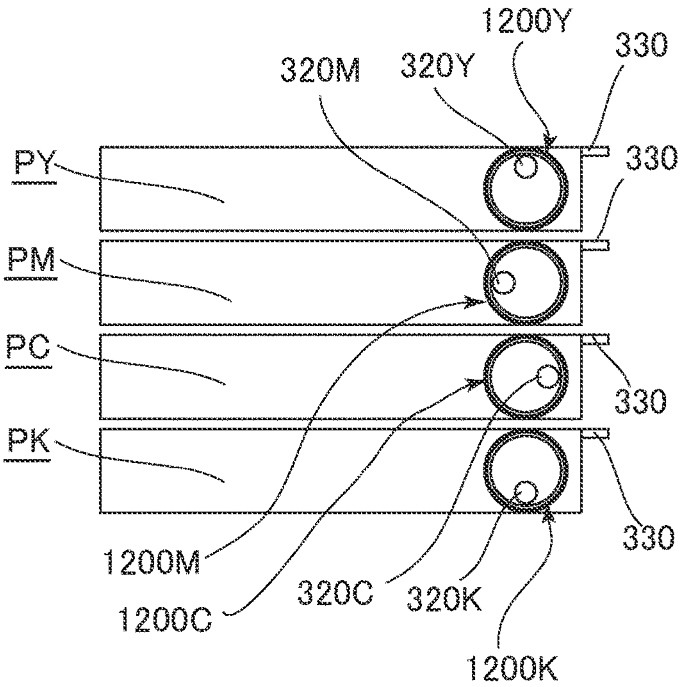
FIG. 19D is a plan view illustrating a replenishment path of each process cartridge.

Next, replenishment paths 500Y, 500M, 500C, and 500K provided inside the body mounting portion 1301 and the replenishment pack 1210 will be described with reference to FIGS. 19A to 19D. FIG. 19A is a plan view illustrating the inside of the body mounting portion 1301, and FIG. 19B is a perspective view illustrating the replenishment pack 1210. FIG. 19C is an exploded perspective view illustrating the body mounting portion 1301 and the replenishment pack 1210, and FIG. 19D is a plan view illustrating the replenishment path of each process cartridge.

The replenishment portions 1200Y, 1200M, 1200C, and 1200K have the same configuration except that colors of toner to be replenished are different and receiving ports 320Y, 320M, 320C, and 320K described below are disposed at different positions. Therefore, in a case where the replenishment portions 1200Y, 1200M, 1200C, and 1200K are not particularly distinguished from one another, reference characters "Y", "M", "C", and "K" are omitted, and the replenishment portions 1200Y, 1200M, 1200C, and 1200K will be described as the replenishment portions 1200 below. Similarly, the replenishment packs 1210Y, 1210M, 1210C, and 1210K also have the same configuration except that the colors of stored toners are different and discharge ports 233 described below are disposed at different positions. Therefore, in a case where the replenishment packs 1210Y, 1210M, 1210C, and 1210K are not particularly distinguished from one another, reference characters "Y", "M", "C", and "K" are omitted, and the replenishment packs 1210Y, 1210M, 1210C, and 1210K will be described as the replenishment packs 1210 below.

As illustrated in FIG. 19A, the replenishment paths 500Y, 500M, 500C, and 500K and a groove portion 510 are provided inside the body mounting portion 1301 provided in the image forming apparatus 1C. As illustrated in FIG. 19B, the replenishment pack 1210 includes a pouch 211 for storing toner and a substantially cylindrical insertion portion 1212 communicating with the pouch 211. The discharge port 233 is provided at a downstream end portion of the insertion portion 1212 in an insertion direction, and a projecting portion 232 is provided on a side surface of the insertion portion 1212. The discharge port 233 is disposed at a position shifted in a radial direction from the center of a bottom surface of the insertion portion 1212, and the position of the discharge port 233 is different between the replenishment packs 1210Y, 1210M, 1210C, and 1210K.

As illustrated in FIG. 19C, for example, when mounting the replenishment pack 1210K storing toner of black (K) on the body mounting portion 1301, the projecting portion 232 of the replenishment pack 1210K is aligned with the groove portion 510 of the body mounting portion 1301. Therefore, a phase (posture) of the replenishment pack 1210K with respect to the body mounting portion 1301 is uniquely determined. When the projecting portion 232 of the replenishment pack 1210K is mounted on the groove portion 510 of the body mounting portion 1301, the discharge port 233K (see FIG. 19B) provided at the bottom surface of the replenishment pack 1210K is engaged with the replenishment path 500K serving as a first replenishment path of the body mounting portion 1301. As a result, the discharge port 233K and the replenishment path 500K communicate with each other, and toner discharged from the discharge port 233K can reliably pass through the replenishment path 500K.

The replenishment paths 500Y, 500M, 500C, and 500K provided inside the body mounting portion 1301 are arranged so as to be matched with the discharge ports 233 of the respective replenishment packs 1210Y, 1210M, 1210C, and 1210K. That is, the discharge port 233 of the replenishment pack 1210Y is engaged with the replenishment path 500Y in a state in which the replenishment pack 1210Y is mounted on the body mounting portion 1301. The discharge port 233 of the replenishment pack 1210M is engaged with the replenishment path 500M in a state in which the replenishment pack 1210M is mounted on the body mounting portion 1301. The discharge port 233 of the replenishment pack 1210C is engaged with the replenishment path 500C serving as a second replenishment path in a state in which the replenishment pack 1210C is mounted on the body mounting portion 1301. The replenishment paths 500Y, 500M, 500C, and 500K are configured such that toner discharged from the replenishment packs 1210Y, 1210M, 1210C, and 1210K mounted on the body mounting portion 1301 can pass through the replenishment paths.

As illustrated in FIG. 19D, the receiving ports 320Y, 320M, 320C, and 320K are provided in the replenishment portions 1200Y, 1200M, 1200C, and 1200K of the process cartridges PY, PM, PC, and PK, respectively. The receiving ports 320Y, 320M, 320C, and 320K respectively coincide with the replenishment paths 500Y, 500M, 500C, and 500K of the body mounting portion 1301 according to the position of the cartridge tray 40.

Hereinafter, it is assumed that the cartridge tray 40 can be sequentially positioned at a fourth position, a third position, a second position, and a first position as it is pulled out downstream in the X direction from a mounting position at which the cartridge tray 40 is mounted on the apparatus body 2C. When the cartridge tray 40 is positioned at the fourth position, the receiving port 320Y of the replenishment portion 1200Y coincides with the replenishment path 500Y of the body mounting portion 1301. When the cartridge tray 40 is positioned at the third position, the receiving port 320M of the replenishment portion 1200M coincides with the replenishment path 500M of the body mounting portion 1301. When the cartridge tray 40 is positioned at the second position, the receiving port 320C of the replenishment portion 1200C coincides with the replenishment path 500C of the body mounting portion 1301. When the cartridge tray 40 is positioned at the first position, the receiving port 320K of the replenishment portion 1200K coincides with the replenishment path 500K of the body mounting portion 1301.

The process cartridges PY, PM, PC, and PK are each provided with a projecting portion 330 on a downstream end surface in the Y direction, that is, a right side surface. Each projecting portion 330 is used to lock the cartridge tray 40 at the first to fourth positions. Each projecting portion 330 may be provided on the cartridge tray 40 instead of the process cartridges PY, PM, PC, and PK.

Lock Mechanism

Figure 20A:
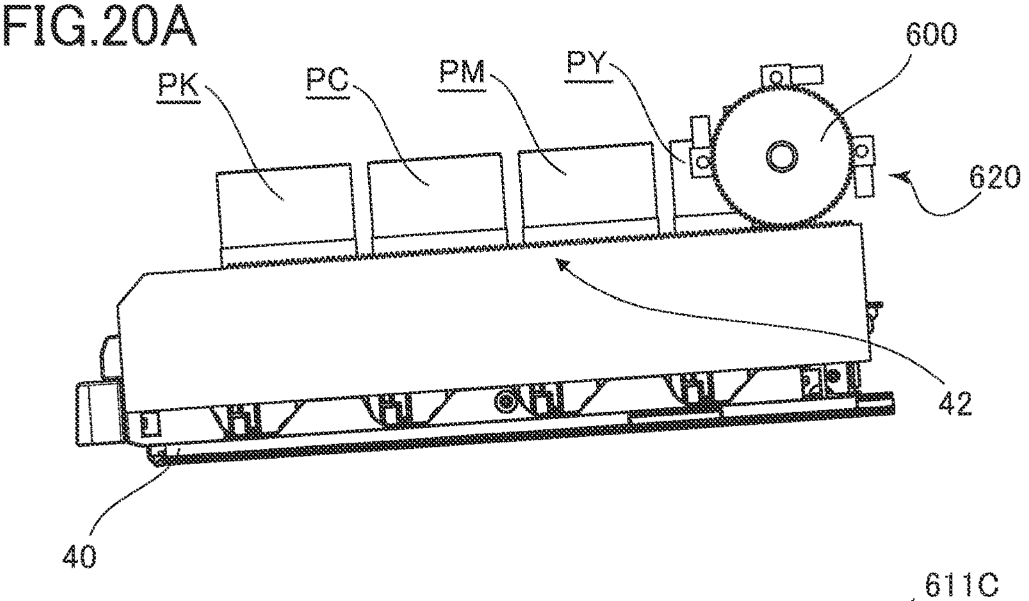
FIG. 20A is a side view illustrating a lock mechanism and the cartridge tray.
Figure 20B:
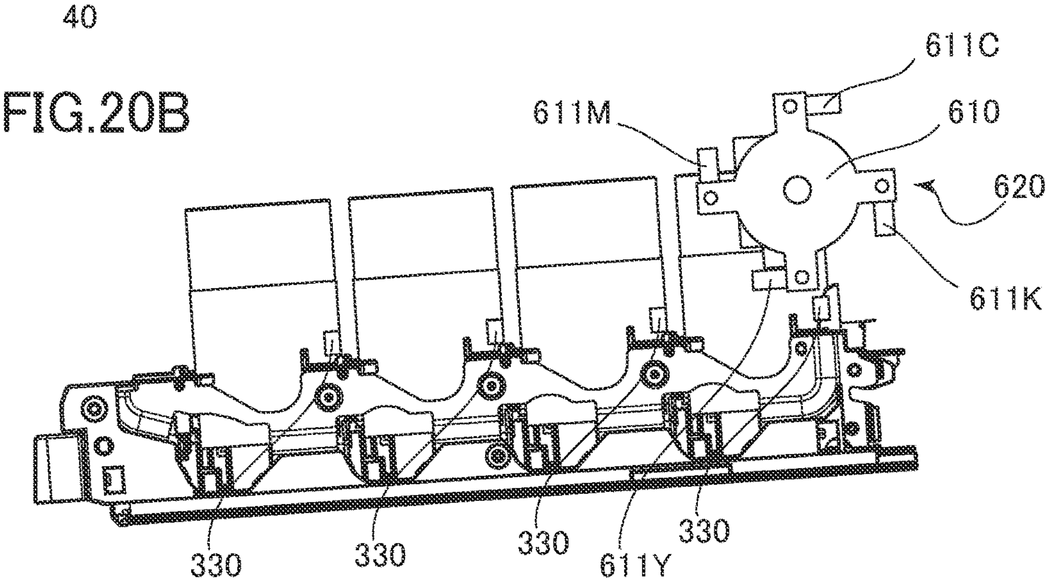
FIG. 20B is a cross-sectional view illustrating the lock mechanism and the cartridge tray.
Figure 20C:
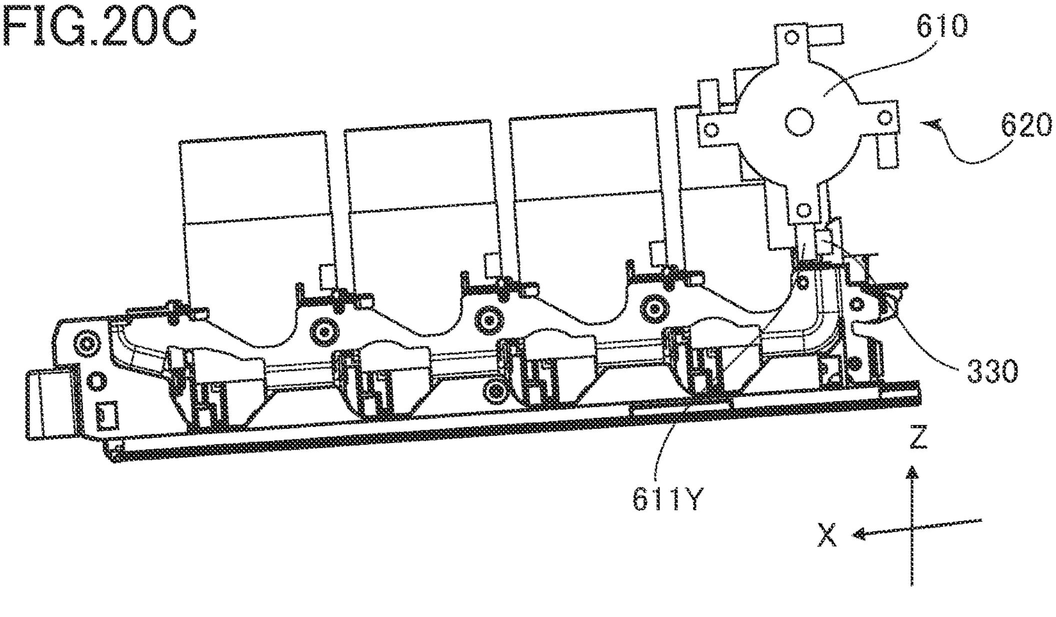
FIG. 20C is a cross-sectional view illustrating a state in which a stopper of the lock mechanism is positioned at a locked position.
Figure 21A:
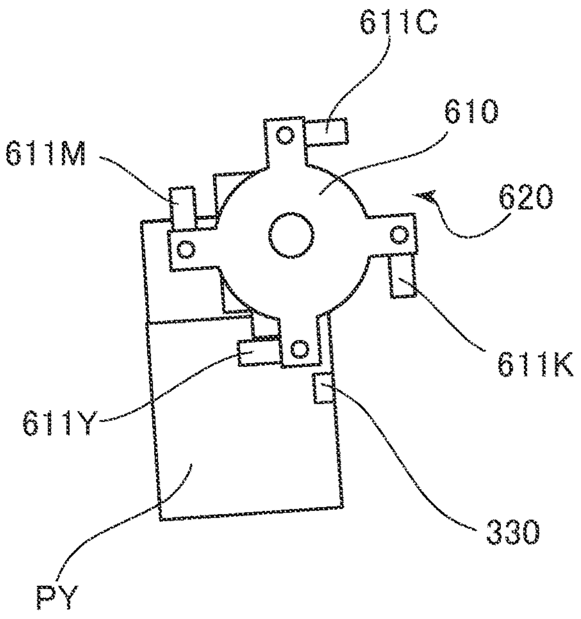
FIG. 21A is a side view illustrating the stopper positioned at an unlocked position.
Figure 21B:
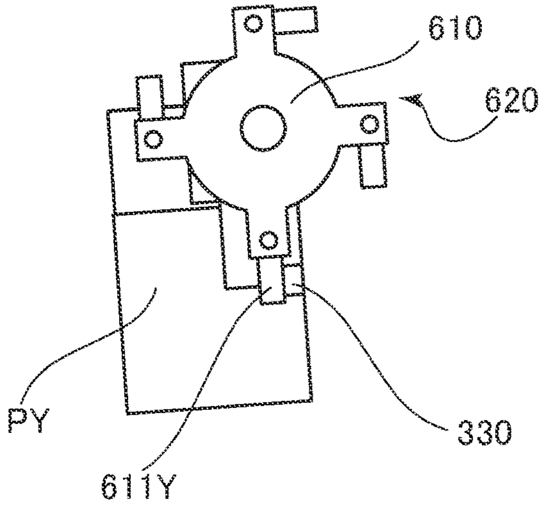
FIG. 21B is a side view illustrating the stopper positioned at the locked position.
Figure 21C:
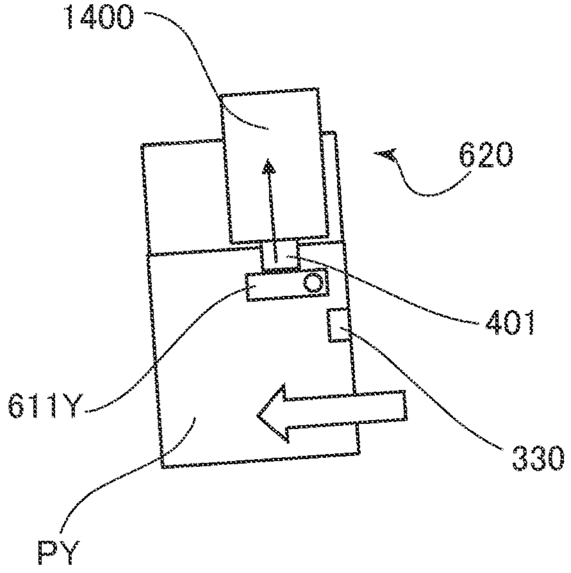
FIG. 21C is a side view illustrating the stopper positioned at the unlocked position and a solenoid.
Figure 21D:
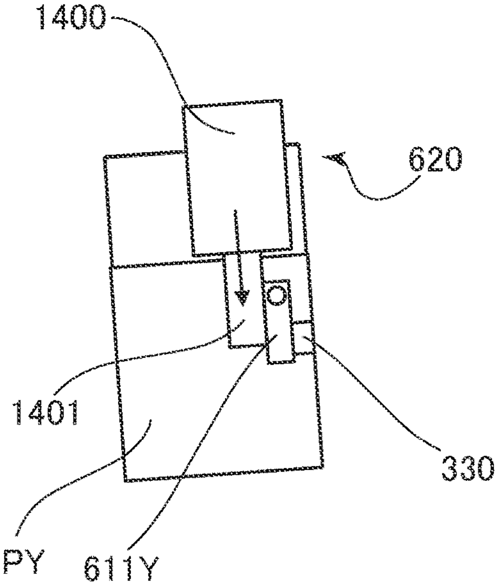
FIG. 21D is a side view illustrating the stopper positioned at the locked position and the solenoid.

Next, a lock mechanism 620 for locking the cartridge tray 40 at the first to fourth positions will be described with reference to FIGS. 20A to 21D. FIG. 20A is a side view illustrating the lock mechanism 620 and the cartridge tray 40. FIG. 20B is a cross-sectional view illustrating the lock mechanism 620 and the cartridge tray 40. FIG. 20C is a cross-sectional view illustrating a state in which a stopper 611Y of the lock mechanism 620 is positioned at a locked position. FIG. 21A is a side view illustrating the stopper 611Y positioned at an unlocked position. FIG. 21B is a side view illustrating the stopper 611Y positioned at the locked position. FIG. 21C is a side view illustrating the stopper 611Y positioned at the unlocked position and a solenoid 1400. FIG. 21D is a side view illustrating the stopper 611Y positioned at the locked position and the solenoid 1400.

As illustrated in FIGS. 20A and 20B, the lock mechanism 620 is provided in the apparatus body 2C (see FIG. 18B), and the lock mechanism 620 includes a pinion gear 600, a lock member 610, and four stoppers 611Y, 611M, 611C, and 611K. The cartridge tray 40 includes a rack portion 42 meshing with the pinion gear 600, and the pinion gear 600 rotates when the cartridge tray 40 is pulled out from the apparatus body 2C. The pinion gear 600 rotates by 90° as the cartridge tray 40 is pulled out from the fourth position to the third position. Similarly, the pinion gear 600 rotates by 90° when the cartridge tray 40 is pulled out from the third position to the second position and from the second position to the first position.

The lock member 610 that rotates concentrically is fixed to the pinion gear 600, and the stoppers 611Y, 611M, 611C, and 611K are rotatably supported by the lock member 610 so as to have phases different from each other by 90 degrees in a circumferential direction. The stopper 611Y is configured to be rotatable between the unlocked position illustrated in FIG. 20B and the locked position illustrated in FIG. 20C, and the stoppers 611M, 611C, and 611K are configured similarly to the stopper 611Y. The stoppers 611Y, 611M, 611C, and 611K abut the projecting portions 330 of the process cartridges PY, PM, PC, and PK, respectively, when positioned at the locked positions. As a result, the cartridge tray 40 is locked to each of the fourth position, the third position, the second position, and the first position. That is, the lock mechanism 620 can position the cartridge tray 40 at the first position where toner can be replenished from the replenishment pack 1210K mounted on the body mounting portion 1301 to the process cartridge PK. Further, the lock mechanism 620 can position the cartridge tray 40 at a second position where toner can be replenished from the replenishment pack 1210C mounted on the body mounting portion 1301 to the process cartridge PC. In other words, the lock mechanism 620 can position a moving unit MU including the cartridge tray 40 at the first position and the second position. In addition, the stoppers 611Y, 611M, 611C, and 611K do not interfere with the projecting portions 330 of the process cartridges PY, PM, PC, and PK when positioned at the unlocked positions.

Figure 22:
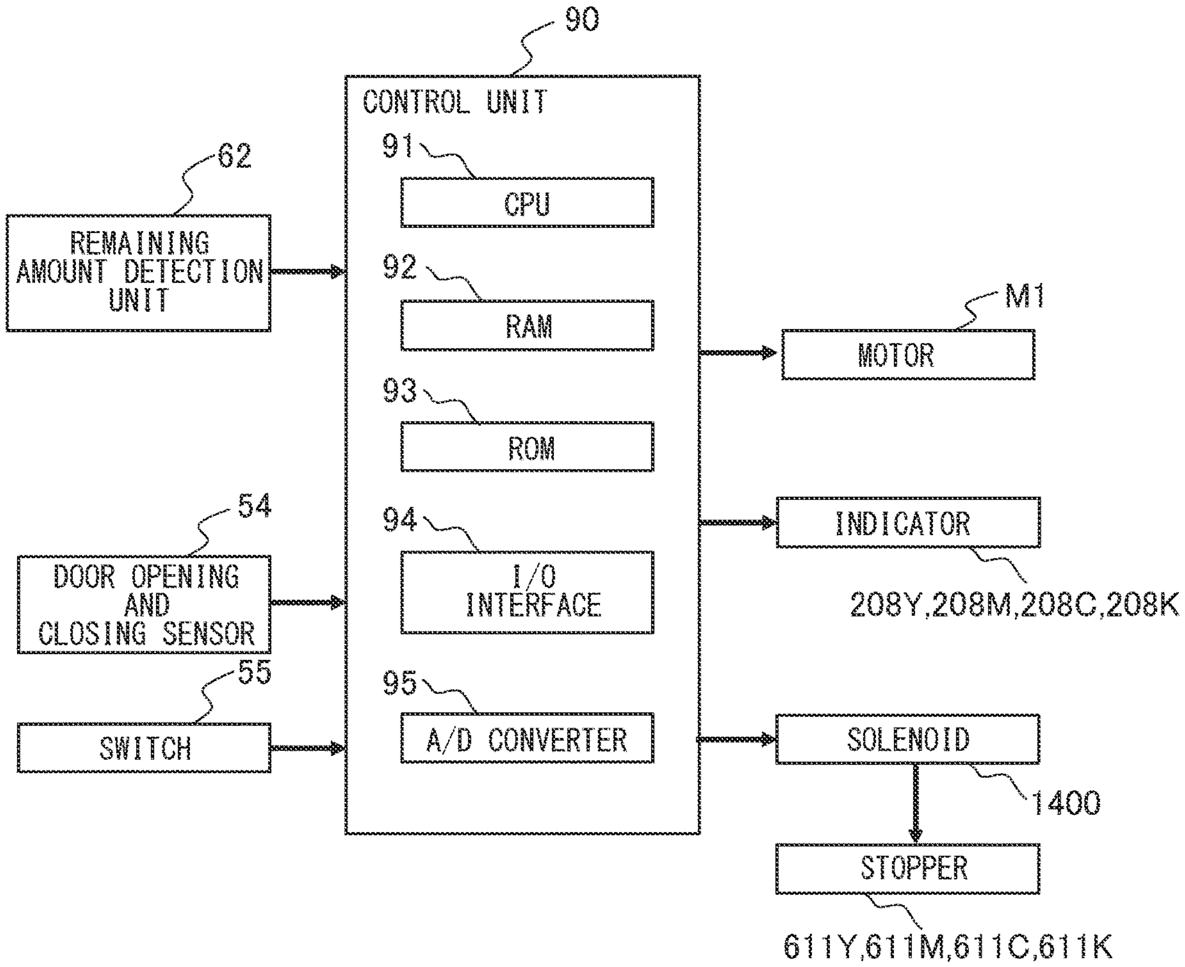
FIG. 22 is a block diagram illustrating a control system of the image forming apparatus according to the third embodiment.

As illustrated in FIGS. 21C and 21D, in the apparatus body 2C, the solenoid 1400 including a linearly movable plunger 1401 is supported. The plunger 1401 can rotate the stoppers 611Y, 611M, 611C, and 611K from the unlocked position to the locked position by pressing the stoppers 611Y, 611M, 611C, and 611K. The stoppers 611Y, 611M, 611C, and 611K are biased toward the unlocked position by, for example, a spring (not illustrated), and are positioned at the unlocked position in a state in which the solenoid 1400 is not operated. As illustrated in FIG. 22, in the present embodiment, the solenoid 1400 is provided instead of the solenoid 66 of the first embodiment. Further, a lock member 65 of the first embodiment is omitted.

For example, in FIGS. 21A and 21B, the cartridge tray 40 is positioned at the first position, that is, a position for replenishing toner to the process cartridge PK. As illustrated in FIG. 21A, the stopper 611Y facing the plunger 1401 is positioned at the unlocked position in a state in which the solenoid 1400 is not energized. As illustrated in FIG. 21B, when the solenoid 1400 is energized, the plunger 1401 presses the stopper 611Y, and the stopper 611Y rotates from the unlocked position to the locked position.

In this manner, as the stopper 611Y is positioned at the locked position, the projecting portion 330 provided in the process cartridge PK abuts the stopper 611Y even when the cartridge tray 40 is further pulled out from the first position as illustrated in FIGS. 21B and 21D. Therefore, the cartridge tray 40 is positioned at the first position for replenishing toner to the process cartridge PK, and the above-described toner replenishment operation can be easily performed.

As described above, in the present embodiment, since the four replenishment paths 500Y, 500M, 500C, and 500K are provided in one body mounting portion 1301, the body mounting portion 1301 can be shared for the replenishment packs storing different colors of toner, and the apparatus body 2C can be downsized.

In other words, the process cartridge PK is configured to be replenished with toner from the replenishment pack 1210K mounted on the body mounting portion 1301 via the replenishment path 500K and a replenishment port 204 when the moving unit MU is positioned at the first position. Similarly, the process cartridge PC is configured to be replenished with toner from the replenishment pack 1210C mounted on the body mounting portion 1301 via the replenishment path 500C and the replenishment port 204 when the moving unit MU is positioned at the second position.

In addition, in the present embodiment, since the four stoppers 611Y, 611M, 611C, and 611K are configured to be rotatable from the unlocked position to the locked position by one solenoid 1400, the apparatus can be reduced in cost and size.

For example, a rotary encoder, a potentiometer, or the like may be provided on the pinion gear 600 or the lock member 610 so that the position of the cartridge tray 40 can be detected. Then, an energization timing of the solenoid 1400 may be determined based on the position of the cartridge tray 40.

In the present embodiment, a lever 201 (see FIG. 11B) as in the first and second embodiments is not provided, and when the replenishment pack 1210 is mounted on the body mounting portion 1301, toner starts to be discharged from the discharge port 233. In a case of such a configuration, it is preferable to attach a removable cap to the replenishment pack 1210 so that toner in the replenishment pack 1210 does not leak to the outside in a state in which the cap is attached. Further, as in the first and second embodiments, a container shutter provided in the replenishment pack 1210 may be moved to an open position by rotating the lever 201 (see FIG. 11B) from an operation position to a replenishment position, and the toner replenishment operation may be started.

Fourth Embodiment

Next, a fourth embodiment of the present invention will be described. In the fourth embodiment, a reading unit 700 is provided above an apparatus body 2B of the second embodiment. Therefore, a configuration similar to that of the second embodiment will be described in a manner of omitting illustration or attaching the same reference numerals in the drawings.

Figure 24:
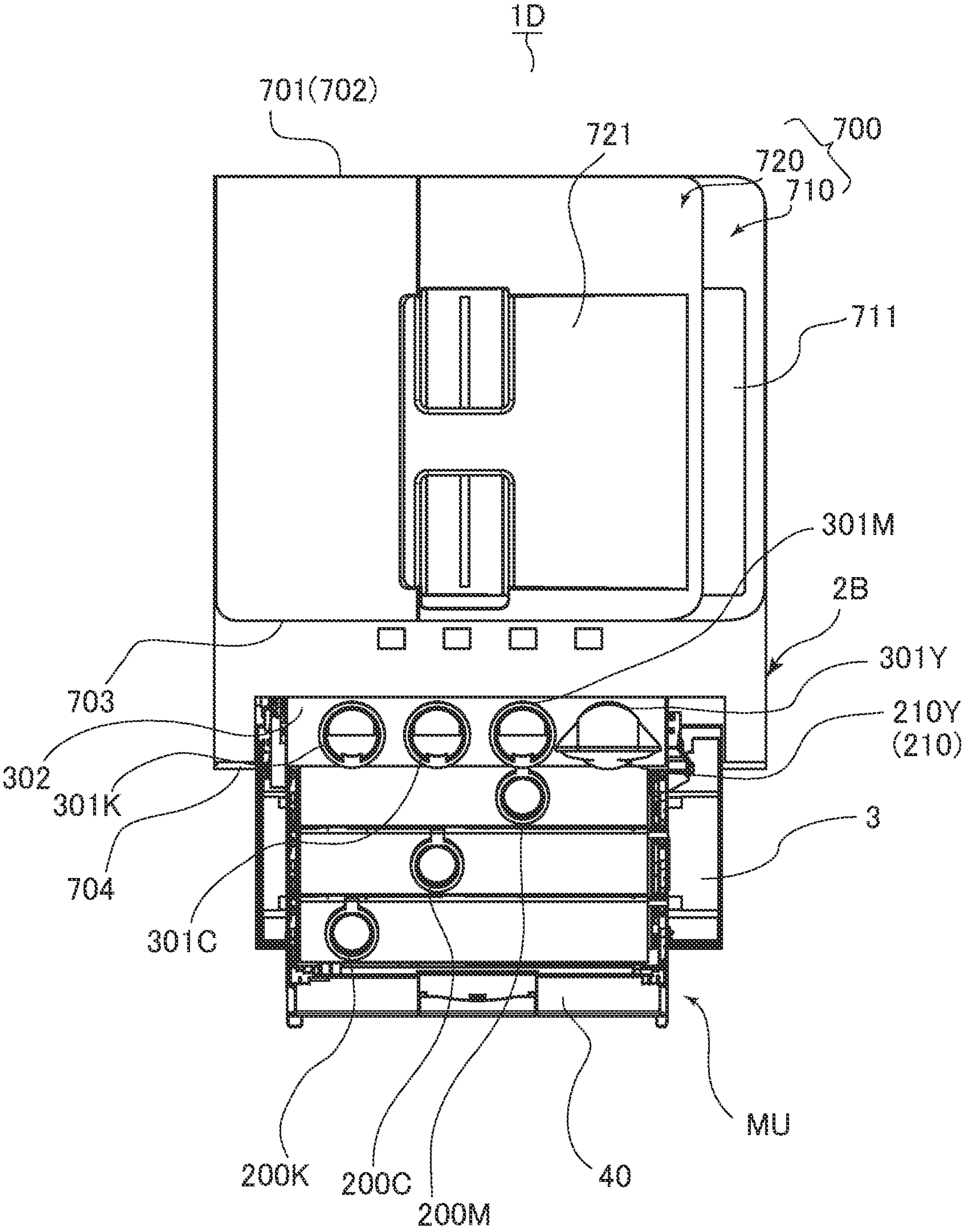
FIG. 24 is a plan view illustrating an image forming apparatus according to a fourth embodiment.
Figure 25A:
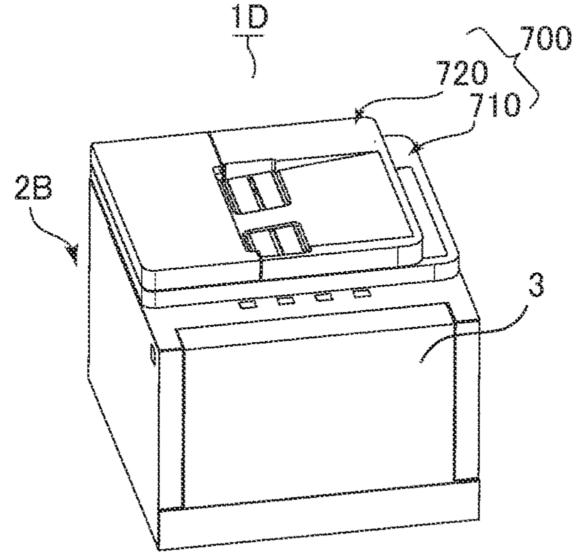
FIG. 25A is a perspective view illustrating the image forming apparatus according to the fourth embodiment in a state in which a front door is closed.
Figure 25B:
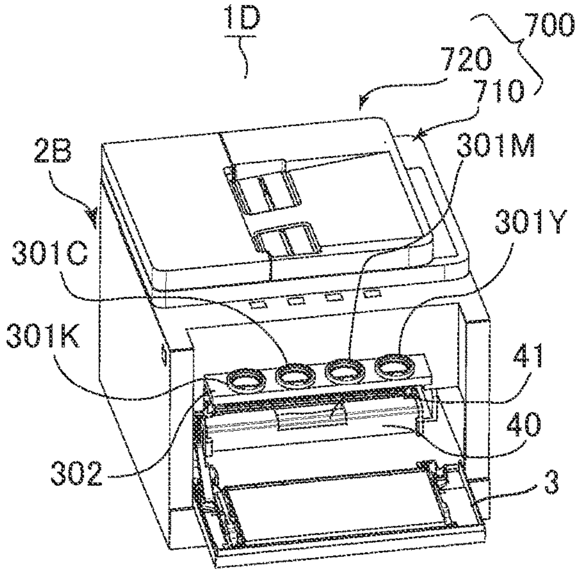
FIG. 25B is a perspective view illustrating the image forming apparatus in a state in which the front door is opened.
Figure 25C:
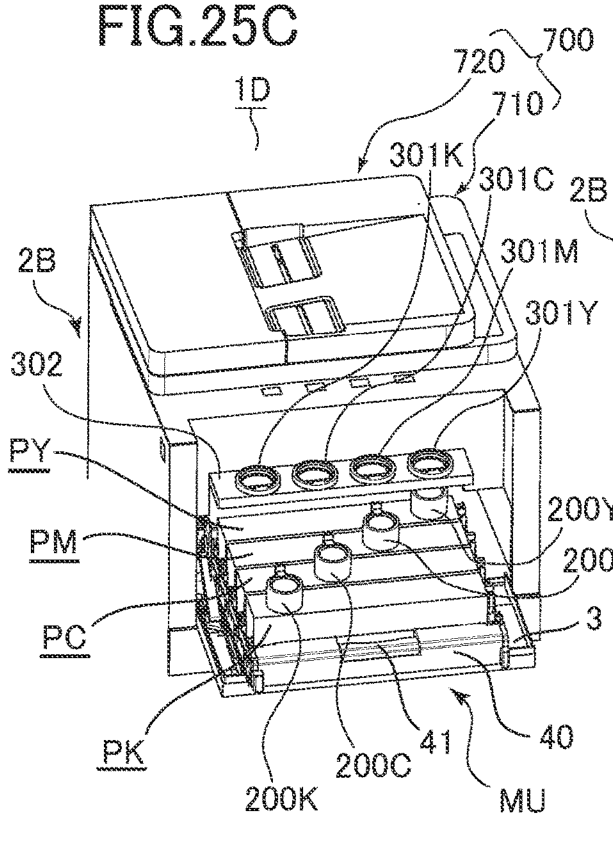
FIG. 25C is a perspective view illustrating the image forming apparatus in a state in which a cartridge tray is pulled out.

FIG. 24 is a plan view illustrating an image forming apparatus 1D according to the fourth embodiment. FIG. 25A is a perspective view illustrating the image forming apparatus 1D according to the fourth embodiment in a state in which a front door 3 is positioned at a closed position, and FIG. 25B is a perspective view illustrating the image forming apparatus 1D in a state in which the front door 3 is positioned at an open position. FIG. 25C is a perspective view illustrating the image forming apparatus 1D in a state in which a cartridge tray 40 is pulled out, and FIG. 25D is a perspective view illustrating the image forming apparatus 1D in a state in which a replenishment pack 210Y is mounted on a process cartridge PY.

Figure 25D:
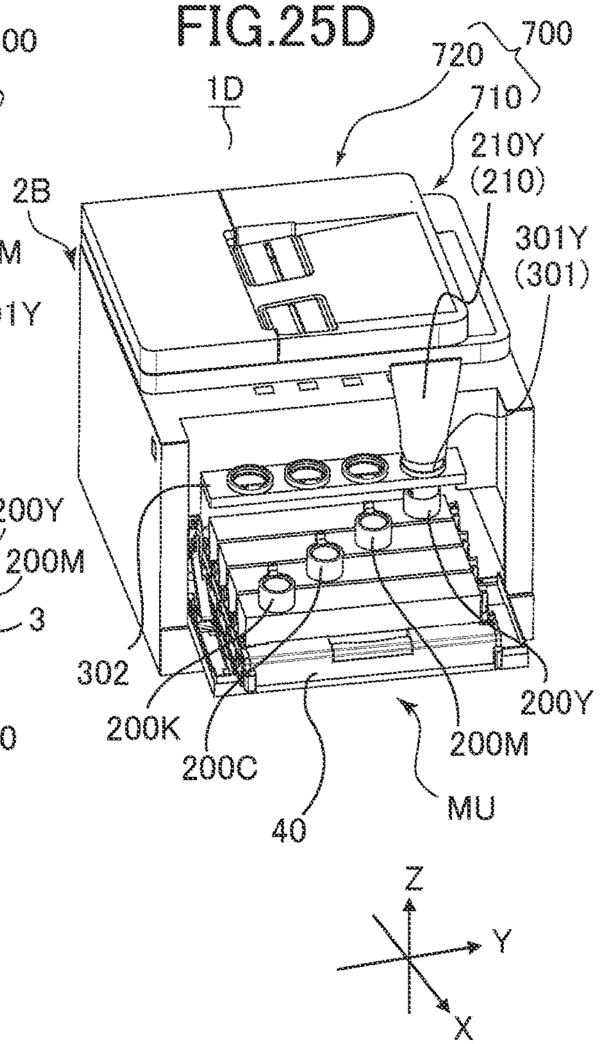
FIG. 25D is a perspective view illustrating a state in which a replenishment pack is mounted on a replenishment port.

As illustrated in FIGS. 24 to 25D, the image forming apparatus 1D includes the apparatus body 2B, a moving unit MU, the front door 3, and the reading unit 700 disposed above the apparatus body 2B. Since the apparatus body 2B, the moving unit MU, and the front door 3 have the same configurations as those of the second embodiment, a description thereof will be omitted.

The reading unit 700 includes a reading portion 710 and an auto document feeder (ADF) 720 supported so as to be openable and closable with respect to the reading portion 710. The reading portion 710 incorporates an imaging element such as a contact image sensor (CIS), and the imaging element can read an image of a document by scanning the document placed on a platen glass 711.

The ADF 720 includes a document tray 721 on which a document can be placed and a plurality of conveying rollers (not illustrated), and the document placed on the document tray 721 is conveyed by the plurality of conveying rollers. Then, an image of the document is read by the imaging element of the reading portion 710 while being conveyed by the plurality of conveying rollers. The ADF 720 can continuously convey a plurality of documents placed on the document tray 721, and the reading portion 710 can continuously read images of the plurality of documents.

As illustrated in FIG. 24, the reading unit 700 is shorter than the apparatus body 2B in an X direction. Specifically, in the X direction, an upstream end 701 of the reading unit 700 is disposed flush with an upstream end 702 of the apparatus body 2B, and a downstream end 703 of the reading unit 700 is positioned upstream of a downstream end 704 of the apparatus body 2B. Further, the downstream end 703 of the reading unit 700 is disposed upstream of a replenishment table 302 of the apparatus body 2B in the X direction. That is, the reading unit 700 is disposed so as not to overlap a body mounting portion 301Y of the replenishment table 302 when viewed from above. In other words, the reading unit 700 is disposed so as not to overlap the body mounting portion 301Y when viewed in a direction in which the replenishment pack 210Y is mounted on the body mounting portion 301Y. Similarly, the reading unit 700 is disposed so as not to overlap body mounting portions 301M, 301C, and 301K when viewed from above. The upstream end 701 of the reading unit 700 may project upstream of the upstream end 702 of the apparatus body 2B in the X direction.

Therefore, as illustrated in FIGS. 25B and 25C, when mounting the replenishment pack 210Y on the body mounting portion 301Y of the replenishment table 302 from above, the reading unit 700 does not interfere with the replenishment pack 210Y, so that usability can be improved.

In the present embodiment, the reading unit 700 includes the reading portion 710 and the ADF 720, but is not limited thereto. For example, a pressure plate that presses a document placed on the platen glass 711 from above may be applied instead of the ADF 720. The pressure plate does not include the document tray 721 or the conveying roller.

Fifth Embodiment

Next, a fifth embodiment of the present invention will be described. The fifth embodiment has a configuration in which indicating portions 415Y, 415M, 415C, and 415K are provided on an exterior surface of a printer of the first embodiment. Therefore, a configuration similar to that of the first embodiment will be described in a manner of omitting illustration or attaching the same reference numerals in the drawings.

Control System of Image Forming Apparatus

Figure 26:
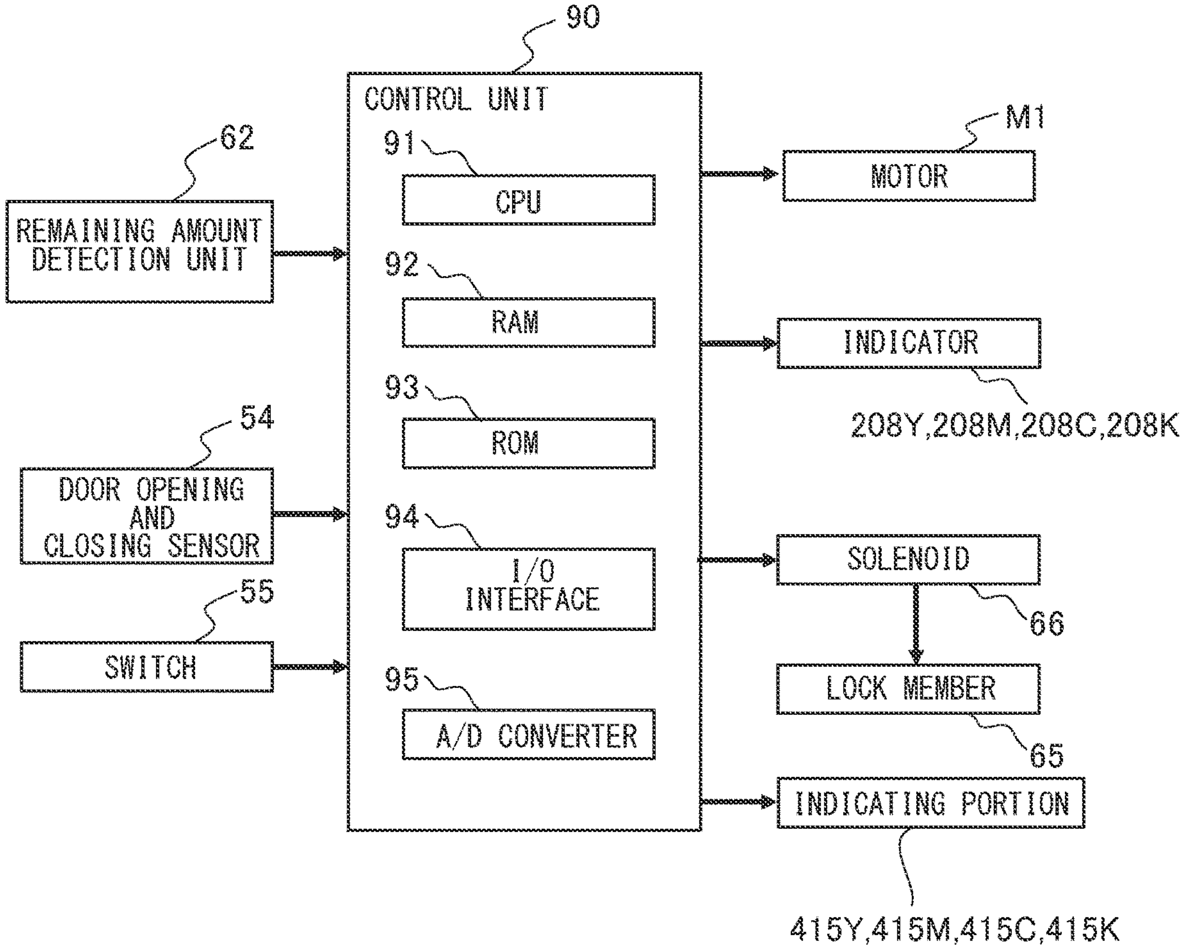
FIG. 26 is a block diagram illustrating a control system of an image forming apparatus according to a fifth embodiment.
Figure 27:
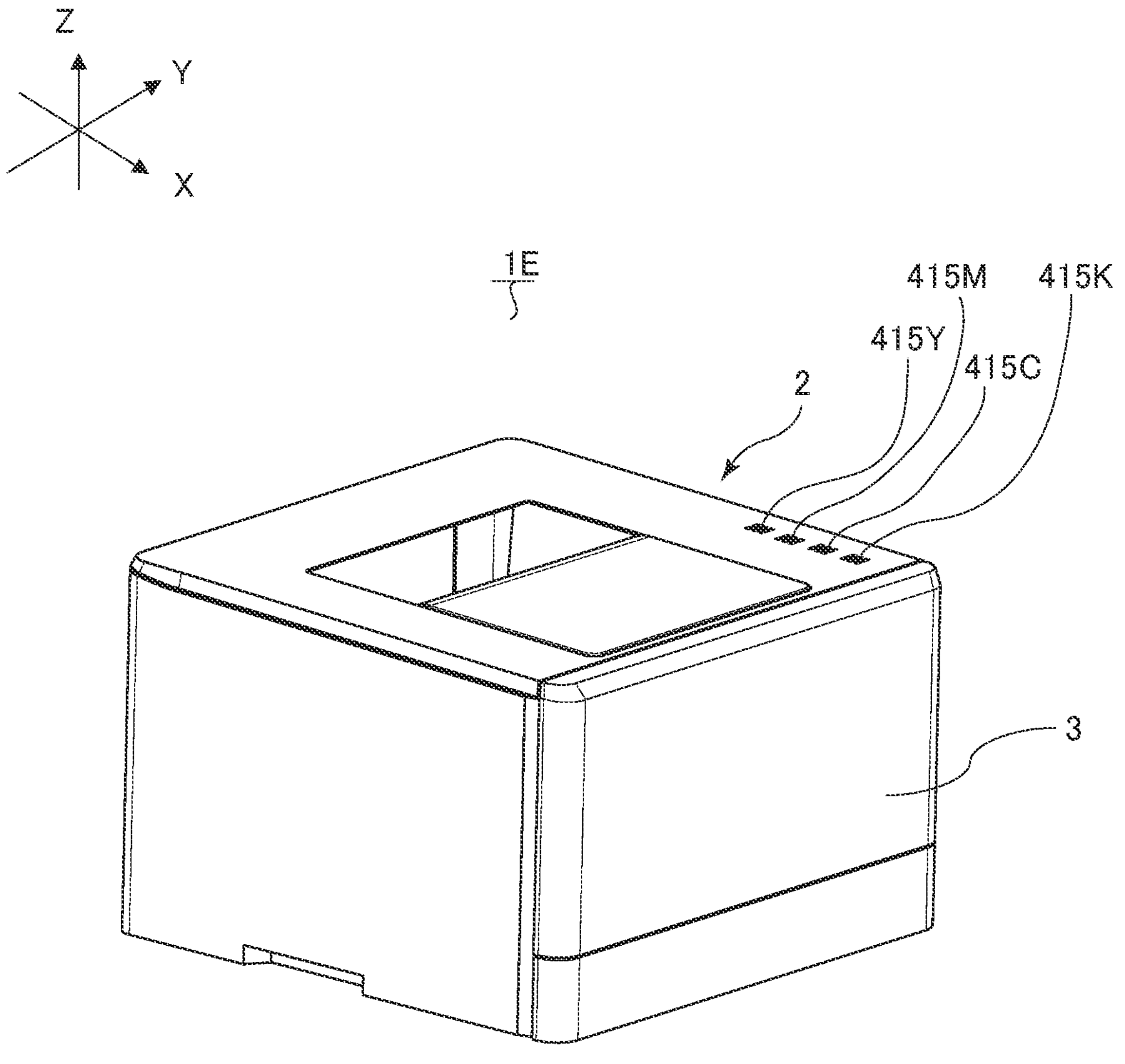
FIG. 27 is a perspective view illustrating the image forming apparatus according to the fifth embodiment.

FIG. 26 is a block diagram illustrating a control system of an image forming apparatus 1E (see FIG. 27). Similarly to the first embodiment, a remaining amount detection unit 62, a door opening and closing sensor 54, and a switch 55 are connected to an input side of a control unit 90.

A motor M1, indicators 208Y, 208M, 208C, and 208K, a solenoid 66, and the indicating portions 415Y, 415M, 415C, and 415K are connected to an output side of the control unit 90. A CPU 91 of the control unit 90 calculates the amount of toner stored in a storage portion 9*a* based on a remaining amount detection signal output from the remaining amount detection unit 62 disposed in a developing apparatus 9. An I/O interface 94 transmits the remaining amount of the toner stored in the storage portion 9*a* to an external PC or the like.

Here, for example, the remaining amount of the toner is transmitted in % notation with 100% denoting the amount of toner that can be stored in the storage portion 9*a*. In addition, the remaining amount detection signal depends on the configuration of the remaining amount detection unit 62, and the remaining amount detection signal is, for example, an analog signal in which a voltage changes based on the current remaining amount, or a pulse signal in which a pulse of a constant cycle is output and a H/L pulse width changes according to the remaining toner amount. In the present embodiment, the remaining amount detection signal output from the remaining amount detection unit 62 is the pulse signal. Then, a Low pulse is output when an optical path Q1 (see FIG. 3) of the remaining amount detection unit 62 is shielded from light by toner in the storage portion 9*a*, and a High pulse is output when the optical path Q1 is not shielded from light by toner. The control unit 90 measures the High pulse output when a stirring member 34 makes one rotation as a pulse count. The pulse count serving as an output value increases as a time during which the optical path Q1 transmits light increase, that is, as toner in the storage portion 9*a* decreases, and the pulse count decreases as the time during which the optical path Q1 is shielded from light increases, that is, as toner in the storage portion 9*a* increases. That is, the control unit 90 estimates that the amount of toner in the storage portion 9*a* is smaller as the pulse count is larger, and estimates that the amount of toner in the storage portion 9*a* is larger as the pulse count is smaller. The remaining amount detection unit 62 is disposed in each of the process cartridges PY, PM, PC, and PK, and the remaining toner amounts in the process cartridges PY, PM, PC, and PK are separately detected.

Remaining Toner Amount Indication

Next, a remaining toner amount indication of the present embodiment will be described. As illustrated in FIG. 27, the indicating portions 415Y, 415M, 415C, and 415K serving as indicating units are provided on the right side of an upper surface of an apparatus body 2 of the image forming apparatus 1E, and indicates information regarding the remaining amount of toner in the storage portion 9*a* of each of the process cartridges PY, PM, PC, and PK. The indicating portions 415Y, 415M, 415C, and 415K have the same configuration except that the corresponding process cartridges are different, and the same applies to the control. Therefore, in a case where the indicating portions 415Y, 415M, 415C, and 415K are not particularly distinguished from one another, reference characters "Y", "M", "C", and "K" are omitted, and the indicating portions 415Y, 415M, 415C, and 415K will be described as the indicating portions 415.

Figure 28A:
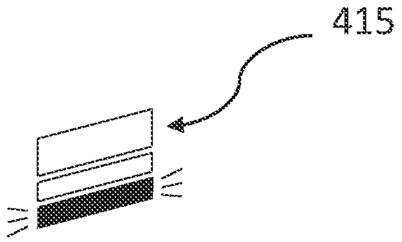
FIG. 28A is a perspective view in which an indicating portion indicates a NearOut level.
Figure 28B:
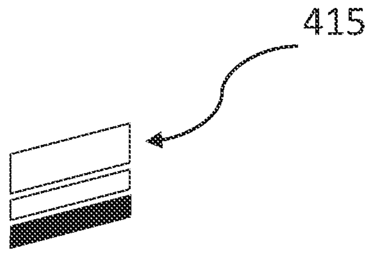
FIG. 28B is a perspective view in which the indicating portion indicates a Low level.
Figure 28C:
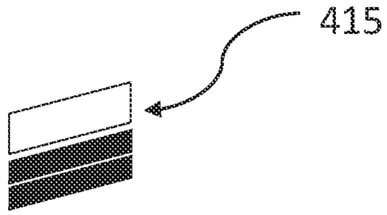
FIG. 28C is a perspective view in which the indicating portion indicates a Mid level.
Figure 28D:
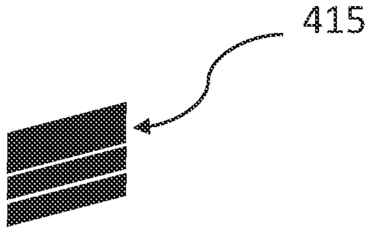
FIG. 28D is a perspective view illustrating the indicating portion indicates a Full level.

FIGS. 28A to 28D are enlarged views of the indicating portion 415. As illustrated in FIGS. 28A to 28D, the indicating portion 415 is a panel member that is configured to be lit and turned off, and includes a plurality of (three in the present embodiment) graduations that are vertically arranged. The indicating portion 415 indicates that the remaining toner amount in the storage portion 9*a* is at a NearOut level in a case where only a lower graduation blinks as illustrated in FIG. 28A. The indicating portion 415 indicates that the remaining toner amount in the storage portion 9*a* is at a Low level in a case where only the lower gradation is continuously lit as illustrated in FIG. 28B. The indicating portion 415 indicates that the remaining toner amount in the storage portion 9*a* is at a Mid level in a case where the lower and center graduations are lit and an upper graduation is turned off as illustrated in FIG. 28C. The indicating portion 415 indicates that the remaining toner amount in the storage portion 9*a* is at a Full level in a case where all the three graduations are lit as illustrated in FIG. 28D.

The indicating portion 415 is not limited to a liquid crystal panel, and may be implemented by a light source such as an LED or an incandescent lamp, and a diffusion lens. In addition, the indicating portion 415 does not have to be separately provided, and the remaining toner amount may be indicated by each graduation as described in the present embodiment on a display on which the user can change various settings and the like. Although the indicating portion 415 of the present embodiment has three graduations, the number of graduations is not limited thereto, and may be appropriately set according to the configuration of the image forming apparatus or the like.

Figure 29:
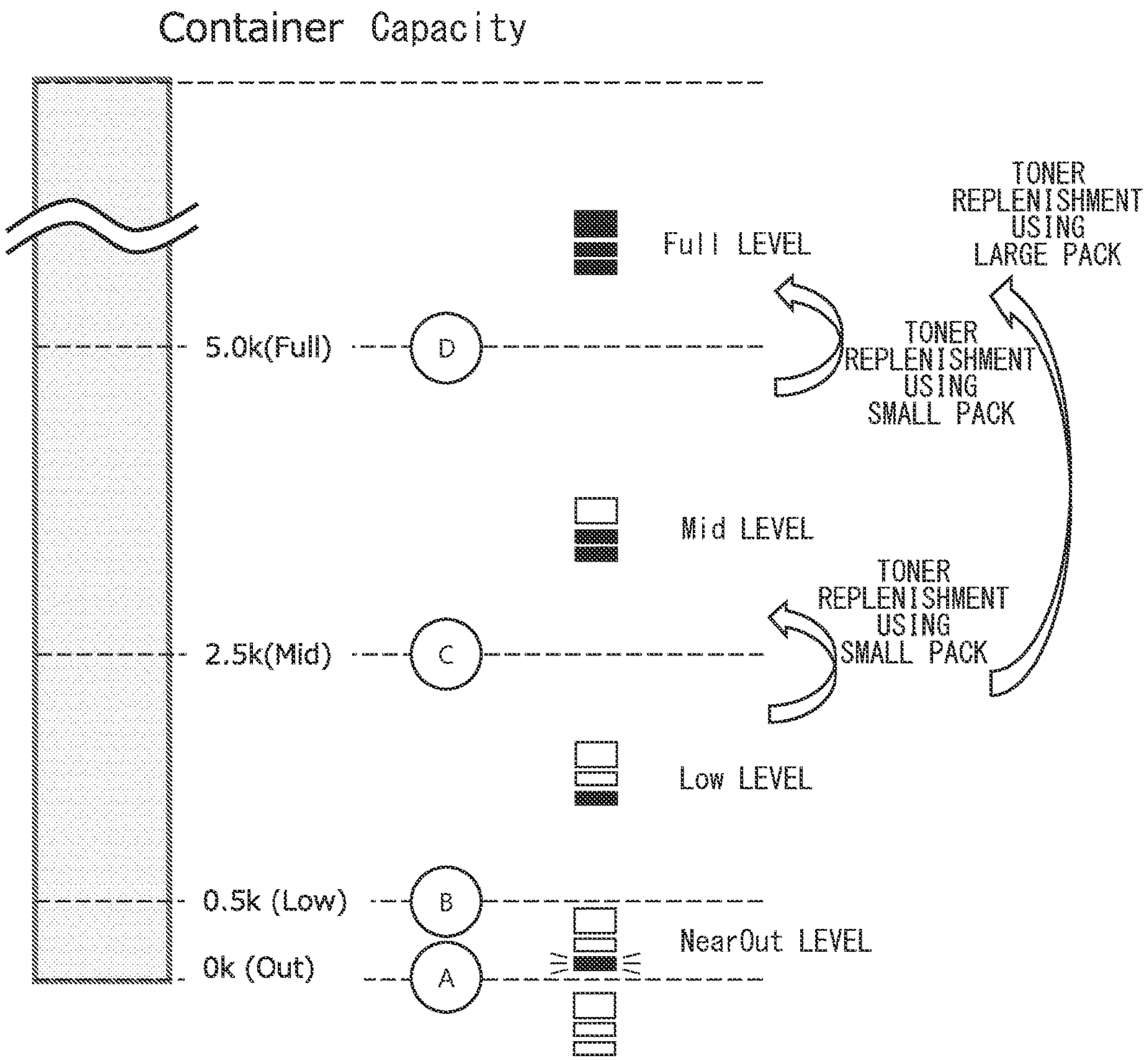
FIG. 29 is a diagram illustrating a relationship between a threshold for switching remaining toner amount display and a toner amount in a storage portion.

Next, indication switching on the indicating portion 415 in the present embodiment will be described with reference to FIG. 29. FIG. 29 is a schematic diagram illustrating a threshold for indication switching on the indicating portion 415 according to a result of detecting the remaining toner amount in the storage portion 9*a* and an indication pattern of the indicating portion 415.

As illustrated in FIG. 29, when the remaining toner amount in the storage portion 9*a* fluctuates according to toner consumption in an image forming mode or toner replenishment, the indication switching on the indicating portion 415 is performed based on a detection result acquired by the remaining amount detection unit 62. That is, the indicating portion 415 indicates the remaining toner amount based on the remaining amount detection signal output from the remaining amount detection unit 62. Specifically, in a case where a result of detecting the remaining toner amount in the storage portion 9*a* by the remaining amount detection unit 62 is equal to or more than a threshold D, the control unit 90 controls the indicating portion 415 to indicate the Full level (first indication) in which all the three graduations are lit. In a case where the result of detecting the remaining toner amount in the storage portion 9*a* by the remaining amount detection unit 62 is less than the threshold D and equal to or more than a threshold C, the control unit 90 controls the indicating portion 415 to indicate the Mid level (second indication) in which the two graduations are lit. In the present embodiment, the value of the threshold D is set to 5.0 k. Various thresholds described below including the threshold D may be appropriately set according to the amount of toner to be replenished or various configurations of the image forming apparatus.

In a case where the result of detecting the remaining toner amount in the storage portion 9*a* by the remaining amount detection unit 62 is less than the threshold C (2.5 k in the present embodiment) and equal to or more than a threshold B, the control unit 90 controls the indicating portion 415 to indicate the Low level (third indication) in which the one graduation is lit. In addition, in a case where the result of detecting the remaining toner amount in the storage portion 9*a* by the remaining amount detection unit 62 is less than the threshold B (0.5 k in the present embodiment) and equal to or more than a threshold A, the control unit 90 controls the indicating portion 415 to indicate the NearOut level (fourth indication) in which the one lower graduation blinks. Then, in a case where the result of detecting the remaining toner amount in the storage portion 9*a* by the remaining amount detection unit 62 is less than the threshold A (0 k in the present embodiment), the control unit 90 determines that toner in the storage portion 9*a* has run out, and sets a toner-out state in which all the three graduations are turned off.

That is, in a case where the result of detecting the remaining toner amount in the storage portion 9*a* by the remaining amount detection unit 62 is equal to or more than 5.0 k, the control unit 90 controls the indicating portion 415 to indicate the first indication. The control unit 90 controls the indicating portion 415 to indicate the second indication in a case where the result of detecting the remaining toner amount in the storage portion 9*a* by the remaining amount detection unit 62 is between 2.5 k and 5.0 k, and controls the indicating portion 415 to indicate the third indication in a case where the detection result is between 0.5 k and 2.5 k. In addition, the control unit 90 controls the indicating portion 415 to indicate the fourth indication in a case where the result of detecting the remaining toner amount in the storage portion 9*a* by the remaining amount detection unit 62 is between 0 k and 0.5 k, and turns off all the graduations in a case where it is determined that there is no remaining toner.

The image forming apparatus 1E according to the present embodiment can be replenished with toner by mounting various types of replenishment packs 210. For example, in the image forming apparatus 1E, a replenishment pack 210 (hereinafter, simply referred to as a small pack) and a large replenishment pack 210 (hereinafter, simply referred to as a large pack) can be mounted. The large pack stores a larger volume of toner than the small pack. In other words, the small pack is a replenishment pack capable of storing a first amount of toner, and the large pack is a replenishment pack capable of storing a second amount of toner larger than the first amount.

A difference between a toner amount corresponding to the threshold D and a toner amount corresponding to the threshold C in the present embodiment, that is, a difference between toner amounts corresponding to the thresholds related to indication switching of the uppermost graduation is set to a replenishment amount (2.5 k) for one small pack. Similarly, a difference between the toner amount corresponding to the threshold C and a toner amount corresponding to the threshold A in the present embodiment, that is, a difference between toner amounts corresponding to the thresholds related to indication switching of the middle graduation is also set to the replenishment amount for one small pack. A difference between the toner amount corresponding to the threshold D and the toner amount corresponding to the threshold A in the present embodiment is set to a replenishment amount (5.0 k) for one large pack. That is, when toner is replenished from the small pack, the number of lit graduations of the indicating portion 415 increases by one, and when toner is replenished from the large pack, the number of lit graduations of the indicating portion 415 increases by two. By setting the difference between the toner amounts corresponding to the thresholds related to the indication switching of the graduation in this manner, the indication switching on the indicating portion 415 is made by normally replenishing toner from a new replenishment pack 210, and the user can recognize that the replenishment is completed. In addition, since the user can easily identify the number of replenishment packs 210 that can be used for replenishment, it is possible to improve visibility of whether toner replenishment is possible or not possible for the user.

Figure 30A:
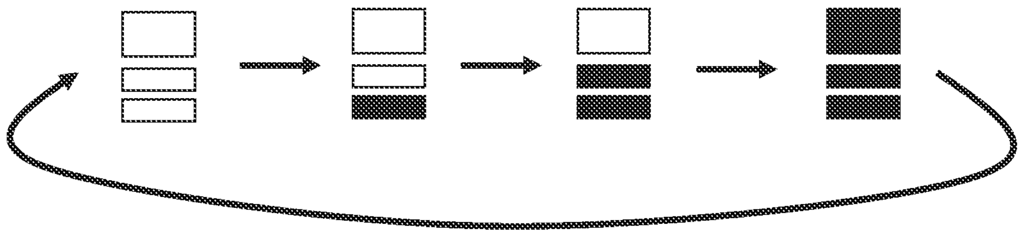
FIG. 30A is a view illustrating an example of replenishment mode display on the indicating portion.
Figure 30B:
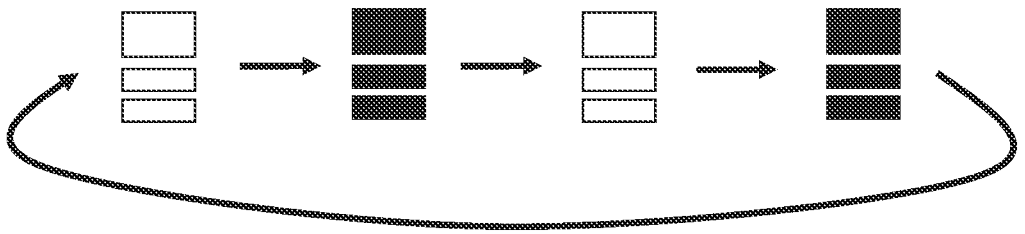
FIG. 30B is a view illustrating another example of the replenishment mode display on the indicating portion.

In the present embodiment, the indicating portion 415 can perform replenishment mode indication as illustrated in FIGS. 30A and 30B separately from the toner replenishment indication described with reference to FIG. 29. The replenishment mode indication is indication for causing the user to recognize that the replenishment mode is being activated. For the replenishment mode indication, a pattern of repeating a state of lighting three graduations of the indicating portion 415 one by one as illustrated in FIG. 30A, a pattern of repeating a state of turning off all the three graduations and a state of lighting all the three graduations as illustrated in FIG. 30B, or the like can be considered. In addition, the replenishment mode indication is not limited to these two patterns. For example, a pattern of randomly performing switching of the first to fourth indications on the indicating portion 415, such as a pattern of repeating a state of turning off the graduations one by one in a state in which all the three graduations are lit, can be considered. It is sufficient if at least two of the five states including the first to fourth indications illustrated in FIGS. 28A to 28D and an all-off state (toner-out state) in which none of the graduations is lit may be repeatedly indicated as the replenishment mode indication. As a result, indication other than the above-described five states can be made, and the user can visually recognize that the replenishment mode is being activated.

Control in Toner Replenishment Operation

Next, control in the toner replenishment operation will be described with reference to a flowchart illustrated in FIG. 31. Steps S3, S4, and S8 to S13 illustrated in FIG. 31 are separately performed for the process cartridges PY, PM, PC, and PK.

Figure 31:
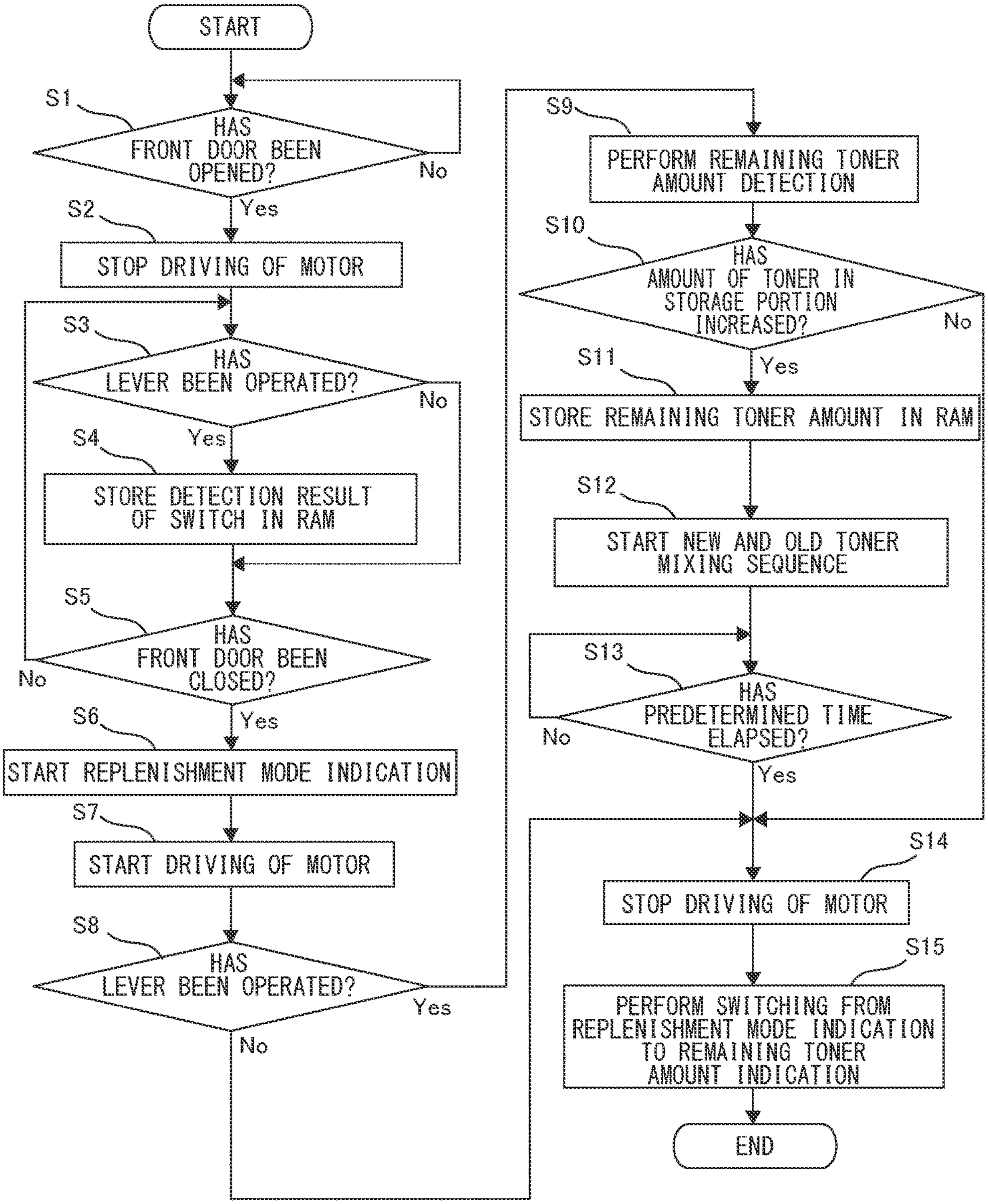
FIG. 31 is a flowchart illustrating control in a toner replenishment operation according to the fifth embodiment.

As illustrated in FIG. 31, the control unit 90 determines whether or not the front door 3 has been opened from the closed position to the open position based on a detection result of the door opening and closing sensor 54 serving as a second detection unit (step S1). In a case where it is determined that the front door 3 has been opened (step S1: Yes), the control unit 90 stops driving the motor M1 (step S2). As a result, the supply of the driving force to the process cartridges PY, PM, PC, and PK and various rollers in the apparatus body 2 is blocked. More specifically, a photosensitive drum 4, a charging roller 5, a developing roller 6, the stirring member 34, and the like of each process cartridge are stopped. Therefore, a cartridge tray 40 can be pulled out from the apparatus body 2 by releasing connection between the apparatus body 2 and each of the process cartridges PY, PM, PC, and PK.

Next, the control unit 90 determines whether or not a lever 201 has been operated based on a detection result of the switch 55 (step S3). For example, when the lever 201 is rotated from an operation position to a replenishment position, toner can be replenished to a replenishment portion 200 of the process cartridge as described above. However, it is not clear at this point whether or not the toner has actually been replenished. Specifically, although the replenishment pack 210 is mounted on the replenishment portion 200, the user can detach the replenishment pack 210 from the replenishment portion 200 without releasing the pouch 211 and discharging toner from the replenishment pack 210 to the replenishment portion 200. Therefore, as in step S9 described below, it is necessary to detect the remaining toner amount in the storage portion 9*a*.

In a case where it is determined in step S3 that the lever 201 has been operated (step S3: Yes), the control unit 90 records the detection result of the switch 55, that is, information regarding the operation of the lever 201, in a RAM 92 (step S4), and proceeds to step S5. In a case where it is determined in step S3 that the lever 201 has not been operated (step S3: No), the control unit 90 proceeds to step S5 without going through step S4. In the present embodiment, it is determined that the lever 201 has been operated in a case where the switch 55 is switched from ON to OFF or from OFF to ON, but the determination of the operation of the lever 201 is not limited thereto. For example, it may be determined that the lever 201 has been operated in a case where the switch 55 is further switched from OFF to ON after being switched from ON to OFF. That is, it may be determined that the lever 201 has been operated only in a case where the lever 201 is rotated in the order of the operation position, the replenishment position, and the operation position.

Next, the control unit 90 determines whether or not the front door 3 has been closed to move from the open position to the closed position based on the detection result of the door opening and closing sensor 54 (step S5). In a case where it is not determined that the front door 3 has been closed (step S5: No), the processing returns to step S3. In a case where it is determined that the front door 3 has been closed (step S5: Yes), the control unit 90 starts the replenishment mode indication described with reference to FIGS.

30A and 30B on the indicating portion 415 (step S6). Next, the control unit 90 starts driving the motor M1 (step S7). As a result, the toner in the storage portion 9*a* is stirred by the stirring member 34. In a state in which the front door 3 is closed, the cartridge tray 40 is mounted on the apparatus body 2, and the driving force can be transmitted from the motor M1 to the process cartridges PY, PM, PC, and PK supported by the cartridge tray 40. Further, steps S6 and S7 may be performed simultaneously, or step S6 may be performed after step S7. The start of the replenishment mode indication in step S6 may be performed at a timing between step S1 and step S2 or simultaneously with step S2 based on the opening of the front door 3.

Next, the control unit 90 determines whether or not the lever 201 has been operated when the front door 3 is positioned at the open position based on the record in the RAM 92 (step S8). That is, in a case where the information regarding the operation of the lever 201 is recorded in the RAM 92 in step S4, the control unit 909 determines that the lever 201 has been operated in step S8. In a case where it is determined in step S4 that the information regarding the operation of the lever 201 is not recorded in the RAM 92 and the lever 201 has not been operated (step S8: No), the control unit 90 stops driving the driving of the motor M1 (step S14).

In a case where it is determined that the lever 201 has been operated (step S8: Yes), the control unit 90 controls the remaining amount detection unit 62 to perform remaining toner amount detection for detecting the remaining toner amount in the storage portion 9*a* (step S9). In the present embodiment, only a lock member 65 of a process cartridge that is replenishable with toner, that is, a process cartridge corresponding to an indicator that is lit among the indicators 208Y, 208M, 208C, and 208K, is moved from a locked position to an unlocked position. Then, only the remaining amount detection unit 62 of the process cartridge that is replenishable with toner detects the remaining amount of toner in step S9.

Steps S9 to S13 are not performed for the process cartridge that is not replenishable with toner. For the process cartridge that is not replenishable with toner, in step S15, the remaining toner amount is indicated by the indicating portion 415 based on the remaining toner amount before toner replenishment instead of the remaining toner amount after toner replenishment. Similarly, in a case where it is determined that the lever 201 has not been operated (step S8: No), steps S9 to S13 are not performed for the process cartridge including the lever 201. For the process cartridge for which the lever 201 has not been operated, in step S15, the remaining toner amount is indicated by the indicating portion 415 based on the remaining toner amount before toner replenishment instead of the remaining toner amount after toner replenishment. For example, the indicating portion 415 indicates the remaining toner amount based on an output value of the remaining amount detection unit 62 stored in the RAM 92 immediately before step S1, that is, immediately before the front door 3 is opened.

Next, the control unit 90 determines whether or not the amount of toner in the storage portion 9*a* has increased based on the remaining toner amount detection in step S9 (step S10). Whether or not the amount of toner in the storage portion 9*a* has increased may be determined by any method.

For example, an output value output from the remaining amount detection unit 62 in step S9 is set as a first output value, and an output value output from the remaining amount detection unit 62 immediately before the front door 3 is opened in step S1 is set as a second output value. The control unit 90 stores the second output value in the RAM 92 serving as a storage unit, and compares the first output value with the second output value in step S10. In a case where the amount of toner corresponding to the first output value is larger than the amount of toner corresponding to the second output value, the control unit 90 determines in step S10 that the amount of toner in the storage portion 9*a* has increased. Then, in a case where the amount of toner corresponding to the first output value is equal to or smaller than the amount of toner corresponding to the second output value, the control unit 90 determines in step S10 that the amount of toner in the storage portion 9*a* has not increased. In the remaining toner amount detection in step S9, the remaining toner amount detection may be performed at a first timing and a second timing after the first timing. Then, by comparing the output values output at the first timing and the second timing, the control unit 90 may determine that the amount of toner in the storage portion 9*a* has increased in step S10. In addition, in the remaining toner amount detection in step S9, whether or not the amount of toner in the storage portion 9*a* has increased may be determined based on the slope of the moving average of the pulse counts output from the remaining amount detection unit 62 every time the stirring member 34 makes one rotation.

In a case where it is determined that the amount of toner in the storage portion 9*a* has not increased (step S10: No), the control unit 90 stops the driving of the motor M1 (step S14). In a case where it is determined that the amount of toner in the storage portion 9*a* has increased (step S10: Yes), the control unit 90 stores, in the RAM 92, the remaining toner amount in the storage portion 9*a* detected in step S9, that is, the remaining toner amount after toner replenishment (step S11). Next, the control unit 90 starts a new and old toner mixing sequence (step S12). Here, toner (developer) stored in a new replenishment pack 210 tends to have low cohesion and high toner fluidity. In addition, toner (developer) remaining in the storage portion 9*a* and toner (developer) just replenished to the storage portion 9*a* may have different charge amounts. In addition, since toner is replenished from the replenishment portion 200 disposed on a downstream end side of the process cartridge in the Y direction, the toner in the storage portion 9*a* may be unevenly distributed in the Y direction. Therefore, there is a possibility that an image defect occurs when the image formation is performed in a state in which the toner (developer) remaining in the storage portion 9*a* and the toner (developer) just replenished to the storage portion 9*a* are not sufficiently mixed.

Therefore, in the present embodiment, the driving of the motor M1 started in step S7 is extended (continued) by performing the old and new toner mixing sequence in step S12. The control unit 90 determines whether or not a predetermined time has elapsed from the start of the driving of the stirring member 34, that is, the motor M1 (step S7) (step S13). In a case where the predetermined time has not elapsed (step S13: No), the driving of the motor M1 is continued, and in a case where the predetermined time has elapsed (step S13: Yes), the driving of the motor M1 is stopped (step S14). That is, the motor M1 is controlled such that a time for which the stirring member 34 is driven becomes longer in a case where the remaining toner amount in the storage portion 9*a* increases than in a case where the remaining toner amount in the storage portion 9*a* does not increase.

Then, the control unit 90 switches the indicating portion 415 from the replenishment mode indication to the remaining toner amount indication (step S15). As a result, for example, in a case where the remaining toner amount after toner replenishment is stored in the RAM 92 in step S11, the indication on the indicating portion 415 is switched based on the remaining toner amount after toner replenishment. In this way, the control in the toner replenishment operation ends.

Further, as described with reference to FIG. 31, the control unit 90 performs a first control of controlling the motor M1 such that the driving of the stirring member 34 is started based on the closing of the front door 3 (step S5). Furthermore, the control unit 90 can perform a second control of controlling the remaining amount detection unit 62 to output an output value (pulse count) and a third control of causing the indicating portion 415 to perform the remaining toner amount indication. In addition, the control unit 90 can perform the following fourth control based on the second control. In the fourth control, in a case where it is determined that toner has been replenished to the storage portion 9*a* when the front door 3 is positioned at the open position, the control unit 90 controls the motor M1 to drive the stirring member 34 for a predetermined time. In the fourth control, in a case where it is determined that toner has not been replenished to the storage portion 9*a* when the front door 3 is positioned at the open position, the control unit 90 controls the motor M1 to stop before the stirring member 34 is driven for a predetermined time.

In addition, the control unit 90 performs the first control such that a time for which the stirring member 34 is driven becomes longer in a case where the lever 201 has moved between the operation position and the replenishment position in a period in which the front door 3 is at the open position immediately before the front door 3 moves from the open position to the closed position than in a case where the lever 201 has moved between the operation position and the replenishment position during the period. The period is, for example, a period between steps S1 to S5 in FIG. 31, and the front door 3 is positioned at the open position in this period. Then, the control unit 90 performs the third control so as to perform the remaining toner amount indication based on the output value of the remaining amount detection unit 62 in the second control based on the movement of the front door 3 from the open position to the closed position. In a case where the front door 3 has moved from the open position to the closed position and the lever 201 has not moved between the operation position and the replenishment position in the period, the control unit 90 does not perform the second control.

In a configuration in which a plurality of (four in the present embodiment) process cartridges PY, PM, PC, and PK are placed on the cartridge tray 40 as in the present embodiment, it is difficult to detect whether or not toner has been replenished to each process cartridge. However, in the process cartridge replenished with toner from the replenishment pack 210, it is preferable that the storage portion 9*a* is stirred by the stirring member 34 in order to reduce image defects. In the present embodiment, as described above, the stirring member 34 is driven based on the opening of the front door 3, and new toner and old toner in the storage portion 9*a* are mixed. Therefore, image defects can be reduced.

Furthermore, in a case where it is determined that the amount of toner in the storage portion 9*a* has increased based on the detection of the amount of toner stored in the storage portion 9*a* by the remaining amount detection unit 62 after the stirring member 34 starts to be driven, it is estimated that toner has been replenished. Then, such toner in the storage portion 9*a* is sufficiently stirred by driving the stirring member 34 for a predetermined time (step S13), so that image defects can be reduced.

For example, in a case where it is determined in step S8 that the lever 201 has not been operated or in a case where it is determined in step S10 that the amount of toner in the storage portion 9*a* has not increased, it is estimated that no toner has been replenished. In this case, since there is no new toner in the storage portion 9*a*, the motor M1 is stopped before the stirring member 34 is driven for a predetermined time. Therefore, it is possible to quickly respond to an image forming job after closing the front door 3. In addition, it is possible to provide an embodiment of the image forming apparatus 1E including the process cartridges PY, PM, PC, and PK that can be pulled out from the apparatus body 2 by the cartridge tray 40 and are replenishable with toner by the replenishment pack 210.

Sixth Embodiment

Next, a sixth embodiment of the present invention will be described, but the sixth embodiment is different from the fifth embodiment in control in a toner replenishment operation. Therefore, a configuration similar to that of the fifth embodiment will be described in a manner of omitting illustration or attaching the same reference numerals in the drawings.

In the sixth embodiment, a switch 55 illustrated in FIGS. 7A, 7B, and 26 is omitted from replenishment portions 200Y, 200M, 200C, and 200K of process cartridges PY, PM, PC, and PK. Therefore, an image forming apparatus 1E can be reduced in size and cost.

Control in Toner Replenishment Operation

Next, control in the toner replenishment operation will be described with reference to a flowchart illustrated in FIG. 32. In the flowchart illustrated in FIG. 32, steps S3, S4, and S8 of the flowchart illustrated in FIG. 31 are omitted. Steps S9 to S13 illustrated in FIG. 32 are separately performed for the process cartridges PY, PM, PC, and PK.

Figure 32:
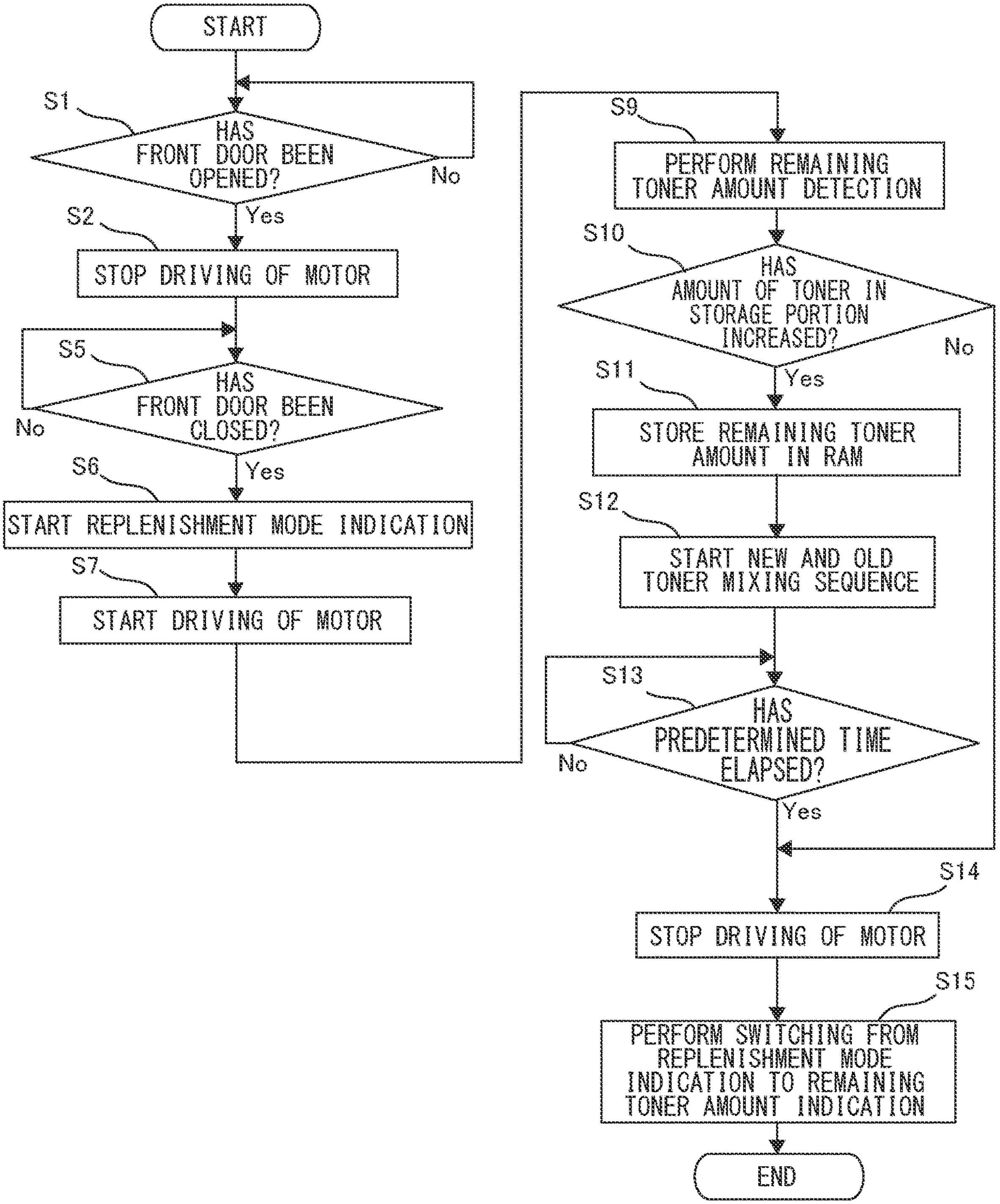
FIG. 32 is a flowchart illustrating control in a toner replenishment operation according to a sixth embodiment.

Steps S1 and S2 illustrated in FIG. 32 are the same as those in the fifth embodiment, and thus, a description will start from step S5. A control unit 90 determines whether or not a front door 3 has been closed to move from an open position to a closed position based on a detection result of a door opening and closing sensor 54 (step S5). In a case where it is determined that the front door 3 has been closed (step S5: Yes), the control unit 90 starts the replenishment mode indication described with reference to FIGS. 30A and 30B on the indicating portion 415 (step S6). Next, the control unit 90 starts driving the motor M1 (step S7). As a result, the toner in the storage portion 9*a* is stirred by the stirring member 34.

Next, the control unit 90 controls a remaining amount detection unit 62 to perform remaining toner amount detection for detecting a remaining toner amount in a storage portion 9*a* (step S9). Then, steps S10 to S15 are the same as those described in the fifth embodiment.

As described above, even in a configuration in which the switch 55 of the replenishment portion 200 is omitted, the remaining toner amount is detected by the remaining amount detection unit 62 after a stirring member 34 is driven with closing of the front door 3 as a trigger. Then, in a case where it is determined that the amount of toner in the storage portion 9*a* has increased by the remaining toner amount detection, it is estimated that toner has been replenished. The motor M1 is controlled such that a time for which the stirring member 34 is driven becomes longer in a case where the remaining toner amount in the storage portion 9*a* increases than in a case where the remaining toner amount has not increased. Such toner in the storage portion 9*a* is sufficiently stirred by driving the stirring member 34 for a predetermined time (step S13), so that image defects can be reduced.

In addition, since the switch 55 is not installed in the replenishment portion 200, the image forming apparatus 1E can be reduced in size and cost. In the present embodiment, only the remaining amount detection unit 62 of the process cartridge that is replenishable with toner detects the remaining toner amount in step S9. Therefore, it is possible to perform the remaining toner amount detection in step S9 only for the minimum necessary process cartridge, and it is possible to quickly return to a standby state in which the next image formation can be performed.

OTHER EMBODIMENTS

In any of the embodiments described above, the replenishment pack including the pouch 211 is used, but the present embodiment is not limited thereto. For example, the effect of the present embodiment can be obtained even when using a resin container from which toner is pushed to the outside when the user pushes a plunger or a resin container that discharges toner to the outside when the user hits or deforms a plunger.

In any of the embodiments described above, the four process cartridges PY, PM, PC, and PK are supported by the cartridge tray 40, but the present embodiment is not limited thereto. For example, three process cartridges having toner of red (R), green (G), and blue (B) may be supported by the cartridge tray 40. Further, only one or two process cartridges may be supported by the cartridge tray 40. In addition, instead of each process cartridge, a developing cartridge including a developing container and a developing roller or a toner cartridge including a toner storage portion may be supported by the cartridge tray 40.

In any of the embodiments described above, the process cartridges PY, PM, PC, and PK are configured to be detachable from the cartridge tray 40, but the present embodiment is not limited thereto. The process cartridges PY, PM, PC, and PK may be configured to be undetachable from the cartridge tray 40.

In any of the embodiments described above, the process cartridges PY, PM, PC, and PK are replenished with toner while being supported by the cartridge tray 40 pulled out from the apparatus body 2, but the present embodiment is not limited thereto. For example, the process cartridges PY, PM, PC, and PK may be replenished with toner from the replenishment pack 210 in a state of being detached from the cartridge tray 40.

In any of the embodiments described above, when the lever 201 is operated in a state in which the replenishment pack 210 is mounted on the replenishment portion 200, state transition between a replenishable state and a non-replenishable state can be made, but the present embodiment is not limited thereto. For example, instead of operating the lever 201, the replenishment pack 210 itself may be rotated to transition between the replenishable state and the non-replenishable state. That is, the container shutter 214 and the body shutter 206 may be configured to rotate in conjunction with the rotation operation of the replenishment pack 210.

Instead of the solenoids 66, 400, and 1400 of the first to third embodiments, another actuator such as a motor may be applied.

In the fifth embodiment and the sixth embodiment, only the remaining amount detection unit 62 of the process cartridge that is replenishable with toner performs the remaining toner amount detection in step S9, but the present embodiment is not limited thereto. For example, the driving of the stirring member 34 and the remaining toner amount detection by the remaining amount detection unit 62 may be performed for all the process cartridges PY, PM, PC, and PK based on the closing of the front door 3.

In the fifth embodiment and the sixth embodiment, both the indicating portions 415Y, 415M, 415C, and 415K and the indicators 208Y, 208M, 208C, and 208K are provided, but the present embodiment is not limited thereto. For example, only one of the indicating portions 415Y, 415M, 415C, and 415K and the indicators 208Y, 208M, 208C, and 208K may be provided. In addition, the arrangement of the indicating portions 415Y, 415M, 415C, and 415K and the arrangement of the indicators 208Y, 208M, 208C, and 208K may be interchanged with each other.

In addition, the above-described embodiments may be arbitrarily combined. For example, the lock mechanism 620 of the third embodiment may be applied to the first embodiment or the second embodiment, and the mounting portion shutter 410 of the second embodiment may be applied to the third embodiment. In addition, the indicating portion 415 may be provided in the image forming apparatus 1B of the second embodiment, and the control in the toner replenishment operation described in the fifth embodiment and the sixth embodiment may be applied to the image forming apparatus 1B of the second embodiment.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-189697, filed Nov. 28, 2022, and Japanese Patent Application No. 2022-189698, filed Nov. 28, 2022, which are hereby incorporated by reference herein in their entirety.

What is claimed is:

1. An image forming apparatus on which a toner container storing toner is mountable, the image forming apparatus comprising:

an apparatus body provided with an opening;

a mounting portion on which the toner container is mountable;

a moving unit including a developing unit, and configured to move through the opening between an internal position where an image formation is executable using the developing unit and an external position that is different from the internal position and where at least a part of the moving unit is exposed to an outside of the apparatus body, the developing unit including:

a toner storage portion configured to store the toner and configured to be replenished with the toner from the toner container mounted on the mounting portion;

a developing roller configured to bear the toner in the toner storage portion; and a stirring member configured to stir the toner in the toner storage portion;

an opening and closing member configured to move between a closed position where the opening of the apparatus body is closed and an open position where the opening is opened;

an actuator configured to drive the stirring member;

a first detection unit configured to output an output value based on an amount of the toner stored in the toner storage portion;

an indicating unit configured to execute a remaining toner amount indication based on the output value output from the first detection unit;

a second detection unit configured to detect a movement of the opening and closing member; and a control unit configured to control the actuator, the first detection unit, and the indicating unit, wherein the moving unit is configured to replenish the toner from the toner container mounted on the image forming apparatus to the toner storage portion in a state in which the moving unit is at the external position and supported by the apparatus body, and is configured not to be movable from the external position to the internal position in a state in which the toner container is mounted on the image forming apparatus, and the control unit executes (i) a first control of controlling the actuator to start driving of the stirring member based on a detection, by the second detection unit, of a movement of the opening and closing member from the open position to the closed position, (ii) a second control of controlling the first detection unit to output the output value, and (iii) a third control of controlling the indicating unit to perform execute the remaining toner amount indication.

2. The image forming apparatus according to claim 1, wherein the mounting portion includes an operation portion configured to be operated to move between a regulation position for regulating toner replenishment from the toner container mounted on the mounting portion to the toner storage portion and an allowing position for allowing the toner replenishment from the toner container to the toner storage portion, the image forming apparatus further comprises a third detection unit configured to detect a movement of the operation portion, and the control unit executes, in a case where movement of the opening and closing member from the open position to the closed position has been detected by the second detection unit, (i) the first control such that a time for which the stirring member is driven becomes longer in a case where a movement of the operation portion between the regulation position and the allowing position has been detected by the third detection unit in a period in which the opening and closing member is positioned at the open position immediately before the movement of the opening and closing member from the open position to the closed position is detected by the second detection unit than in a case where the movement of the operation portion between the regulation position and the allowing position has not been detected by the third detection unit in the period, and (ii) the third control to execute the remaining toner amount indication based on the output value in the second control based on the detection, by the second detection unit, of the movement of the opening and closing member from the open position to the closed position.

3. The image forming apparatus according to claim 2, wherein the control unit does not execute the second control in a case where the movement of the opening and closing member from the open position to the closed position has been detected by the second detection unit, and the movement of the operation portion between the regulation position and the allowing position has not been detected by the third detection unit in the period.

4. The image forming apparatus according to claim 3, wherein the apparatus body includes a storage unit configured to store the output value, and the control unit executes the third control to perform execute the remaining toner amount indication based on the output value stored in the storage unit immediately before the period.

5. The image forming apparatus according to claim 4, wherein in a case where the movement of the opening and closing member from the open position to the closed position has been detected by the second detection unit, and where the movement of the operation portion between the regulation position and the allowing position has been detected by the third detection unit in the period, the control unit executes the first control such that the time for which the stirring member is driven becomes longer in a case where a remaining toner amount in the toner storage portion has increased in the period than in a case where the remaining toner amount in the toner storage portion has not increased in the period.

6. The image forming apparatus according to claim 5, wherein whether or not the remaining toner amount in the toner storage portion has increased in the period is determined according to the output value in a case where the second control is executed based on the detection, by the second detection unit, of the movement of the opening and closing member from the open position to the closed position, and the output value stored in the storage unit immediately before the period.

7. The image forming apparatus according to claim 1, wherein in a case where the movement of the opening and closing member from the open position to the closed position has been detected by the second detection unit, the control unit executes the first control such that a time for which the stirring member is driven becomes longer in a case where a remaining toner amount in the toner storage portion has increased in a period in which the opening and closing member is at the open position immediately before the movement of the opening and closing member from the open position to the closed position is detected by the second detection unit than in a case where the remaining toner amount has not increased in the period.

8. The image forming apparatus according to claim 1, wherein the control unit executes the third control after the stirring member is stopped.

9. The image forming apparatus according to claim 1, wherein the control unit controls the actuator to stop the stirring member based on a detection, by the second detection unit, of a movement of the opening and closing member from the closed position to the open position.

10. The image forming apparatus according to claim 1, wherein the control unit executes the first control, the second control, and the third control in a case where the developing unit is replenishable with an entire amount of the toner in the toner container which is new, and does not execute the second control and the third control in a case where the developing unit is not replenishable with the entire amount of the toner in the toner container which is new.

11. The image forming apparatus according to claim 1, wherein the control unit controls the indicating unit to start a replenishment mode indication different from the remaining toner amount indication based on the detection, by the second detection unit, of the movement of the opening and closing member from the open position to the closed position in the first control, and switches the indicating unit from the replenishment mode indication to the remaining toner amount indication in the third control.

12. The image forming apparatus according to claim 1, wherein the control unit controls the indicating unit to start a replenishment mode indication different from the remaining toner amount indication based on a detection, by the second detection unit, of a movement of the opening and closing member from the closed position to the open position before the first control, and switches the indicating unit from the replenishment mode indication to the remaining toner amount indication in the third control.

13. The image forming apparatus according to claim 1, wherein the developing unit and the toner container are a first developing unit and a first toner container, respectively, the moving unit includes the first developing unit configured to store toner of a first color and a second developing unit configured to store toner of a second color different from the first color, and is configured to execute an image formation by using the first developing unit and the second developing unit at the internal position, the first developing unit and the second developing unit are configured to be replenished with the toner from the first toner container and a second toner container mounted on the mounting portion, respectively, in a state in which the moving unit is at the external position and supported by the apparatus body, the first toner container being configured to store the toner of the first color, the second toner container being configured to store the toner of the second color, and the moving unit is configured not to be movable from the external position to the internal position in a state in which the first toner container and the second toner container are mounted on the mounting portion.

14. The image forming apparatus according to claim 13, wherein the mounting portion includes:

a first developing mounting portion which is provided in the first developing unit and on which the first toner container is mountable; and a second developing mounting portion which is provided in the second developing unit and on which the second toner container is mountable, the first developing unit is configured to be replenished with the toner from the first toner container mounted on the first developing mounting portion, the second developing unit is configured to be replenished with the toner from the second toner container mounted on the second developing mounting portion, and the first developing mounting portion and the second developing mounting portion are exposed to the outside of the apparatus body in a case where the moving unit is at the external position.

15. The image forming apparatus according to claim 13, wherein the mounting portion includes a body mounting portion which is provided in the apparatus body and on which the first toner container is mountable, and the first developing unit includes a first replenishment port and is configured to be replenished with the toner from the first toner container mounted on the body mounting portion through the first replenishment port in a case where the moving unit is positioned at a first position which belongs to the external position.

16. The image forming apparatus according to claim 15, wherein the body mounting portion is a first body mounting portion, the apparatus body includes a second body mounting portion which is disposed at a position different from that of the first body mounting portion in an intersecting direction intersecting a movement direction of the moving unit and on which the second toner container is mountable, and the second developing unit includes a second replenishment port and is configured to be replenished with the toner from the second toner container mounted on the second body mounting portion through the second replenishment port in a case where the moving unit is positioned at a second position, which belongs to the external position, different from the first position.

17. The image forming apparatus according to claim 15, wherein the body mounting portion includes:

a first replenishment path through which the toner discharged from the first toner container passes in a case where the first toner container is mounted on the body mounting portion; and a second replenishment path through which the toner discharged from the second toner container passes in a case where the second toner container is mounted on the body mounting portion, the first developing unit is configured to be replenished with the toner from the first toner container mounted on the body mounting portion through the first replenishment path and the first replenishment port in a case where the moving unit is positioned at the first position, and the second developing unit includes a second replenishment port, and is configured to be replenished with the toner from the second toner container mounted on the body mounting portion through the second replenishment path and the second replenishment port in a case where the moving unit is positioned at a second position, which belongs to the external position, different from the first position.

18. The image forming apparatus according to claim 13, wherein the moving unit includes a movable frame body, and the first developing unit and the second developing unit are configured to be attachable to and detachable from the movable frame body.

19. The image forming apparatus according to claim 13, wherein the moving unit includes a movable frame body, and the first developing unit and the second developing unit are configured not to be detachable from the movable frame body.

20. The image forming apparatus according to claim 1, wherein the first detection unit includes:

a light emitting portion configured to emit light; and a light receiving portion configured to receive the light which is emitted from the light emitting portion and passes through the toner storage portion, the first detection unit detecting the amount of the toner stored in the toner storage portion by outputting the output value corresponding to a time for which the light receiving portion receives the light emitted from the light emitting portion.

21. The image forming apparatus according to claim 1, wherein the third control is executed based on the output value in the second control which is executed after a start of the first control.

* * * * *